United States Patent

Romanos et al.

(10) Patent No.: US 9,517,445 B2
(45) Date of Patent: Dec. 13, 2016

(54) HIGH SURFACE AREA CARBON AND PROCESS FOR ITS PRODUCTION

(71) Applicant: The Curators of the University of Missouri, Columbia, MO (US)

(72) Inventors: Jimmy Romanos, Columbia, MO (US); Jacob Burress, Columbia, MO (US); Peter Pfeifer, Columbia, MO (US); Tyler Rash, Columbia, MO (US); Parag Shah, Columbia, MO (US); Galen Suppes, Columbia, MO (US)

( * ) Notice: Subject to any disclaimer, the term of this patent is extended or adjusted under 35 U.S.C. 154(b) by 669 days.

(21) Appl. No.: 13/790,831

(22) Filed: Mar. 8, 2013

(65) Prior Publication Data

US 2013/0190542 A1 Jul. 25, 2013

Related U.S. Application Data

(60) Continuation of application No. 13/717,388, filed on Dec. 17, 2012, now abandoned, which is a (Continued)

(51) Int. Cl.
*B01J 20/30* (2006.01)
*B01J 20/00* (2006.01)
(Continued)

(52) U.S. Cl.
CPC ............. *B01J 20/3064* (2013.01); *B01J 20/00* (2013.01); *B01J 20/20* (2013.01);
(Continued)

(58) Field of Classification Search
None
See application file for complete search history.

(56) References Cited

U.S. PATENT DOCUMENTS

| | | | |
|---|---|---|---|
| 1,565,328 A | 12/1925 | Ray | |
| 3,454,502 A | 7/1969 | Hiltgen et al. | |

(Continued)

FOREIGN PATENT DOCUMENTS

| | | |
|---|---|---|
| JP | 07-232908 A | 5/1995 |
| JP | 07-232908 H | 5/1995 |
| WO | 2008/058231 A2 | 5/2008 |

OTHER PUBLICATIONS

Tseng et al.; Pore Structure and Adsorption Performance of the KOH-activated Carbons Prepared from Corncob; Journal of Colloid and Interface Science; 287; 428-437; 2005.*

(Continued)

*Primary Examiner* — Guinever S Gregorio
(74) *Attorney, Agent, or Firm* — Polsinelli PC

(57) ABSTRACT

Activated carbon materials and methods of producing and using activated carbon materials are provided. In particular, biomass-derived activated carbon materials and processes of producing the activated carbon materials with prespecified surface areas and pore size distributions are provided. Activated carbon materials with preselected high specific surface areas, porosities, sub-nm (<1 nm) pore volumes, and supra-nm (1-5 nm) pore volumes may be achieved by controlling the degree of carbon consumption and metallic potassium intercalation into the carbon lattice during the activation process.

16 Claims, 24 Drawing Sheets

Related U.S. Application Data continuation-in-part of application No. 13/278,754, filed on Oct. 21, 2011, now Pat. No. 8,691,177, which is a division of application No. 11/937,150, filed on Nov. 8, 2007, now Pat. No. 8,926,932.

(60) Provisional application No. 60/857,554, filed on Nov. 8, 2006, provisional application No. 61/685,135, filed on Mar. 12, 2012.

(51) Int. Cl.

| | |
|---|---|
| B01J 20/20 | (2006.01) |
| B01J 20/28 | (2006.01) |
| B01J 21/18 | (2006.01) |
| B82Y 30/00 | (2011.01) |
| C01B 3/00 | (2006.01) |
| C01B 31/08 | (2006.01) |
| C01B 31/12 | (2006.01) |
| C04B 38/00 | (2006.01) |
| C10L 3/10 | (2006.01) |
| F17C 11/00 | (2006.01) |
| H01G 11/34 | (2013.01) |
| H01M 4/92 | (2006.01) |
| H01G 11/24 | (2013.01) |
| C04B 111/00 | (2006.01) |
| H01M 8/04 | (2016.01) |

(52) U.S. Cl.
CPC ... *B01J 20/28057* (2013.01); *B01J 20/28083* (2013.01); *B01J 20/28085* (2013.01); *B01J 21/18* (2013.01); *B82Y 30/00* (2013.01); *C01B 3/0021* (2013.01); *C01B 31/08* (2013.01); *C01B 31/12* (2013.01); *C04B 38/0022* (2013.01); *C10L 3/10* (2013.01); *F17C 11/005* (2013.01); *F17C 11/007* (2013.01); *H01G 11/24* (2013.01); *H01G 11/34* (2013.01); *H01M 4/926* (2013.01); *C04B 2111/00853* (2013.01); *C04B 2111/00948* (2013.01); *H01M 8/04216* (2013.01); *Y02C 20/20* (2013.01); *Y02E 60/13* (2013.01); *Y02E 60/321* (2013.01); *Y02E 60/325* (2013.01); *Y02E 60/327* (2013.01); *Y02E 60/328* (2013.01); *Y02E 60/50* (2013.01); *Y02P 20/145* (2015.11); *Y02P 70/56* (2015.11); *Y02T 10/7022* (2013.01)

(56) References Cited

U.S. PATENT DOCUMENTS

| | | | |
|---|---|---|---|
| 4,038,301 A | 7/1977 | Otto | |
| 4,082,694 A | 4/1978 | Wennerberg et al. | |
| 4,476,242 A | 10/1984 | Puskas et al. | |
| 4,954,469 A | 9/1990 | Robinson | |
| 4,970,189 A | 11/1990 | Tachibana | |
| 5,064,805 A | 11/1991 | Otowa | |
| 5,102,855 A | 4/1992 | Greinke et al. | |
| 5,146,889 A | 9/1992 | Swanson et al. | |
| 5,204,310 A * | 4/1993 | Tolles | C01B 31/12 |
| | | | 123/519 |
| 5,382,559 A | 1/1995 | Carugati et al. | |
| 5,416,056 A | 5/1995 | Baker | |
| 5,710,092 A | 1/1998 | Baker | |
| 5,965,483 A * | 10/1999 | Baker | C01B 31/08 |
| | | | 502/425 |
| 6,547,990 B2 | 4/2003 | Shinozaki et al. | |
| 6,768,631 B2 | 7/2004 | Uehara et al. | |
| 7,202,195 B2 | 4/2007 | Cannon et al. | |
| 2006/0140846 A1 | 6/2006 | Leis et al. | |
| 2006/0157419 A1 | 7/2006 | Karanfil et al. | |
| 2007/0191575 A1 | 8/2007 | Sumner et al. | |
| 2007/0248529 A1 | 10/2007 | Axtell et al. | |
| 2008/0107589 A1 | 5/2008 | von Blucher et al. | |
| 2008/0207442 A1 | 8/2008 | Pfeifer et al. | |
| 2012/0094828 A1 | 4/2012 | Pfeifer et al. | |
| 2012/0172216 A1 | 7/2012 | Bohringer et al. | |
| 2013/0211158 A1 | 8/2013 | Romanos et al. | |

OTHER PUBLICATIONS

Office Action from related Korean Patent Application No. 10-2009-7011599, dated Dec. 16, 2013, 5 pgs.
Office Action from related Canadian Patent Application No. 2,668,887, dated Mar. 31, 2014, 2 pgs.
Office Action mailed Feb. 7, 2013; U.S. Appl. No. 11/937,150 (19 pages).
Office Action dated Aug. 15, 2013 for related U.S. Appl. No. 13/278,754 (9 pages).
Office Action dated Jun. 22, 2012 for related U.S. Appl. No. 13/278,754 (12 pages).
Office Action dated Jun. 21, 2013 for related Canadian Patent Application No. 2,668,887 (6 pages).
Office Action dated Jul. 31, 2013 for related Japanese Patent Application No. 2009-536479 (6 pages).
Office Action from related U.S. Appl. No. 11/937,150, dated Mar. 18, 2014, 7 pgs.
Egyptian patent application 2009050670 Official Action with translation (7 pages), 2009.
Tseng et al.; "Preparation of high surface area carbons from Corncob with KOH etching plus CO2 gasification for the adsorption of dyes and phenols from water"; Colloids and Surfaces A: Physicochemical Engineering Aspects; 2006; vol. 279; pp. 69-78.
International Search Report for PCT/US07/84061; dated Ma 9, 2008; (3 pages).
English translation of Official Decision issued by the Egyptian patent office dated Sep. 1, 2010; (2 pages).
Official Decision issued by the Egyptian patent office; (3 pages), 2010.
Office Action dated Mar. 19, 2010 from U.S. Appl. No. 11/937,150; (14 pages).
Office Action dated Dec. 9, 2010 from U.S. Appl. No. 11/937,150; (11 pages).
Office Action dated Jul. 5, 2012 from U.S. Appl. No. 11/937,150; (10 pages).
English translation of Official Action from the Mexican Patent Office dated Aug. 1, 2011; (4 pages).
English translation of Notice of Allowance from the Mexican Industrial Property Institute dated Dec. 22, 2011; (2 pages).
Japanese Patent Application 2009-536479; Office Action dated Oct. 25, 2012 (with translation); (8 pages).
Cao et al.; "Process effects on activated carbon with large specific surface area from corn cob"; Bioresource Technology; vol. 97; pp. 110-115; 2006.

* cited by examiner

HIGH SURFACE AREA CARBON AND PROCESS FOR ITS PRODUCTION

CROSS-REFERENCE TO RELATED APPLICATIONS

This application is a continuation of U.S. application Ser. No. 13/717,388 filed on Dec. 17, 2012, which is a continuation-in-part of U.S. application Ser. No. 13/278,754 filed on Oct. 21, 2011, which is a divisional of U.S. application Ser. No. 11/937,150 filed on Nov. 8, 2007, which claims priority to U.S. Provisional Application Ser. No. 60/857,554 filed on Nov. 8, 2006, each of which is hereby incorporated by reference in its entirety. This continuation application also claims priority to U.S. Provisional Application Ser. No. 61/685,135 filed on Mar. 12, 2012, and is hereby incorporated by reference in its entirety.

GOVERNMENT SUPPORT

The present invention was made, at least in part, with government support under Award ID 0438469 from the National Science Foundation, under Award DE-FG36-08GO18142 from the Department of Energy, and under Award ID 500-08-022 from the California Energy Commission. Accordingly, the United States Government and the State of California have certain rights in this invention.

FIELD OF THE INVENTION

The present invention relates to activated carbon materials and methods of producing and using activated carbon materials. In particular, the present invention relates to biomass-derived activated carbon materials and processes of producing the activated carbon materials with prespecified surface areas and pore size distributions.

BACKGROUND OF THE INVENTION

Activated carbon materials are widely used for a variety of applications including adsorption, liquid cleanup, gas cleanup, and gas storage. The structure and architecture of a particular activated carbon material, in particular the materials surface area, pore volume, and pore size distribution may influence the performance of the activated carbon material in these different applications. For example, the adsorption of hydrogen and methane is of interest for fuel tanks in hydrogen-powered and natural-gas-powered vehicles. It is known that the optimal pore diameter for adsorbing a molecule is about 2.7 times the critical diameter of the molecule; for example, the optimal pore diameters for hydrogen, acetylene, and methane are 6 Å, 6 Å, and 11 Å.

Existing activated carbon materials typically are produced using a combination of at least several process conditions that result in a material with the desired characteristics for a particular application. However, the causal connection between the selected process conditions and the characteristics of the resulting activated carbon material are typically not well characterized. As a consequence, there exists a bewildering array of disparate processes used to produce activated carbon materials intended for different uses.

Two existing activation methods are typically used to generate activated carbon from carbonaceous or lignocellulose precursors: 1) physical/thermal activation by a gasifying agents such as air, carbon dioxide, water vapor, oxygen; and 2) chemical activation by a one or more chemical agents such as phosphoric acid, zinc chloride, potassium hydroxide, sodium hydroxide, calcium chloride, and potassium carbonate. Physical/thermal activation methods are typically carried out at relatively high temperatures and are associated with a significantly lower yield compared to chemical activation methods. Although existing chemical activation methods may produce activated carbon materials with high surface areas, these methods do not provide for the quantitative and simultaneous control over other characteristics of the activated carbon material such as porosity and/or and pore fractions of sub-nm (<1 nm) pores and supra-nm (1-5 nm) pores, which are known to influence the performance of the activated carbon in applications such as gas adsorption.

A need exists in the art for a process of producing an activated carbon material having a prespecified surface area, pore volume, and pore size distribution. Such a process could be used to custom design an activated carbon material that is exceptionally well-suited for a selected application. Activated carbon materials produced using such a method would be useful in a wide range of applications, such as fuel tanks in vehicles, batteries, electrical capacitors, separation and purification devices, and catalysts.

SUMMARY OF THE INVENTION

In an aspect, a process for making an activated carbon adsorbent having a predetermined pore size distribution and surface area is provided. In this aspect, the process includes contacting a char with KOH at an activation temperature ranging from 700° C. to 900° C. and a KOH:C ratio ranging from about 2 to about 4.5. The resulting activated carbon adsorbent has a total pore volume of at least 1.0 cc/g and a BET surface area of at least about 2000 $m^2/g$ if the KOH:C ratio is at least 3.0.

In another aspect, a process for making an activated carbon adsorbent having a predetermined pore size distribution and surface area is provided. In this aspect, the process includes contacting a char with KOH flakes or solution for about one hour at an activation temperature of 700° C. and a KOH:C ratio ranging from about 2 to about 4.5. The activated carbon adsorbent has a % volume of pores of 10 Å diameter or less ranging from about 70% to about 80% for the KOH:C ratio of 2.5 to ranging from about 40% to about 50% for the KOH:C ratio of 3.5.

In another aspect, a process for making an activated carbon adsorbent having a predetermined pore size distribution and surface area is provided. In this aspect, the process includes contacting a char with KOH solution for about one hour at an activation temperature of 800° C. and a KOH:C ratio ranging from 2.5 to 3.5. The activated carbon adsorbent has a % volume of pores of 10 Å diameter or less ranging from about 55% for the KOH:C ratio of 2.5 to about 40% for the KOH:C ratio of 3.5.

In another aspect, a process for making an activated carbon adsorbent having a predetermined pore size distribution and surface area is provided. In this aspect, the process includes contacting a char with KOH solution for about one hour at an activation temperature of 900° C. and a KOH:C ratio ranging from 2.5 to 3.5. The activated carbon adsorbent has a % volume of pores of 10 Å diameter or less ranging from about 50% for the KOH:C ratio of 2.5 to about 30% for the KOH:C ratio of 3.5.

In another aspect, a process for making an activated carbon adsorbent having a predetermined pore size distribution and surface area is provided. In this aspect, the process includes providing a char that includes an acid-activated, charred biomass feedstock and contacting the char with an amount of KOH flakes or solution for about one hour at an activation temperature ranging from 700° C. to 900° C. and a KOH:C ratio ranging from 2 to 4.5. The activated carbon adsorbent has a total pore volume of at least 1.0 cc/g and a BET surface area of at least about 2000 m$^2$/g if the KOH:C ratio is at least 3.0.

In another aspect, a process for making an activated carbon adsorbent having a predetermined pore size distribution and surface area is provided. In this aspect, the process includes soaking a biomass feedstock in phosphoric acid at about 45° C. for about 12 hours to form an acid-activated feedstock, washing the acid-activated feedstock to adjust the pH of the acid-activated feedstock to about 7, and charring the washed acid-activated feedstock at about 480° C. under a nitrogen atmosphere to form a char. The method further includes contacting the char with an amount of KOH flakes or solution for about one hour at an activation temperature ranging from 700° C. to 900° C. and a KOH:C ratio ranging from 2 to 4.5. The activated carbon adsorbent has a total pore volume of at least 1.0 cc/g and a BET surface area of at least about 2000 m$^2$/g if the KOH:C ratio is at least 3.0.

In another aspect, a pre-mixed feedstock for the production of an activated carbon adsorbent having a predetermined pore size distribution and surface area is provided. In this aspect, the feedstock includes KOH flakes or solution and char at a KOH:C ratio ranging from 2 to 4.5. The activated carbon adsorbent is produced by heating the feedstock to an activation temperature ranging from 700° C. to 900° C. for about one hour. The activated carbon adsorbent produced in this aspect has a total pore volume of at least 1.0 cc/g and a BET surface area of at least about 2000 m$^2$/g if the KOH:C ratio is at least 3.0.

In another aspect, a stored methane composition is provided that includes an amount of methane adsorbed to an activated methane adsorbent. In this aspect, the methane is adsorbed at room temperature and a pressure of about 35 bar. The activated carbon adsorbent in this aspect has a BET surface area of at least 2000 m$^2$/g and a % volume of pores with 10 Å diameters or less of about 80%. The amount of methane adsorbed is greater than about 130 g of methane for each L of activated carbon adsorbent.

In another aspect, a stored methane composition is provided that includes an amount of methane adsorbed to an activated methane adsorbent. In this aspect, the methane is adsorbed at room temperature and a pressure of about 35 bar. The activated carbon adsorbent in this aspect has a BET surface area of at least 2000 m$^2$/g and a % volume of pores with 10 Å diameters or less of less than about 60%. The amount of methane adsorbed is greater about 200 g of methane for each kg of activated carbon adsorbent.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

DESCRIPTION OF THE FIGURES

Corresponding reference characters indicate corresponding elements among the views of the drawings. The headings used in the figures should not be interpreted to limit the scope of the claims.

DETAILED DESCRIPTION OF THE INVENTION

Figure 1:
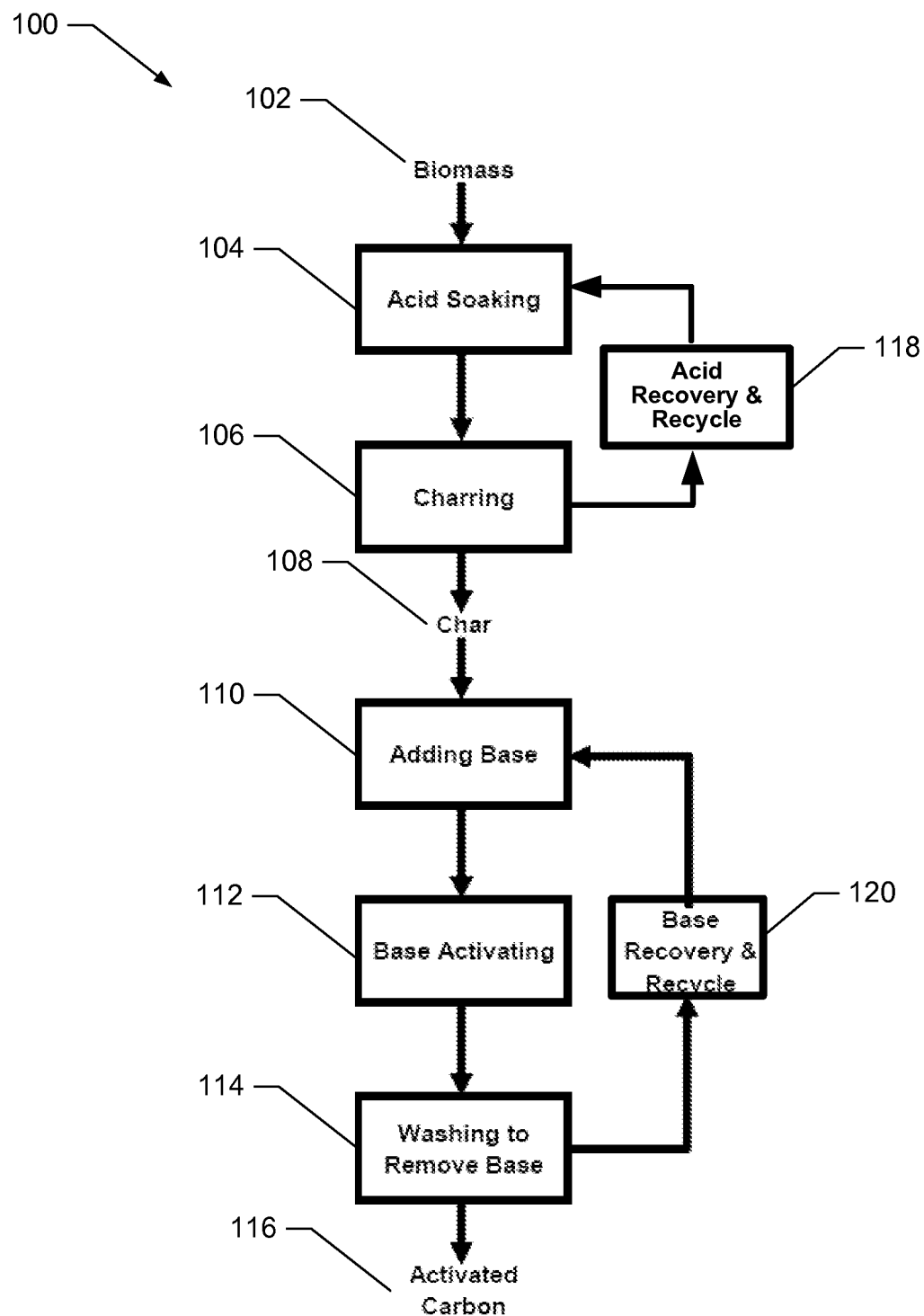
FIG. 1 is a block flow diagram illustrating key steps in the preferred carbon synthesis process. Important parameters that may impact the performance of the activated carbon product are listed to the right.

In various aspects, an activated carbon material, a process for producing the activated carbon material, a process for briquetting the activated carbon material, and methods of using the activated carbon material in both particulate and briquetted form are provided herein. In one aspect, the activated carbon material may include a predetermined total surface area and a plurality of pores having a predetermined pore size distribution that are selected in order to enhance the function of the activated carbon material as described herein below. In this aspect, for example, the activated carbon material may be used as an adsorbent material for the adsorption of gases. In an additional aspect, the activated carbon material may be produced from any carbon-containing material including, but not limited to, biomass using a production method described herein below. In this additional aspect, the process parameters of the production method may be varied within specific ranges in order to achieve the predetermined surface area and pore size distribution. In another aspect, a method of forming the particulate activated carbon material into monolithic briquette bodies is provided in which the volumetric adsorption characteristics of the particulate activated carbon material is substantially enhanced in the briquetted form. In another additional aspect, various methods of using the activated carbon material are provided for applications including, but not limited to: gas storage devices, molecular sieve devices; water treatment devices; electrical devices such as electrical capacitors, batteries, and fuel cells; catalyst supports; and ion exchange materials such as chromatography media.

I. Activated Carbon Adsorbent

In an aspect an activated carbon material is provided that has a predetermined surface area and a predetermined pore size distribution. It has been discovered that the surface area and pore size distribution of the activated carbon material are particularly important to the function of the activated carbon material, in particular when the activated carbon material is used as a gas adsorbent material.

The adsorption properties of a gas adsorbent material may be expressed as any one of at least several quantities including, but not limited to: excess gravimetric adsorption, gravimetric adsorption capacity, and volumetric adsorption capacity. Excess adsorption, as used herein, refers to the difference between the mass of gas adsorbed by an adsorbent material and the mass of an equal volume of non-adsorbed gas; excess adsorption is typically normalized per unit mass of adsorbent. Gravimetric storage capacity, as used herein, refers to the total mass of gas stored by an adsorbent per unit mass of the adsorbent; the total mass of gas stored typically includes the mass of adsorbed gas and additional gas stored within the pores of the adsorbent. Volumetric storage capacity, as used herein, refers to the volume of methane adsorbed and stored within the pore spaces, normalized per unit volume of the adsorbent. Depending on the intended use of the activated carbon material as a gas adsorbent, the structural properties of the adsorbent including, but not limited to, surface area and pore size distribution may influence the adsorption properties of the activated carbon material.

In an aspect, the activated carbon material may be used as a methane adsorbent material. Without being limited to any particular theory, any one or more of at least several structural properties may influence the methane adsorption properties of the activated carbon material including, but not limited to: pore diameter, specific surface area, and porosity of the adsorbent.

Figure 38:
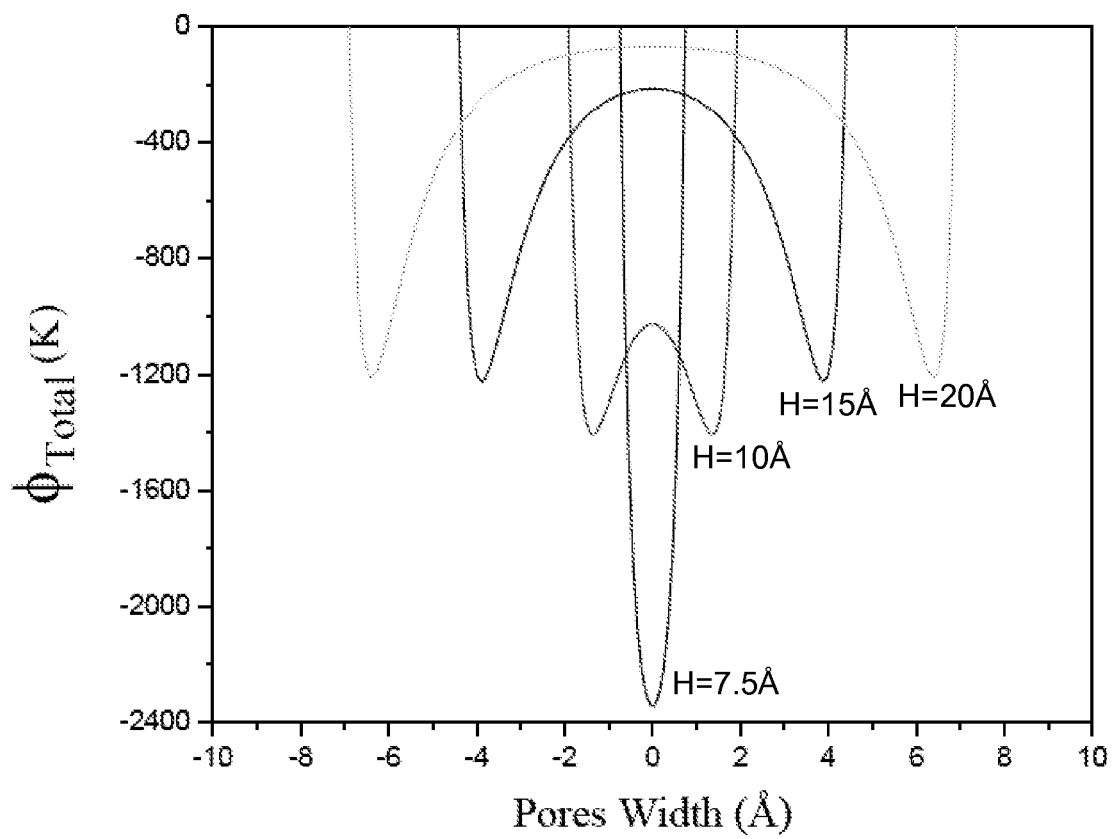
FIG. 38 is a graph summarizing the estimated methane adsorption potentials as a function of pore size and position within the pore.

The methane adsorption may be enhanced in adsorbents with a relatively high volume of pores having pore diameters of less than about 10 Å. The methane binding energy is known to be higher in pores with diameters of less than about 10 Å relative to larger pores with diameters ranging from about 10 Å to about 50 Å due to the overlap and interaction of adsorption potentials of the opposite walls defining the pore volume. FIG. 38 is a graph summarizing the estimated methane binding potential within a single slit-shaped pore of a carbon adsorbent material having a distance between pore walls (corresponding to pore diameter) ranging from 7.5 Å to 20 Å. As illustrated in FIG. 38, the methane binding potential is locally high in the vicinity of the pore wall for all pores, and the binding potentials of the opposite walls interact as a function of the distance between the walls. However, only in the pore with a wall separation distance of 7.5 Å did the potentials of the opposite walls interact to produce a significantly higher binding potential. A higher proportion and/or volume of pores with diameters of less than about 10 Å enhance the overall adsorption potential of the exposed surface of the adsorbent material.

The methane adsorption may be further enhanced in adsorbents with a relatively high specific surface area. This relationship between gas adsorption ability and specific surface area is well known in the art as related to hydrogen gas storage as Chahine's rule. The increased surface area may enhance the wetted contact area between the adsorbent material and the gas to be adsorbed.

The porosity of the activated carbon material may further influence the adsorption ability of the activated carbon material. Porosity, as defined herein, refers to the volume fraction of an adsorbent particle that is occupied by pores. All other characteristics being equal, increasing the porosity of an adsorbent particle results in a decrease in its mass. Gravimetric storage capacity of an adsorbent with higher porosity is enhanced because there is less mass of carbon within each adsorbent particle due to the increased pore volume. Conversely, volumetric storage capacity of an adsorbent with higher porosity is reduced because there is less adsorptive material within the apparent volume of the adsorbent particles.

In an aspect, an activated carbon material with enhanced gravimetric storage capacity may have a relatively high proportion of pores with diameters ranging from about 10 Å to about 50 Å, and correspondingly high porosities. In another aspect, an activated carbon material with enhanced volumetric storage capacity may have a relatively high proportion of pores with diameters below about 10 Å and correspondingly low porosities.

In an aspect, the activated carbon materials may have DFT surface areas in excess of 1500 m$^2$/g. In this aspect, the activated carbon material may have pore volumes in excess of 1 cc/g for pores whose diameters range from about 10 Å to about 50 Å.

In another aspect, the activated carbon material may be a mesoporous material characterized by a DFT surface area greater than 1500 m$^2$/g, a pore volume greater than about 0.6 cc/g for pores with diameters between 10 Å and 50 Å, a pore volume greater than about 0.4 cc/g for pores with diameters between 10 Å and 20 Å, and a distribution of pores such that at least about 20% of the pore volume comprises pores with diameters between 20 Å and 50 Å. In another aspect, the mesoporous material may have a pore volume greater than about 0.8 cc/g for pores whose diameters range from about 10 Å to about 50 Å. In yet another aspect, the mesoporous material may have a pore volume greater than about 1.1 cc/g for pores whose diameters range from about 10 Å to about 50 Å.

In an additional aspect, the activated carbon adsorbent may be a microporous material characterized by relatively high specific surface areas. These microporous material may be further characterized by a nitrogen DFT surface area greater than 2850 m$^2$/g and a pore volume greater than 0.5 cc/g for pores with diameters less than 10 Å. In another aspect, the microporous material may have a pore volume greater than 0.50 cc/g for pores with diameters less than 10 Å. In an additional aspect, the microporous material may have a pore volume greater than 0.70 cc/g for pores with diameters less than 10 Å. In another additional aspect, the microporous material may have a DFT surface area greater than 3100 m$^2$/g.

In another aspect, the activated carbon material may be a volumetric adsorbent material that may maximize the adsorption and storage of a gas on a per-volume basis. In this aspect, the volumetric adsorbent material may be characterized by a DFT surface area greater than about 1500 m$^2$/g; and a 10-20 porosity of greater than about 0.25. 10-20 porosity, as used herein, refers to the volume of pores with diameters between 10 and 20 Å, in cc/g, multiplied by the apparent density, in g/cc. The volumetric adsorbent material may be further characterized by a pore volume greater than about 0.4 cc/g for pores whose diameters range from about 10 Å to about 20 Å, and a distribution of pores such that at least about 30% of the pore volume comprises pores whose diameters range from about 10 Å to about 20 Å. In another aspect, the volumetric adsorbent material may have a 10-20 porosity of greater than about 0.3, and a pore volume greater than about 0.5 cc/g for pores whose diameters range from about 10 Å to about 20 Å. In yet another aspect, the volumetric adsorbent material may further include metals present at a concentration greater than about 10% by weight.

II. Method of Producing Activated Carbon Adsorbent

In various aspects, a multi-step process is to produce the activated carbon materials from a carbon-containing feedstock. The multi-step process may include a charring step that produces a char with a desirable initial micropore and mesopore volume from the carbon-containing feedstock, and a KOH activation step that produces the activated carbon material with a high surface area and predetermined pore size distribution.

FIG. 1 is a block flow illustrating a method 100 of producing the activated carbon adsorbent in an aspect. In this aspect, a feedstock, which may include biomass, may be provided at step 102. The feedstock may be subjected to soaking in an acid solution such as phosphoric acid at step 104. The acid-soaked feedstock may be rinsed and subjected to an initial charring at step 106. The resulting char 108 may be contacted with a base at step 110 and heated to activate the char 108 at step 112. The resulting product may be washed at step 114 to produce the activated carbon 116. Optionally, the washed acid may be recovered for recycle and reuse at step 118 and the washed base may be recovered for recycle at step 120.

In one aspect, the feedstock may be any known carbon-containing material including, but not limited to coal, pitch, and biomass. Non-limiting examples of biomass materials suitable for use as a feedstock to the method 100 include corn cobs; fruit seeds/pits such olive pits and peach pits; coconut shells; cocoa husks; nut shells; and wood products. Prior acid soaking at step 104, the feedstock may be reduced to a particulate form to enhance the exposed surface area of the feedstock to the acid solution. Any known method of reducing the feedstock to a particulate form may be used including, but not limited to grinding, chipping, shredding, and milling. In an aspect, the particle size of the feedstock may range from about 5 mesh to about 100 mesh. In another aspect, the particle size of the feedstock may range from about 20 mesh to about 30 mesh. In general, smaller particle size makes soaking easier at lower temperatures, and ensures that acid reaches the center of the feedstock particles during the acid activation phase.

a. Acid Activation Phase

The compound used in the acid soak may include a dehydrating agent including, but not limited to phosphoric acid, boric acid, sulfuric acid, and zinc chloride. In an aspect, the dehydrating agent is phosphoric acid. Without being limited to any particular theory, phosphoric acid ($H_3PO_4$) has been discovered to react well with the cellulose and lignin contents of the biomass compared to other acids.

The acid concentration in the acid soak may influence the surface area and pore size distribution of the resulting char. Without being limited to any particular theory, higher acid content generally leads to better activation of the lignocellulosic matters of the biomass feedstock. However very high acid contents may result in over-activation and loss of microporosity. In one aspect, the acid concentration in the acid soak may range from about 30% wt to about 80% wt acid in aqueous solution. In other aspects, the acid concentration in the acid soak may range from about 50% wt to about 70% wt acid in aqueous solution, or the acid concentration in the acid soak may be about 70% wt acid in aqueous solution.

The amount of acid in the acid soak may similarly influence the degree of activation, and subsequently the surface area and pore size distribution of the char. In one aspect, the mass ratio of acid to biomass feedstock may range from about 0.2:1 to about 1.5:1. In other aspects, the mass ratio of acid to biomass feedstock may range from about 0.8:1 to about 1.3:1, or the mass ratio of acid to biomass feedstock may range from about 0.9:1 to about 1.1:1.

The soaking temperature at which the acid soaking is performed may further influence the degree of activation of the biomass feedstock. Without being limited to any particular theory, lower soaking temperatures generally ensure that the attack of the acid on the lignin and hemi-cellulose is not excessive and, hence, the structural damage is minimal before the actual temperature of phosphorylation and cross-linking is reached. Higher temperatures may cause structural changes in the biomass before the correct temperature is reached. In one aspect, the soaking temperature may range from about 10° C. to about 100° C. In other aspects, the soaking temperature may range from about 30° C. to about 75° C. or the soaking temperature may be about 30° C.

The soak time of the acid soaking step 104 may similarly influence the degree of activation of the biomass feedstock and structure of the resulting char. In one aspect, the soak time may range from about 2 hours to about 24 hours. In other aspects, the soak time may range from about 8 hours to about 14 hours, or the soak time may be about 12 hours. Without being limited to any particular theory, twelve hours of soaking time generally ensures that the acid reaches the interior of the biomass uniformly.

Upon completion of the acid soaking at step 104 the acid-soaked feedstock may be removed from the acid solution and subjected to charring at step 106. Prior to charring, at least a portion of the excess acid remaining on the feedstock particles may be removed from the biomass feedstock. In one aspect, the acid-soaked feedstock may be contacted and/or washed with water prior to charring. In another aspect, the acid-soaked feedstock may be heated for a period of time to evaporate any residual water and at least a portion of the acid prior to charring. In this aspect, at least a portion of the excess acid may be evaporated from the biomass feedstock by heating to about 170° C. for about two hours.

The charring of the feedstock may be performed by heating the acid-soaked feedstock to a charring temperature under a nitrogen atmosphere and maintaining the feedstock at the charring temperature for a charring time. Various process parameters including, but not limited to the charring temperature, the charring duration, the rate of heating to the charring temperature, and/or the rate of cooling the char may influence the surface area and pore size distribution of the resulting char. In one aspect, the resulting char may have a surface area greater than 900 m$^2$/g and a mesopore volume greater than about 0.3 cc/g.

In one aspect, the charring temperature may range from about 350° C. to about 850° C. In other aspects, the charring temperature may range from about 400° C. to about 600° C., or the charring temperature may be about 450° C. The heating rate may be any rate without limitation. Typically the rate of heating may be relatively slow, but this slow heating rate may not be necessary over entire temperature range. Without being limited to any particular theory, charring of the feedstock may occur even during the heat-up process at temperatures greater than about 300° C. In one aspect, the heating rate may be less than 2° C./min. In another aspect, the heating rate may be less than 0.5° C./min.

Charring time, as used herein, refers to the period of time at which the feedstock is maintained at the charring temperature. In one aspect, the charring time may be less than about 24 hours. In other aspects, the charring time may range from about 0.5 hours to about 3 hours, or the charring time may be about 1.5 hours. Upon completion of the charring, the char may be cooled back to room temperature at any rate without limitation. In one aspect, the char may be cooled at a rate of about of less than about 2° C./min.

The cooled char may be contacted and/or rinsed with water to remove any remaining acid from the char. In one aspect, the char may be arranged in a bed, and water may be trickled through the bed until the effluent water has a pH of 7.

b. Base Activation Phase

The char produced by the acid activation phase may be subjected to a base activation phase to produce the activated carbon material described herein above. In the base activation phase, the char is contacted with an alkaline material and heated to a base activation temperature for an activation time to produce the activated carbon material. The activated carbon material typically has a larger surface area and pore volume relative to the char prior to base activation. It has been discovered that the manipulation of at least one process parameter associated with the base activation phase may result in the formation of an activated carbon material with a predetermined surface area and pore size distribution, as described herein below.

In general, the char is contacted with a base having a pH greater than about 9. Non-limiting examples of suitable bases include metallic hydroxides and metallic carbonates. Non-limiting examples of suitable metallic hydroxides include potassium hydroxide (KOH), sodium hydroxide (NaOH), lithium hydroxide (LiOH), and beryllium hydroxide (BeOH). Non-limiting examples of suitable metallic carbonates include potassium carbonate ($K_2CO_3$) and sodium carbonate ($Na_2CO_3$). In an aspect, the char is contacted with potassium hydroxide (KOH). It has been discovered that base activation of the char using KOH typically produces an activated carbon materials with smaller diameter pores relative to other base compositions.

The char may be contacted with the base in any form without limitation. In one aspect, the char and base may be mixed with a small amount of water to produce a paste with a slurry consistency. In another aspect, the base may be provided in a particulate solid form such as flakes. In this aspect, the char and base may be contacted to form a mixture using any known method of mixing particulate solid materials including, but not limited to: stirring, mixing, blending, tumbling, shaking, vibrating, and ball milling. In another aspect, the mixing method may further reduce the particle size of the char and/or base to enhance the exposed contact areas of the particles in the mixture.

The amount of base in the mixture may be such that the mass ratio of base to char may range from about 0.5:1 to about 6:1 in one aspect. In other aspects, the mass ratio of base to char may range from about 1.5:1 to about 5:1, or from about 2.5:1 to about 4:1.

Referring back to FIG. 1, the activation of the base/char mixture at step 112 may be performed by heating the mixture to an activation temperature in the absence of oxygen, such as with a nitrogen purge, and maintaining the mixture at the activation temperature during an activation time. It has been discovered that the activation temperature, as well as the mass ratio of base to char, may influence the surface area and pore size distribution of the resulting activated carbon material as described herein below.

In one aspect, the activation temperature may range from about 600° C. to about 1000° C. In other aspects, the activation temperature may range from about 700° C. to about 900° C., or the activation temperature may be about 800° C. The heating rate may be any rate without limitation. In one aspect, the heating rate may be range from about 5° C./min to about 15° C./min. In another aspect, the heating rate may range from about 9° C./min to about 10° C./min.

The activation time, as used herein, refers to the period of time at which the char is maintained at the activation temperature. In one aspect, the activation time may range from about 0.1 hours to about 24 hours. In other aspects, the activation time may range from about 0.1 hours to about 3 hours, or the activation time may be about 1 hour. Upon completion of base activation, the resulting activated carbon material may be cooled back to room temperature at any rate without limitation. In one aspect, the activated carbon material may be cooled at a rate of less than about 2° C./min.

The cooled activated carbon material may be contacted and/or rinsed with water to remove any remaining base. In one aspect, the activated carbon material may be arranged in a bed, and water may be trickled through the bed until the effluent water has a pH of 7.

c. Control of Surface Area and Pore Size Distribution

It has been discovered that the degree of base activation may be controlled by the manipulation of two process parameters: activation agent concentration (KOH:C weight ratio) and activation temperature. By controlling the degree of activation, an activated carbon material with a predetermined surface area and pore size distribution may be reliably produced.

Without being limited to any particular theory, the process of KOH activation may be characterized by two main chemical mechanisms. The first mechanism includes the consumption of carbon by oxygen, producing carbon monoxide and carbon dioxide. This first mechanism may be catalyzed by alkali metals. The second mechanism may include the reduction of the KOH to free potassium metal, the penetration and intercalation of the free potassium metal into the carbon lattice of the char, the expansion of the carbon lattice by the intercalated potassium, and the rapid removal of the potassium intercalate from the carbon matrix.

Below 700° C., the main products of KOH activation are hydrogen, water, carbon monoxide (CO), carbon dioxide ($CO_2$), potassium oxide ($K_2O$) and potassium carbonate ($K_2CO_3$). The dehydration of KOH to $K_2O$ is described in Eqn. (I):

$$2KOH \rightarrow K_2O + H_2O \quad (I)$$

Carbon monoxide and carbon dioxide are produced by reactions with water as described in Eqn. (II) and Eqn. (III) below:

$$C + H_2O \rightarrow CO + H_2 \quad (II)$$

$$CO + H_2O \rightarrow CO_2 + H_2 \quad (III)$$

The $K_2O$ produced by the reaction of Eqn. (I) and the CO and $CO_2$ produced by the reactions of Eqn (II) and Eqn. (III), respectively, may react to produce $K_2CO_3$ as described in Eqn (IV):

$$CO_2 + K_2O \rightarrow K_2CO_3 \quad (IV)$$

Above 700° C., metallic potassium may form as described in Eqn. (V) and Eqn. (VI):

$$K_2O + H_2 \rightarrow 2K + H_2O \quad (V)$$

$$K_2O + C \rightarrow 2K + CO \quad (VI)$$

In one aspect, the charred carbon may be activated above 700° C. Without being limited to any particular theory, the metallic potassium formed according to Eqns. (V) and (VI) may penetrate between the graphitic layers of the charred carbon, resulting in intercalated potassium. This intercalated potassium may stretch the carbon lattice structure of the charred carbon, and the subsequent removal of the intercalated potassium may result in an expansion of the pore network within the charred carbon. Additional consumption of carbon by oxygen according to Eqns. (I)-(III) may further expand the pore network. This expansion may correspond to an increase in the surface area and porosity of the resulting activated carbon adsorbent.

In an aspect, the process for making the activated carbon material may include contacting the char with KOH for about one hour at an activation temperature ranging from about 700° C. to about 900° C. and a KOH:C ratio ranging from about 2.5 to about 3.5. In this aspect, the KOH may be provided in a form including, but not limited to KOH flakes, KOH solution, and any combination thereof. The resulting activated carbon material in this aspect may have a total pore volume of at least 1.0 cc/g and a BET surface area of at least about 2000 m$^2$/g if the KOH:C ratio is at least 3.0. In another aspect, if the activation temperature is about 700° C., the activated carbon material may have a % volume of pores of 10 Å diameter or less ranging from about 70% to about 80% for the KOH:C ratio of 2.5 to ranging from about 40% to about 50% for the KOH:C ratio of 3.5. In an additional aspect, if the activation temperature is about 800° C., the activated carbon material may have a % volume of pores of 10 Å diameter or less ranging from about 55% for the KOH:C ratio of 2.5 to about 40% for the KOH:C ratio of 3.5. In another additional aspect, if the activation temperature is about 900° C., the activated carbon material may have a % volume of pores of 10 Å diameter or less ranging from about 50% for the KOH:C ratio of 2.5 to about 30% for the KOH:C ratio of 3.5.

III. Method of Briquettinq Activated Carbon Adsorbent

In various aspects, the activated carbon material, typically produced in a particulate form, may be formed into a monolithic briquette structure. The briquetting process densifies the activated carbon material and provides for monolith-like material useful in applications such as gas storage devices, electrical devices, and fluid processing cartridges. In an aspect, the volumetric gas adsorption capacity of the carbon adsorbent material in briquetted form may be enhanced over the corresponding volumetric gas adsorption capacity in particulate form. Without being limited to any particular theory, the briquetting of a particulate adsorbent material may eliminate or replace interstitial, micrometer-size voids between particles, which typically hold low-density gas, with carbon material that includes nanometer-size pores filled with high-density gas.

The briquettes produced using the method in various embodiments may be any size and shape without limitation. In one aspect, the briquettes may range in height from about 0.25 inches to about 6 inches, and may range in diameter from about 0.25 inches to about 4 inches. In another aspect, the briquettes have a height of about 1 inch and a diameter of about 3.5 inches.

Figure 2:
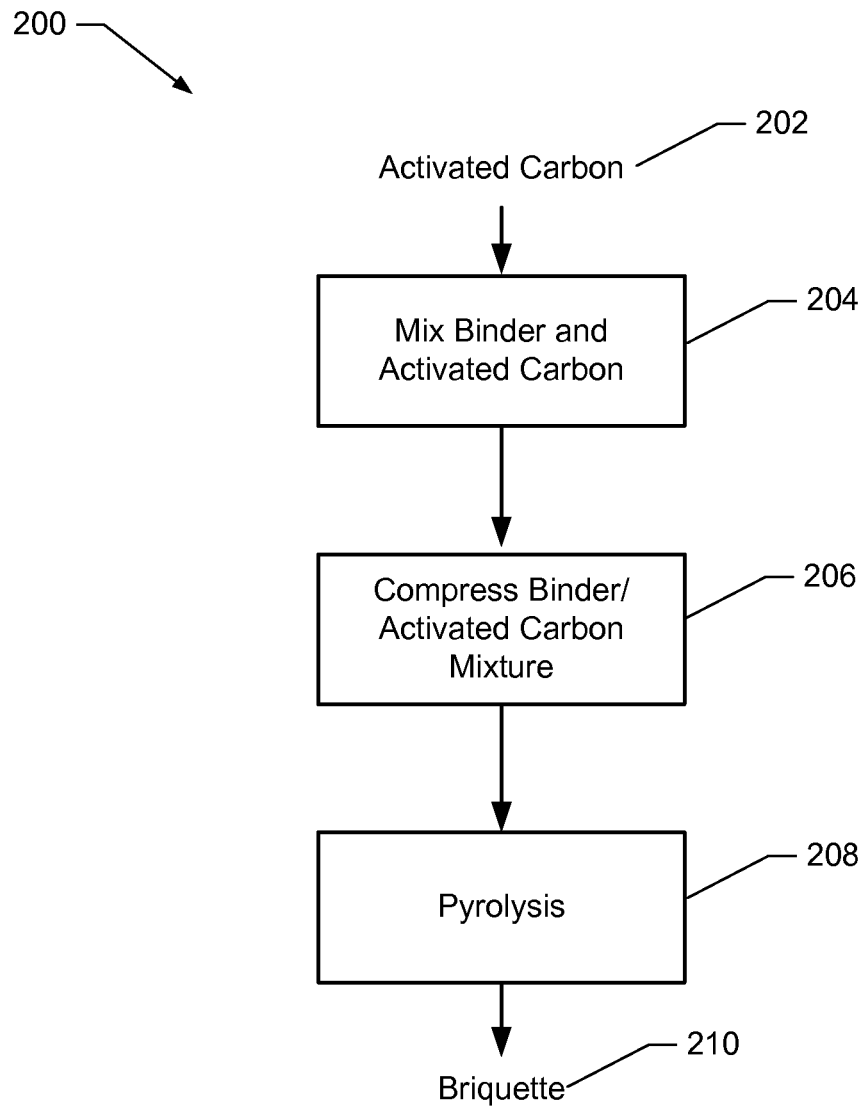
FIG. 2 is a block flow diagram illustrating an alternative synthesis path designed to increase high-surface-area carbon content for producing monolith materials intended for use in gas-storage, fuel tank, and electrical devices.

FIG. 2 is a block diagram illustrating a method 200 of briquetting the activated carbon material. The activated carbon 202 (also referred to herein as "primary carbon") may be mixed with a binder at step 204. The binder/carbon mixture may be compressed at an elevated compression temperature and compression pressure at step 206. The compressed binder/carbon mixture may be subjected to pyrolysis at step 208 to convert the binder into secondary carbon, thereby producing the briquette 210 containing the activated carbon material. In one aspect, the secondary carbon is nonporous and holds the primary carbon particles in a close-packed, mechanically stable configuration. In another aspect, the secondary carbon is porous and acts as adsorbent of additional gas, while holding the primary particles in a close-packed, mechanically stable configuration.

In various aspects, the briquettes may be produced using a batch production process or a continuous production process. For batch production of briquettes, compression of the binder/activated carbon mixture at step 206 may be carried out within a die with an inner diameter equal to the desired briquette diameter, and the compressive force may be applied using a piston of a hydraulic press. Non-limiting examples of suitable hydraulic presses include a 150-ton capacity press. For continuous production of briquettes, compression of the binder/activated carbon mixture at step 206 may be carried out in an extrusion machine.

The elevated compression temperature of step 206 may be implemented and controlled using any one or more of at least several known temperature control devices known in the art. Non-limiting examples of temperature control devices suitable for providing the elevated compression temperature during compression include: electrical heat tape wrapped around a die used in a batch production process; electrical heating elements incorporated into the walls of a die used in a batch production process; and electrical heating elements incorporated into walls of an extrusion machine used in a continuous production process.

In an aspect, pyrolysis of the compressed binder/carbon mixture at step 208 may be carried out in an oven under exclusion of air or oxygen, including, but not limited to: a vacuum oven and an oven under a nitrogen atmosphere or other inert-gas atmosphere.

Non-limiting examples of suitable binder materials include: any known material capable of polymerizing at temperatures above about 100° C. such as modified vegetable oils, adhesives, and thermoplastic polymers such as polyvinylidene chloride. In one aspect, the binder is a modified vegetable oil including, but not limited to modified soybean oil. In this aspect, the vegetable oil may be modified using a bodying process. In one aspect, the bodying process may include heating the vegetable oil at a temperature ranging from about 200° C. to about 400° C. in the absence of oxygen for a sufficient period of time such that the viscosity is increased to at least about 200 cP but less than about 40000 cP. In another aspect, the binder may be polyvinylidene chloride.

The binder and activated carbon material may be contacted to form a mixture using any known method of mixing liquid materials and/or particulate solid materials including, but not limited to: stirring, mixing, blending, tumbling, shaking, vibrating, and ball milling. In another aspect, the mixing method may further reduce the particle size of the activated carbon material to enhance the exposed contact areas of the particles in the mixture. In one aspect, the particle size of the activated carbon material and/or binder particles may range from about 20 mesh to about 100 mesh. In other aspects, the particle size of the activated carbon material and/or binder particles may range from about 40 mesh to about 100 mesh, or may range from about 50 mesh to about 100 mesh. In another additional aspect, the binder may be provided in a liquid form, and the activated carbon material may be added to the liquid binder and mixed in order to evenly disperse and wet the activated carbon particles.

In various aspects, the materials and process conditions may influence any one or more of at least several structural and functional properties of the resulting briquettes. The selection of the particulate activated carbon at step 202 may influence one or more of several material properties of the resulting briquettes including, but not limited to, the volumetric gas adsorption capacity and the gravimetric gas adsorption capacity. The amount of binder included in the binder/carbon mixture at step 204 may influence one or more of at least several material properties of the resulting briquettes including, but not limited to the compression strength of the monolith, the abrasion strength of the monolith, and the density of the monolith structure of the briquette. Without being limited to any particular theory, the addition of binder in relatively high proportion to the binder/carbon mixture may plug pores and decrease micropore volumes within the activated carbon material. In an aspect, the amount of binder in the carbon/binder mixture may range from about 5% wt to about 70% wt. In other aspects, the amount of binder in the carbon/binder mixture may range from about 5% wt to about 30% wt, from about 10% wt to about 40% wt, from about 20% wt to about 50% wt, from about 30% wt to about 60% wt, and from about 40% wt to about 70% wt. In an additional aspect, the amount of binder in the carbon/binder mixture may be about 30% wt. In yet another aspect, the amount of binder in the carbon/binder mixture may be about 55% wt.

The compression temperature and compression pressure at which the carbon/binder mixture is compressed at step 206 may influence the structural and gas adsorptive properties of the resulting briquettes. Without being limited to any particular theory, the compression temperature may be selected to allow the binder to reach the glass transition phase and provide the resulting briquette monoliths with better compressive and abrasive strengths. In an aspect, the compression temperature may range from about 130° C. to about 350° C. In other aspects, the compression temperature may range from about 130° C. to about 180° C., from about 150° C. to about 200° C., from about 180° C. to about 230° C., from about 200° C. to about 250° C., from about 220° C. to about 270° C., from about 250° C. to about 300° C., from about 280° C. to about 320° C., and from about 300° C. to about 350° C. In an additional aspect, the compression temperature may be about 175° C.

In another aspect, the compression pressure may range from about 13000 psi to about 100000 psi. In other additional aspects, the compression pressure may range from about 13000 psi to about 30000 psi, from about 20000 psi to about 40000 psi, from about 30000 psi to about 50000 psi, from about 40000 psi to about 60000 psi, from about 50000 psi to about 70000 psi, from about 60000 psi to about 80000 psi, from about 70000 psi to about 90000 psi, and from about 80000 psi to about 100000 psi. In another additional aspect, the compression pressure may be about 16000 psi. In yet another additional aspect, a compression pressure in excess of 16000 psi may be used.

After the completion of compression at step 206, the compressed binder/carbon mixture may be subjected to pyrolysis at step 208 to convert the binder into secondary carbon. The pyrolysis may be conducted by heating the compressed binder/carbon mixture under a nitrogen atmosphere to a pyrolysis temperature and maintaining this pyrolysis temperature for the duration of a pyrolysis time. In one aspect, the pyrolysis temperature may range from about 600° C. to about 1200° C. In other aspects the pyrolysis temperature may range from about 700° C. to about 900° C., from about 800° C. to about 1000° C., and from about 900° C. to about 1200° C. In another aspect, the pyrolysis temperature may be about 750° C. In an additional aspect, the pyrolysis time may be about one hour at the target pyrolysis temperature. However, the pyrolysis time may vary from about one hour depending on the composition of the binder material selected for use in the method.

The rate of heating the compressed binder/carbon mixture may influence the resulting material properties of the resulting briquette such as the density, compressive strength, and abrasive strength of the monolithic structure. In an aspect, the rate of heating may range from about 0.1° C./min to about 5° C./min. In another aspect, the rate of heating may range from about 0.1° C./min to about 2° C./min. In yet another aspect, the rate of heating may be about 0.1° C./min up to about 500° C., and may be about 1.5° C./min up to about 750° C.

In an aspect, the resulting monolithic briquette structures may be used in electro-chemical applications including, but not limited to batteries and capacitors. In this aspect, activating conditions may be selected to enhance the graphite content of the briquette and binders may be selected to enhance the electrical conductivity of the briquette structure.

IV. Methods of Using Activated Carbon Adsorbent

In various aspects, the activated carbon material and briquettes have a wide variety of surface areas and pore size distributions, rendering an assortment of materials well-suited for many different applications. For example, the volumetric adsorbent materials described herein above may provide enhanced volumetric gas adsorption capacity for applications such as methane storage tanks, hydrogen storage tanks, acetylene storage tanks, capacitors, batteries, and molecular sieves. For example, in an aspect, the activated carbon materials may have DFT surface areas in excess of 2850 m$^2$/g and may therefore provide enhanced performance in applications that include natural gas (methane) storage, hydrogen storage, removing forms of soluble metals from liquids, and cleanup of gases.

In one aspect, the activated carbon material may be used as an adsorbent material for natural gas (methane) adsorption. In this aspect, the micropore volume (volume of pores less than 10 Å diameter) of the activated carbon material may range from about 0.32 cc/g to about 1.2 cc/g and the mesopore volume (volume of pores with 10 Å-50 Å diameters) is greater than about 0.25 cc/g. The activated carbon adsorbent in this aspect may adsorb greater than 15% of its weight in natural gas at 20° C. and a natural gas pressure of 500 psig.

In other aspects, the activated carbon materials may possess particular combinations of surface area, pore volume, and pore size distributions that enhance the suitability of the activated carbon materials for a variety of other applications.

In a second aspect, the activated carbon material may be used in a methane storage tank. In this aspect, the activated carbon material may have a pore volume greater than 1.0 cc/g for pores with diameters between 10 Å and 50 Å.

In a third aspect, the activated carbon material may be used in a hydrogen storage tank. In this aspect, the activated carbon material may have a pore volume greater than 0.5 cc/g for pores with diameters less than 10 Å. In addition, the activated carbon material may contain at least 1% by weight of a metal of atomic weight less than 60. The activated carbon material within the hydrogen storage tank may further incorporate a co-adsorbent compound at a weight percentage greater than 1% with the compound having a pore diameters between 7.5 Å and 12 Å.

In a fourth aspect, the activated carbon material may be used in a separator that separates methane from other gases. In this aspect, the activated carbon material may have a pore volume greater than about 1.0 cc/g for pores with diameters between 10 Å and 50 Å.

In a fifth aspect, the activated carbon material may be used as a volatile organic compound adsorbent. In this aspect, the activated carbon material may have a pore volume greater than 1.2 cc/g for pores with diameters between 10 Å and 50 Å.

In a sixth aspect, the activated carbon material may be used as a water treatment adsorbent to remove organic compounds and/or metals from water. For some water treatment applications the activated carbon material may incorporate greater than 2% by weight of a metal to improve adsorption of targeted materials in the water.

In a seventh aspect, the activated carbon material may be used in a battery. In this aspect, the activated carbon material may have a pore volume greater than 1.0 cc/g for pores with diameters between 10 Å and 50 Å. The activated carbon material in this aspect may further include greater than 5% by weight of a metal selected from the group consisting of lithium, sodium, lead, cobalt, iron, and manganese.

In an eighth aspect, the activated carbon material may be used as a catalyst support in a variety of devices including, but not limited to, fuel cells. In this aspect, the activated carbon material may further include greater than 0.1% by weight of a metal selected from the group consisting of platinum, ruthenium, palladium, copper, chromium, cobalt, silver, gold, and vanadium.

In a ninth aspect, the activated carbon material may be used as an ion exchange material. In this aspect, the activated carbon material may have a pore volume greater than 1.0 cc/g for pores with diameters between 10 Å and 50 Å.

In a tenth aspect, the activated carbon material may be used in a molecular sieve. In this aspect, the activated carbon material may have a pore volume greater than about 0.50 cc/g for pores with diameters less than about 10 Å.

In an eleventh aspect, the activated carbon material may be used in an acetylene storage tank. In this aspect, the activated carbon material may have a pore volume greater than about 0.7 cc/g for pores with diameters between about 10 Å and about 15 Å.

In a twelfth aspect, the activated carbon material may be used in an electrical capacitor. In this aspect, the activated carbon material may have a BET surface area greater than about 2500 m$^2$/g.

DEFINITIONS

To facilitate understanding of the invention, several terms are defined below.

An "activated carbon," as used herein, refers to a char that has undergone a second heat treatment method (>300° C.) to increase surface area.

The "BET surface area" is computed from Brunauer-Emmett-Teller (BET) analysis of a nitrogen adsorption isotherm.

The term "biomass", as used herein refers to recent organic matter, wherein "recent" generally means that it was produced as a direct or indirect result of photosynthesis within the past 10 years. Carbon-14 dating methods may be used to identify whether or not a carbon material is from biomass versus fossil fuels.

The phrase "biomass-based material" refers to a material that was made from biomass by manmade chemical or thermal processes.

The term "char," as used herein, refers to a biomass that has been heat treated (>300° C.) one time to produce a material with a DFT surface area greater than about 900 m2/g.

The "DFT surface area" is computed from density functional theory (DFT) analysis of a nitrogen adsorption isotherm.

As used herein, a "mesopore" refers to a pore with a diameter from about 20 Å to about 500 Å.

As used herein, a "micropore" refers to a pore with a diameter less than about 20 Å.

The term "10-20 porosity," as used herein, refers to the volume of pores with diameters between 10 Å and 20 Å, in cc/g, multiplied by the apparent density, in g/cc. The term "7.5-20 porosity," as used herein, refers to the volume of pores with diameters between 7.5 Å and 20 Å, in cc/g, multiplied by the apparent density, in g/cc.

As various changes could be made in the above-described materials and processes without departing from the scope of the invention, it is intended that all matter contained in the above description and the examples presented below, shall be interpreted as illustrative and not in a limiting sense.

REFERENCE

1. Mullen C A et al 2010. "Bio-oil and bio-char production from corn cobs and stover by fast pyrolysis". *Biomass Bioenergy* 34:67-74.

EXAMPLES

The following examples illustrate various aspects of the invention.

Example 1

Preparation and Characterization of Preferred Carbon Samples

A series of experiments were carried out to demonstrate the impact of different parameters (e.g., phosphoric acid treatment and KOH activation) on the final carbon pore volume, pore size distribution, and surface area. For purposes of clarity, the carbon materials prior to base (preferably KOH) activation are referred to as char and after base activation as activated carbon.

Dried crushed corncobs were mixed with different concentrations of phosphoric acid ranging from 0-70% by volume in the weight ratio of 1:1.5 (grams corn cob: grams phosphoric acid/water solution). This is about a 0.8:1 ratio of acid mass to corn cob mass on a water-free basis. The corn cobs were soaked at different temperatures in phosphoric acid for about 8-10 hrs. After that, the excess of phosphoric acid was removed by heating the mixture at 165-175° C. for 2 hrs. Then the soaked corncobs were carbonized at a constant temperature in the range 400-800° C. for 1 hour in nitrogen atmosphere to form a char. After carbonization, the char was washed thoroughly with water until the effluent has a pH of about 7 to remove the excess acid.

In order to get higher pore volumes and higher surface areas the char obtained by phosphoric acid was further treated. The char was mixed with varying amounts of KOH flakes and water to form a slurry. This slurry was then heated to temperatures between 700 to 900° C. in an inert atmosphere (e.g., under nitrogen) for one hour. The final product was then washed thoroughly with water until the effluent had a pH of about 7 to remove potassium solids formed during the reaction. KOH activation of the char formed an activated carbon.

The characterization of all the char/carbon produced was done with N2 adsorption at 77 K using the Autosorb 1-C instrument from Quantachrome. Analysis of isotherms was carried out by applying various methods to obtain different information. The BET equation was used to get the BET surface area from the N2 isotherm. The T-method was used to find the micropore volume and the external surface area of the mesoporous fraction from the volume of N2 adsorbed up to the P/P0=0.0315. The DFT method was used to estimate surface area as a function of pore size, while the BET method was used to report total surface area. Unless otherwise reported, these parameters were used in preparing the activated carbon.

Table 1 summarizes the preparation, characterization, and performance of several embodiments of this invention. For methane storage, the preferred samples had excess methane adsorption greater than 170 g/kg (grams of methane per kilogram of activated carbon). The more preferred samples also had a volume-for-volume methane storage capacity greater than 160 V/V.

To perform the methane uptake analysis, a cylindrical pressure vessel of approximately 10 cc in volume was packed to approximately 85% full with a measured mass of carbon. The vessel was closed and subjected to about 0.02 bars absolute pressure (vacuum) for 4 hours at a temperature of 140° C. The mass change due to being subjected to vacuum was measured and the mass of carbon in the container was reduced based on this change. The cylinder was then pressured to 500 psig with methane at 20° C. for an hour to allow equilibration with the pressure and temperature. The mass increase from the vacuum state to equilibrium at these conditions was measured. The mass of the methane uptake minus the amount of mass of methane in the void space in the vessel was divided by the mass of the carbon to obtain the excess adsorption of methane per mass of carbon.

TABLE 1

Preparation conditions, performances, and properties of activated carbon samples with best performances.

| Sample Name | Ba5.32 | S-33/k | S-52 | S-59 | S-58 | Ba5.31 | S-62 |
|---|---|---|---|---|---|---|---|
| Alt. Name | | | KC2.5 | KC3 | KOH-HTT5 | KOH-HTT4 | |
| Feed | Corn Cob | Corn Cob | Corn Cob | Corn Cob | Corn Cob | Corn Cob | Corn Cob |
| Acid Conc. | 0.516 | | 0.5 | 0.5 | 0.5 | 0.516 | |
| Soak T (° C.) | 45 | 80 | 50 | 50 | 50 | 45 | 50 |
| Acid:Feed (g:g) | 0.8 | 0.8 | 0.8 | 0.8 | 0.8 | 0.8 | 1 |
| Char T (° C.) | 450 | 450 | 480 | 480 | 480 | 450 | 480 |
| Base:Char (g:g) | 4 | 2.5 | 3 | 3 | 3 | 4 | 4 |
| Activation time | 1 hr | | 1 hr | 1 hr | 1 hr | 1 hr | |
| Activation T (° C.) | 790 | 790 | 800 | 900 | 850 | 790 | 790 |
| Methane Storage (20° C., 500 psig) | | | | | | | |
| Excess Ads (g/kg)[a] | 197 | 193 | 193 | 186 | 179 | 176 | 175 |
| Total Ads g/kg[b] | 247 | 224 | 241 | 251 | 238 | 228 | 220 |
| Total Ads in g/l[b] | 95 | 130 | 100 | 100 | 83 | 89 | 96 |
| Total Ads in V/V[c] | 145 | 199 | 153 | 152 | 127 | 136 | 146 |
| BET[d] SA1) [m²/g] | 3173 | 2129 | 2997 | 2932 | 3421 | 2939 | 3010 |
| DFT[e] SA2) <360 Å [m²/g] | 2153 | 2149 | 2788 | 1934 | 2394 | 1852 | 2360 |
| DFT[e] SA2) <7.5 Å [m²/g] | 543 | 954 | 1292 | 442 | 570 | 422 | 838 |
| Porosity | 0.81 | 0.71 | 0.79 | 0.80 | 0.83 | 0.81 | 0.78 |
| Apparent Density[f] (g/cc) | 0.38 | 0.58 | 0.41 | 0.40 | 0.35 | 0.39 | 0.44 |
| Pore Vol <7.5 Å [cc/g] | 0.16 | 0.26 | 0.38 | 0.13 | 0.17 | 0.12 | 0.24 |
| Pore Vol <10 Å [cc/g] | 0.24 | 0.39 | 0.52 | 0.20 | 0.27 | 0.18 | 0.34 |
| Pore Vol <16 Å [cc/g] | 0.62 | 0.81 | 0.92 | 0.49 | 0.69 | 0.45 | 0.77 |
| Pore Vol <20 Å [cc/g] | 0.86 | 0.96 | 1.15 | 0.66 | 0.87 | 0.64 | 0.98 |
| Pore Vol <36 Å [cc/g] | 1.51 | 1.05 | 1.47 | 1.41 | 1.67 | 1.44 | 1.48 |
| Pore Vol <50 Å [cc/g] | 1.66 | 1.06 | 1.56 | 1.72 | 2.00 | 1.59 | 1.56 |
| Pore Vol <360 Å [cc/g] | 1.87 | 1.09 | 1.72 | 1.85 | 2.16 | 1.83 | 1.62 |
| Total Pore Vol Direct from Isotherm [cc/g] | 2.11 | 1.22 | 1.91 | 2.02 | 2.37 | 2.07 | 1.80 |
| Pore Vol (3-10 Å)[g] | 0.24 | 0.39 | 0.52 | 0.20 | 0.27 | 0.18 | 0.34 |
| Pore Vol (7.5-16 Å) | 0.46 | 0.56 | 0.55 | 0.36 | 0.52 | 0.33 | 0.52 |
| Pore Vol (10-20 Å) | 0.62 | 0.57 | 0.63 | 0.45 | 0.60 | 0.46 | 0.64 |
| Pore Vol (10-50 Å) | 1.42 | 0.67 | 1.04 | 1.52 | 1.73 | 1.41 | 1.22 |
| 7.5-20 Porosity[h] | 0.27 | 0.41 | 0.32 | 0.21 | 0.25 | 0.20 | 0.32 |
| 10-20 Porosity[h] | 0.24 | 0.33 | 0.26 | 0.18 | 0.21 | 0.18 | 0.28 |
| Percent Pores at 20-50 Å | 37.7 | 8.8 | 21.2 | 52.7 | 47.4 | 46.0 | 32.2 |
| Percent Pores at 10-20 Å | 29.5 | 46.3 | 33.0 | 22.3 | 25.5 | 22.3 | 35.7 |
| Percent Pores <50 Å | 78.5 | 87.0 | 81.3 | 85.1 | 84.4 | 77.0 | 86.8 |

| Sample Name | B-21/k | Ba5.2 | S-56 | S-55 | Ba5.1 | S-36 | S-30 |
|---|---|---|---|---|---|---|---|
| Alt. Name | | | KOH-HTT2 | KOH-HTT1 | | | |
| Feed | Corn Cob | Corn Cob | Corn Cob | Corn Cob | Corn Cob | PVDC Latex | Saran |

TABLE 1-continued

Preparation conditions, performances, and properties of activated carbon samples with best performances.

| | | | | | | | |
|---|---|---|---|---|---|---|---|
| Acid Conc. | | 0.516 | 0.5 | 0.5 | 0.516 | | |
| Soak T (° C.) | 80 | 45 | 50 | 50 | 45 | | |
| Acid:Feed (g:g) | 0.8 | 0.8 | 0.8 | 0.8 | 0.8 | | |
| Char T (° C.) | 450 | 450 | 480 | 480 | 450 | | |
| Base:Char (g:g) | 2.5 | 3 | 3 | 3 | 2 | | |
| Activation time | | 1 hr | 1 hr | 1 hr | 1 hr | 1 hr | 1 hr |
| Activation T (° C.) | 790 30% binder | 790 | 750 | 700 | 790 | 750 | 750 |
| Methane Storage (20° C., 500 psig) | | | | | | | |
| Excess Ads (g/kg)[a] | 170 | 158 | 146 | 141 | 135 | 77 | 74 |
| Total Ads g/kg[b] | 205 | 195 | 195 | 173 | 182 | 87 | 84 |
| Total Ads in g/l[b] | 108 | 99 | 79 | 98 | 76 | 94 | 93 |
| Total Ads in V/V[c] | 165 | 151 | 121 | 150 | 117 | 143 | 142 |
| BET[d] SA1) [m$^2$/g] | 2243 | 2256 | 3175 | 1988 | 2556 | 660 | 591 |
| DFT[e] SA2) <360 Å [m$^2$/g] | 2106 | 2089 | 3484 | 2167 | 3158 | 954 | 1062 |
| DFT[e] SA2) <7.5 Å [m$^2$/g] | 987 | 931 | 2095 | 1282 | 2164 | 796 | 895 |
| Porosity | 0.74 | 0.75 | 0.80 | 0.72 | 0.79 | 0.46 | 0.45 |
| Apparent Density[f] (g/cc) | 0.53 | 0.51 | 0.41 | 0.57 | 0.42 | 1.07 | 1.10 |
| Pore Vol <7.5 Å [cc/g] | 0.29 | 0.27 | 0.61 | 0.37 | 0.63 | 0.23 | 0.22 |
| Pore Vol <10 Å [cc/g] | 0.39 | 0.38 | 0.77 | 0.43 | 0.76 | 0.25 | 0.25 |
| Pore Vol <16 Å [cc/g] | 0.71 | 0.72 | 1.16 | 0.75 | 0.98 | 0.28 | 0.28 |
| Pore Vol <20 Å [cc/g] | 0.88 | 0.87 | 1.32 | 0.85 | 1.03 | 0.29 | 0.28 |
| Pore Vol <36 Å [cc/g] | 1.09 | 1.09 | 1.56 | 0.97 | 1.26 | 0.33 | 0.31 |
| Pore Vol <50 Å [cc/g] | 1.16 | 1.17 | 1.64 | 1.02 | 1.39 | 0.36 | 0.34 |
| Pore Vol <360 Å [cc/g] | 1.26 | 1.31 | 1.78 | 1.13 | 1.69 | 0.39 | 0.38 |
| Total Pore Vol Direct from Isotherm [cc/g] | 1.40 | 1.47 | 1.97 | 1.26 | 1.88 | 0.43 | 0.41 |
| Pore Vol (3-10 Å)[g] | 0.39 | 0.38 | 0.77 | 0.43 | 0.76 | 0.25 | 0.25 |
| Pore Vol (7.5-16 Å) | 0.42 | 0.45 | 0.55 | 0.38 | 0.36 | 0.05 | 0.06 |
| Pore Vol (10-20 Å) | 0.49 | 0.49 | 0.55 | 0.42 | 0.27 | 0.04 | 0.04 |
| Pore Vol (10-50 Å) | 0.77 | 0.79 | 0.87 | 0.59 | 0.64 | 0.11 | 0.09 |
| 7.5-20 Porosity[h] | 0.32 | 0.30 | 0.29 | 0.27 | 0.17 | 0.07 | 0.07 |
| 10-20 Porosity[h] | 0.26 | 0.25 | 0.22 | 0.24 | 0.11 | 0.05 | 0.04 |
| Percent Pores at 20-50 Å | 20.0 | 20.1 | 16.1 | 13.6 | 19.4 | 15.3 | 13.4 |
| Percent Pores at 10-20 Å | 35.1 | 33.4 | 28.2 | 33.4 | 14.5 | 9.8 | 8.8 |
| Percent Pores <50 Å | 83.3 | 79.2 | 83.2 | 81.3 | 74.0 | 82.9 | 83.6 |

[a]Excess adsorption, $m_{ads,e}$, denotes the difference between the mass of methane adsorbed and the mass of an equal volume of non-adsorbed methane. Excess adsorption depends only on the surface area and how strongly the surface adsorbs methane; i.e., excess adsorption does not depend on the pore volume of the sample.
[b]The amount stored, $m_s$, denotes the total mass of methane present in the pore space (adsorbed plus non-adsorbed methane). It was computed from excess adsorption as $m_s/m_s = m_{ads,e}/m_s + (\rho_a^{-1} - \rho_s^{-1})\rho_{methane}$, where $m_s$ denotes the mass of the sample, $\rho_a$ denotes the apparent density of the sample, $\rho_s$ denotes the skeletal density of the sample, and $\rho_{methane}$ denotes the density of bulk methane at the given temperature and pressure. The gravimetric storage capacity, $m_s/m_s$, increases if the apparent density, $\rho_a$, decreases. The volumetric storage capacity, $\rho_a m_s/m_s$, decreases if $\rho_a$ decreases.
[c]The volume-for-volume storage capacity, V/V, was computed as the amount stored, expressed as volume of methane at 25° C. and atmospheric pressure, per volume of sample, $\rho_a m_s$.
[d]Computed from Brunauer-Emmett-Teller (BET) analysis of the nitrogen adsorption isotherm.
[e]Computed from density functional theory (DFT) analysis of the nitrogen adsorption isotherm.
[f]Apparent density, $\rho_a$, denotes the density of the sample including the pore space and was computed from $\rho_a = (V_{pore}/m_s + \rho_s^{-1})^{-1}$, where $V_{pore}$ denotes the total pore volume of the sample, $m_s$ denotes the mass of the sample, and $\rho_s$ denotes the skeletal density of the sample (density of the sample without the pore space).
[g]The lower limit of 3 Å is implied as a result of nitrogen being used to evaluate porosity. The instrument's software reported this value as <7.5 Å.
[h]10-20 porosity is defined as the volume of pores with diameters between 10 and 20 Å, in cc/g, multiplied by the apparent density, in g/cc. The 7.5-20 porosity is defined as the volume of pores with diameters between 7.5 and 20 Å, in cc/g, multiplied by the apparent density, in g/cc.

Example 2

Parametric Studies on Charring Process

Table 2 summarizes the parametric study results on charring with phosphoric acid using 40-60 mesh corn cob stock. The C-series demonstrates the impact of phosphoric acid concentration in which higher concentrations of phosphoric acid lead to higher surface areas for the char that is produced. This charring step consistently produces a char with a BET surface area of at least 900 m2/g.

The ST-series demonstrates the impact of acid soaking temperature. Soak temperatures greater than 80° C. dramatically decreased the BET surface area and increased char density.

The HTT-series demonstrates the impact of charring temperature in which exceeding higher charring temperatures results in decreased micropore volumes and decreased surface areas. Charring temperatures near 450° C. consistently produced a char with a BET surface area of at least 900 m2/g. Charring temperatures above about 450° C. decreased surface areas and micropore volumes.

The N-series re-evaluates the impact of charring temperature at the narrower range of temperatures of 400, 450, and 500° C. and with subsequent KOH activation. Process parameters included: 80% phosphoric acid, 1.5 g/g ratio of acid to feedstock, soaking at 80° C. for 24 hours, heating at 1.5° C./min to the indicated charring temperatures, charring for 1.5 hours at the indicated temperatures, a KOH:char ratio of 2 g/g, heating at maximum oven rate to the activation temperature, activation at 790° C. for 1 hour, cooling overnight, and washing with water to a neutral pH in a vacuum-drawn filter. The mass of carbon for methane uptake studies was at near-constant volume—the higher charring temperatures resulted in higher density carbons. Thus, while excess adsorption (g/g) was nearly constant over the 400-500° C. range, the V/V storage capacity increased with increasing temperature.

The RH-series demonstrates the impact of heating rate. Charring rates above about 0.5° C./min decreased surface areas and micropore volumes.

TABLE 2

Results of parametric study on charring conditions.

| Sample | % of $H_3PO_4$ Solution | Temperature of Charring ° C. | Rate of Heating ° C./min | Temperature of Soaking ° C. | BET Surface Area $m^2/g$ | Micropore Volume cc/g |
|---|---|---|---|---|---|---|
| Impact of Phosphoric Acid Concentration: C-Series |||||||
| C-1 | 30 | 450 | 1.0 | 40 | 934 | 0.252 |
| C-2 | 50 | 450 | 1.0 | 40 | 986 | 0.278 |
| C-3 | 70 | 450 | 1.0 | 40 | 1195 | 0.315 |
| Impact of Acid Soak Temperature: ST-Series |||||||
| ST-1 | 50 | 450 | 1.0 | 30 | 1520 | 0.174 |
| ST-2 | 50 | 450 | 1.0 | 80 | 1017 | 0.164 |
| ST-3 | 50 | 450 | 1.0 | 85 | 691 | 0.089 |
| Impact of Charring Temperature: HTT-Series |||||||
| HTT-1 | 50 | 450 | 1.0 | 50 | 910 | 0.197 |
| HTT-2 | 50 | 650 | 1.0 | 50 | 826 | 0.052 |
| HTT-3 | 50 | 800 | 1.0 | 50 | 802 | 0.047 |
| HTT-4 | 50 | 850 | 1.0 | 50 | 424 | 0.073 |

Impact of Charring Temperature: N-Series

| Sample | Temperature of Charring ° C. | Mass Carbon in Chamber | Methane Uptake (excess adsorption) g/100 g |
|---|---|---|---|
| N-4.2-2 | 400 | 1.26 | 0.159 |
| N-2-2 | 450 | 2.75 | 0.166 |
| N-3-2 | 500 | 2.55 | 0.163 |

TABLE 2-continued

Results of parametric study on charring conditions.

Impact of Heating Rate: RH-Series

| Sample | % of $H_3PO_4$ Solution | Temperature of Charring ° C. | Rate of Heating ° C./min | Temperature of Soaking ° C. | BET Surface Area $m^2/g$ | Micropore Volume cc/g |
|---|---|---|---|---|---|---|
| RH-1 | 50 | 450 | 0.5 | 80 | 1135 | 0.145 |
| RH-2 | 50 | 450 | 1 | 80 | 754 | 0.124 |
| RH-3 | 50 | 450 | 1.5 | 80 | 637 | 0.115 |

Example 3

Parametric Studies on Activation Process

Table 3 summarizes parametric study results on activation with KOH. The default process conditions of Example 1 apply.

Figure 3:
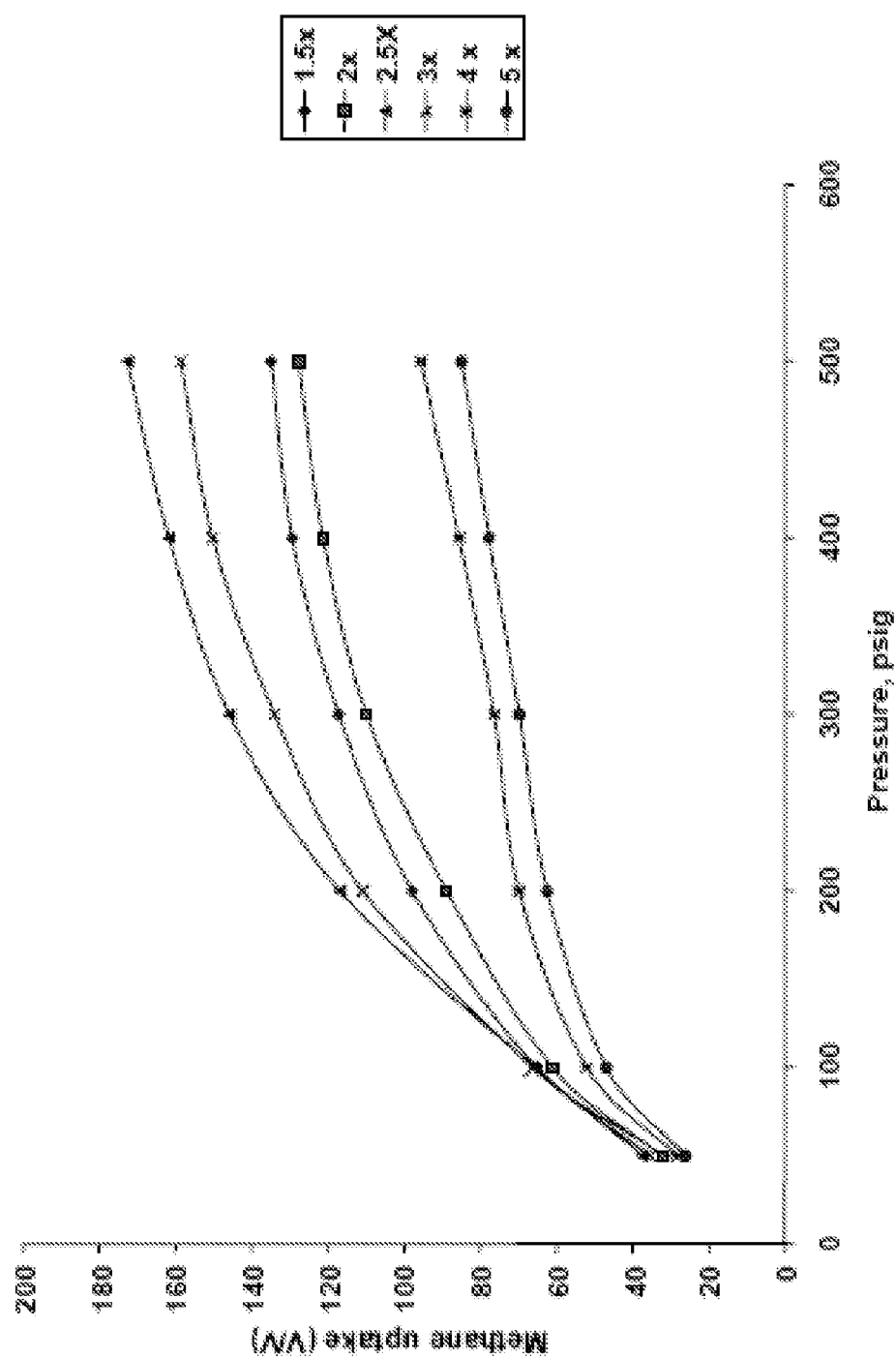
FIG. 3 is a graph summarizing volume-for-volume methane storage isotherms for activated carbon prepared with different rates of base treatment in the base activation step. Uptake is at 20° C.
Figure 4:
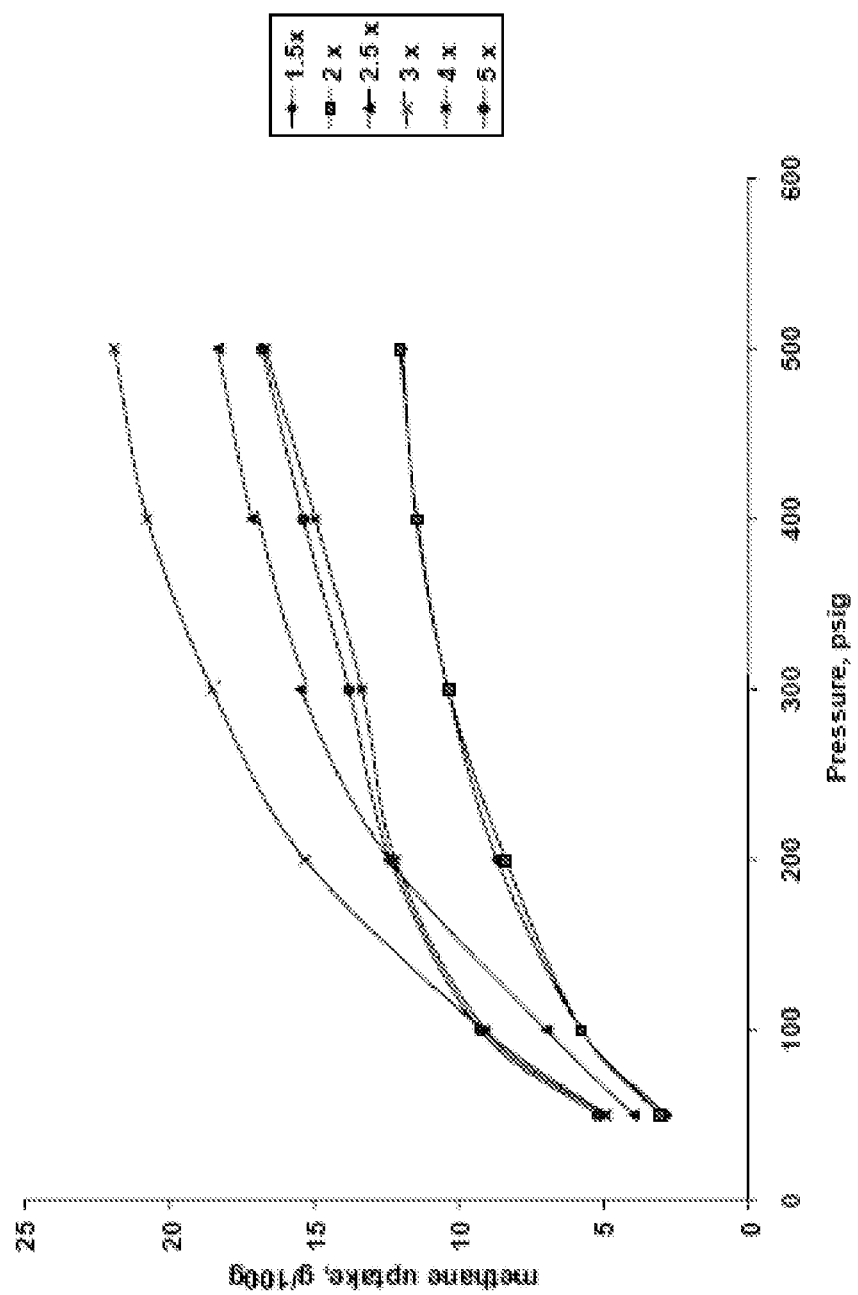
FIG. 4 is a graph summarizing gravimetric methane storage isotherms for activated carbon prepared with different rates of base treatment in the base activation step. Uptake is at 20° C.
Figure 5:
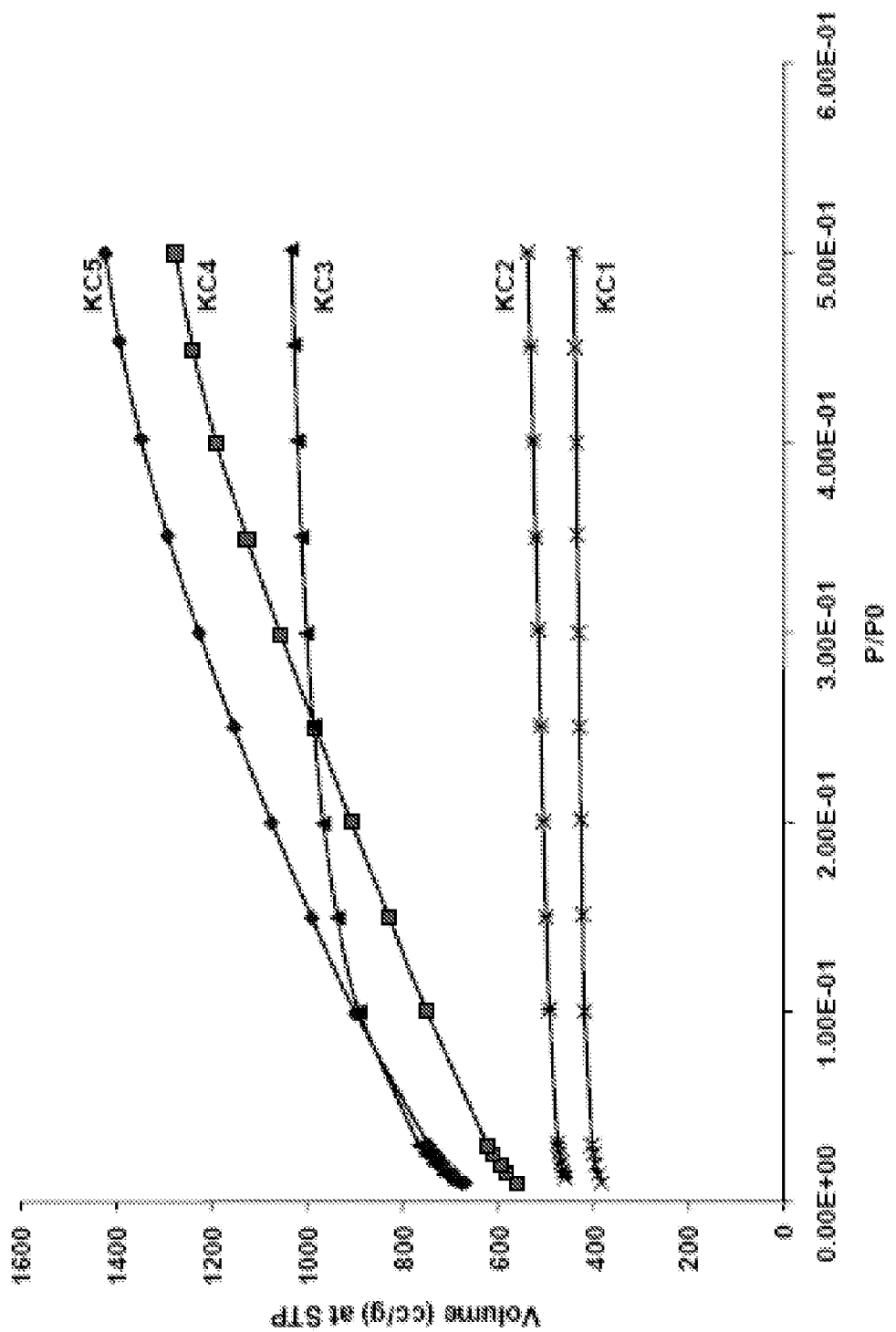
FIG. 5 is a graph summarizing nitrogen isotherms for activated carbon prepared at different rates of base treatment in base activation step. Uptake is at 77 K.

The KC-series demonstrates how KOH:char ratios in excess of 2.0 may be used to attain BET surface areas in excess of 3000 m2/g. Density decreased with increasing KOH:char ratios. Micropore volume decreased at KOH:char ratios greater than 3.0. The samples were activated at a temperature of 800° C. for 1 hour. The char used for this activation was soaked with 50% phosphoric acid at 50° C. for 8 hours, charred at 450° C., and heated to charring temperature at 1° C./min. FIGS. 3, 4, and 5 illustrate the impact of pressure (methane and nitrogen) on adsorption.

Figure 6:
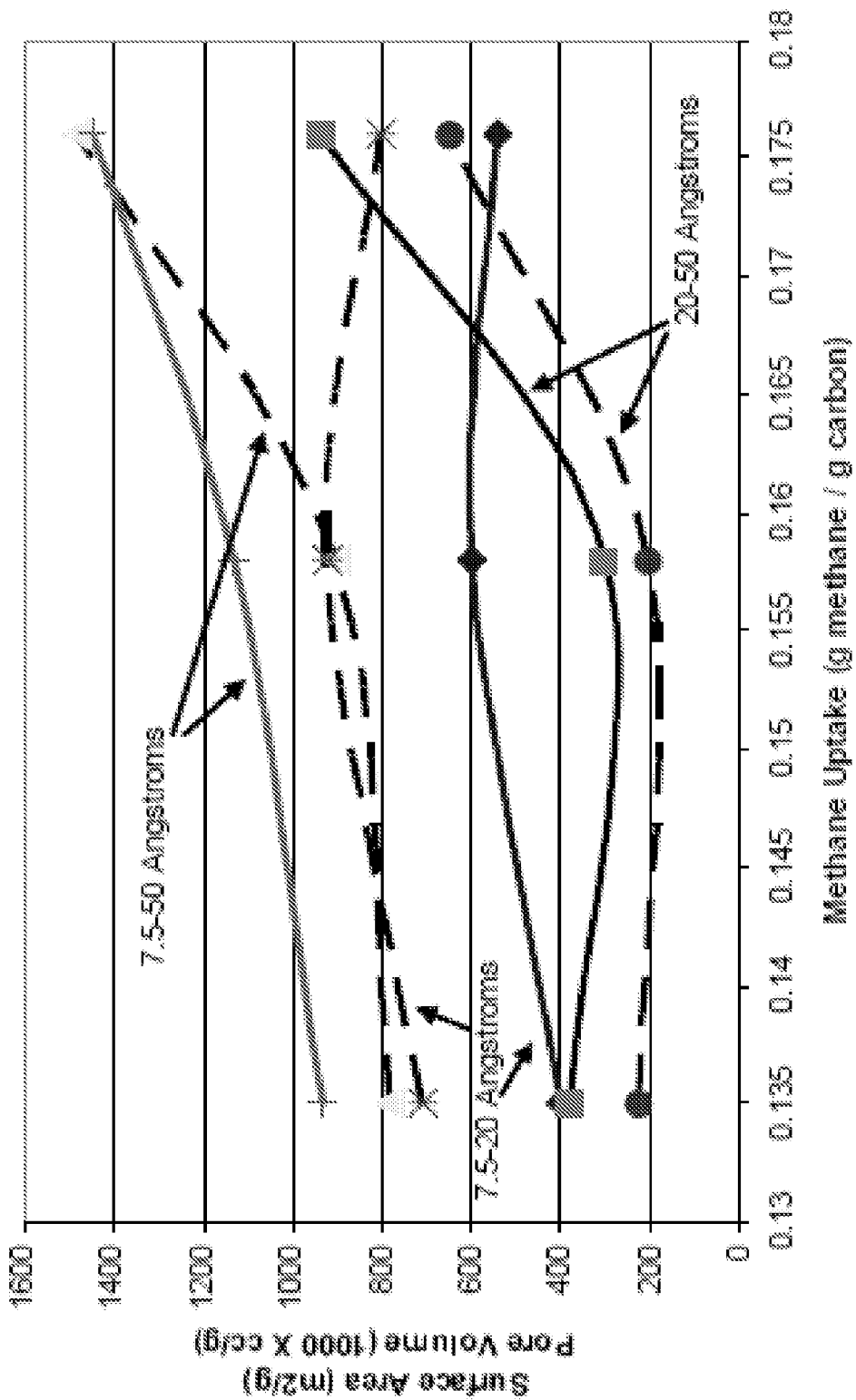
FIG. 6 is a is a graph summarizing the impact of pore volume and surface area on methane adsorption.

The Ba-series re-evaluates the KOH:char ratios with an emphasis on methane uptake. Preparation conditions in addition to those listed in Table 1 included use of 20-40 mesh corn cob feedstock, a 24 hr soak time, heating at 1.5° C./min to the charring temperature, a 1.5 hr charring time, grinding to 40 mesh after charring, cooling overnight in the oven, and KOH activation at 790° C. for 1 hour. FIG. 6 graphically correlates the pore volumes and BET surface areas with methane uptake and conclusively demonstrates the importance of pores with diameters between 20 and 50 Å on excess methane adsorption. The greater the amount of KOH, the greater the amount of carbon lost as vapor during activation. Based on the correlation of FIG. 6, methane uptake for the embodiments of this invention correlated best with the volume of pores with diameters between 7.5 and 50 Å. This finding is different than literature assumptions and/or findings that do not consider pore diameters greater than 20 Å to be of prominence in providing methane uptake. Based on critical molecule diameters, pore volumes between about 6 and 30 Å are the most important for methane uptake at 500 psig and 20° C. Higher storage pressures would make more effective use of the larger pore diameters.

The KOH-HTT-series demonstrates the impact of activation temperature on activated carbon properties. The acid soak was for 8 hours and was heated to charring temperature at 1° C./min. Density decreased with increasing activation temperatures. A maximum in activated carbon BET surface area and total pore volume corresponded to an activation temperature near 850° C. Combined, the optimal values of the critical parameters summarized in the tables define a path through which a biomass such as corn cobs may be converted to an activated carbon with BET surface areas in excess of 3000 m2/g.

TABLE 3

Results of parametric study on activation conditions.

Impact of KOH:Char Ratio: KC-Series

| Sample | KOH × C | BET Surface Area m²/g | Micropore Volume cc/g | Mesopore Volume cc/g | Total Pore Volume cc/g | Particle Density g/cc | Methane Uptake V/V |
|---|---|---|---|---|---|---|---|
| KC1 | 1.5 | 1314 | 3.38E−01 | 0.21 | 0.55 | 0.74 | 135 |
| KC2 | 2 | 1724 | 4.90E−01 | 0.19 | 0.68 | 0.69 | 128 |
| KC3 | 3 | 2997 | 1.16E+00 | 0.66 | 1.72 | 0.47 | 159 |
| KC4 | 4 | 3347 | 5.14E−01 | 1.68 | 2.03 | 0.37 | 96 |
| KC5 | 5 | 3837 | 1.52E−01 | 1.86 | 2.01 | 0.33 | 85 |

Impact of KOH:Char Ratio: Ba-Series

| Sample | Methane Uptake Corrected for Void Space (g/100 g carbon) | Methane Uptake (V/V) | Ratio of KOH:Char used in Preparation (g:g) | Ratio of Activated Carbon Produced to Char Consumed |
|---|---|---|---|---|
| Ba-5.1 | 13.5 | 132 | 2 | 0.556 |
| Ba-5.2 | 15.8 | 150 | 3 | 0.452 |
| Ba-5.31* | 17.6 | 163 | 4 | 0.374 |
| Ba-5.32 | 19.7 | 179 | 4 | 0.398 |
| Ba-5.4 | 16.8 | 157 | 5 | 0.402 |

Impact of Activation Temperature: KOH-HTT-Series

| Sample | Activation T °C. | BET Surface Area m²/g | Micropore Volume cc/g | Mesopore Volume cc/g | Total Pore Volume cc/g | Methane Uptake V/V | Piece Density g/cc |
|---|---|---|---|---|---|---|---|
| KOH-HTT1 | 700 | 1988 | 8.19E−01 | 0.31 | 1.14 | 156 | 0.60 |
| KOH-HTT2 | 750 | 3175 | 1.29E+00 | 0.49 | 1.78 | 156 | 0.58 |
| KOH-HTT3 | 800 | 2997 | 1.16E+00 | 0.66 | 1.82 | 159 | 0.47 |
| KOH-HTT4 | 850 | 3421 | 3.39E−01 | 1.82 | 2.16 | 140 | 0.40 |
| KOH-HTT5 | 900 | 2932 | 0.5E−01 | 1.80 | 1.85 | 139 | 0.35 |

*Ba-5.31 was prepared without a nitrogen purge during most of the activation step.

Example 4

Control Studies with Darco Carbon

The commercial carbons Darco G-60 (24, 227-6, a 100 mesh carbon) and Darco B (27, 810-6) were evaluated for comparison to the carbons of this invention and were prepared in accordance to the carbons of this invention. These commercial products had particle sizes of 100-325 mesh and reported BET surface areas of 600 and 1500 m2/g, respectively.

The Darco G-60 was activated at KOH:carbon ratios of 0, 2, 2.25, and 2.5 under nitrogen flow at 790° C. After the activation each sample was washed in a Buchner funnel until neutral. The respective excess adsorption (g/kg) was 22.2, 85.2, 63.4, and 28.2. The respective bulk densities were 0.149, 0.206, 0.300, and "unknown", respectively. The Darco B product adsorbed methane at 57.4 g/kg.

By comparing the surface areas of the Darco products without further treatment, these data indicate that surface area, alone, does not lead to high methane storage capabilities. These data also illustrate how a carbon made from a feedstock other than corn cobs can be transformed to a material adsorbing more than 5% methane by weight. These data also illustrate how the treatment of a relatively high surface area carbon can be further enhanced with KOH treatment.

Example 5

Demonstration of Adsorption of Copper Cations for Water

The carbon materials of this invention were evaluated for their ability to remove metals from water. Distilled water was additized with about 9 mg/l copper cations. Emission spectroscopy was performed on this mixture as reported by the Blank sample of Table 4. Equal masses of 5 carbons were mixed with this stock solution to remove the copper. Two commercial products (Calgon and Darco) were tested with results as reported. The last three samples listed in Table 4 are samples prepared by the processes of this embodiment. The best adsorption was demonstrated by the KC4 sample (see Table 3). This example illustrates the effectiveness of the activated carbons of this invention for adsorbing metals from water—especially the materials with greater than 45% of their pore volume in the 20-50 Å diameter range and with total pore volumes greater than 2.0 cc/g.

TABLE 4

Data on Adsorption of Copper Cations from Water.

| Sample | Absorbance value | Concentration mg/L | pH of Solution |
|---|---|---|---|
| Blank | 2.9 | 8.99 | 7 |
| Calgon-T | 2.1 | 6.23 | 5--6 |
| Darco-T | 0.15 | 0.15 | 6--7 |
| S-22-T | 0.4 | 0.88 | 6--7 |
| KC4-T | 0.11 | 0.04 | 6--7 |
| Lab C-T | 0.24 | 0.41 | 6--7 |

Example 6

Demonstration of Supporting Catalyst on Activated Carbon

It is known that metals such as Pt, Cu, Pd, Cr, Ni, etc. can be supported on carbon. In order to demonstrate the effectiveness of highly porous carbon based disc catalyst, which will act as nano-scale flow device, copper chromite catalyst was selected for demonstration and further study.

The conditions of this reaction were within the range where they will not cause the gasification of the carbon support of the catalyst. Table 5 shows some of the preliminary data on the conversion of glycerin to propylene glycol using carbon supported copper chromite catalyst in powder-form carried out in plug flow reactor. It also shows the comparison between the conversions and productivities for the conventional copper chromite catalyst and the copper chromite catalyst supported on activated carbon. The reaction was conducted at 220° C., and the hydrogen to glycerin mole ratio was about 20:1. Catalyst 1 and Catalyst 2 are catalysts supported on highly porous carbon (similar to the KC3 of Table 1) with different metal loadings.

TABLE 5

Comparison of Commercial Catalyst and Catalyst Supported on Activated Carbon of the Invention.

| Catalyst | Amt of catalyst (g) | Conversion | Productivity ($g_{PG}/g_{catalyst}$) |
|---|---|---|---|
| Catalyst-1 | 1.00 | >99% | 1.02 |
| Catalyst-2 | 1.00 | >98% | 0.95 |
| Commercial | 10 | >99% | 0.16 |

Figure 7:
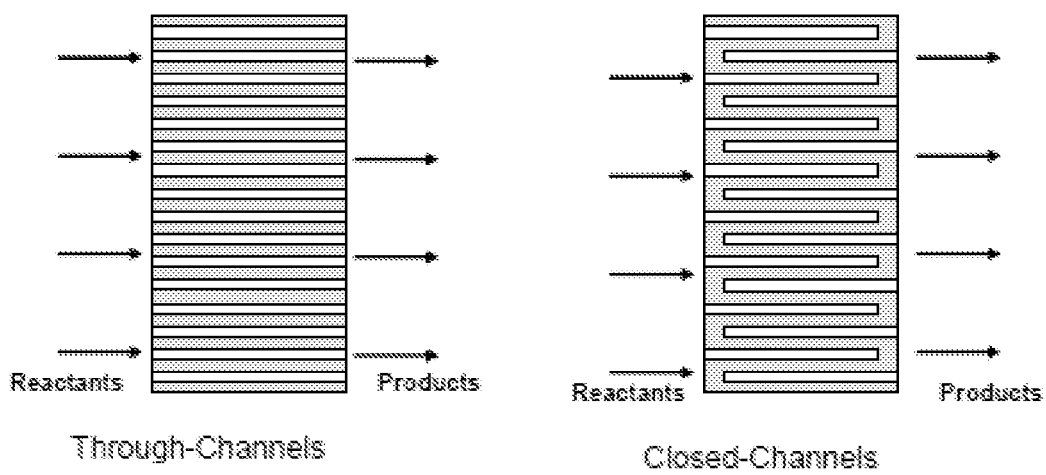
FIG. 7 is a schematic diagram of two channel options to overcome pressure drops within a monolithic carbon adsorbent material.
Figure 8:
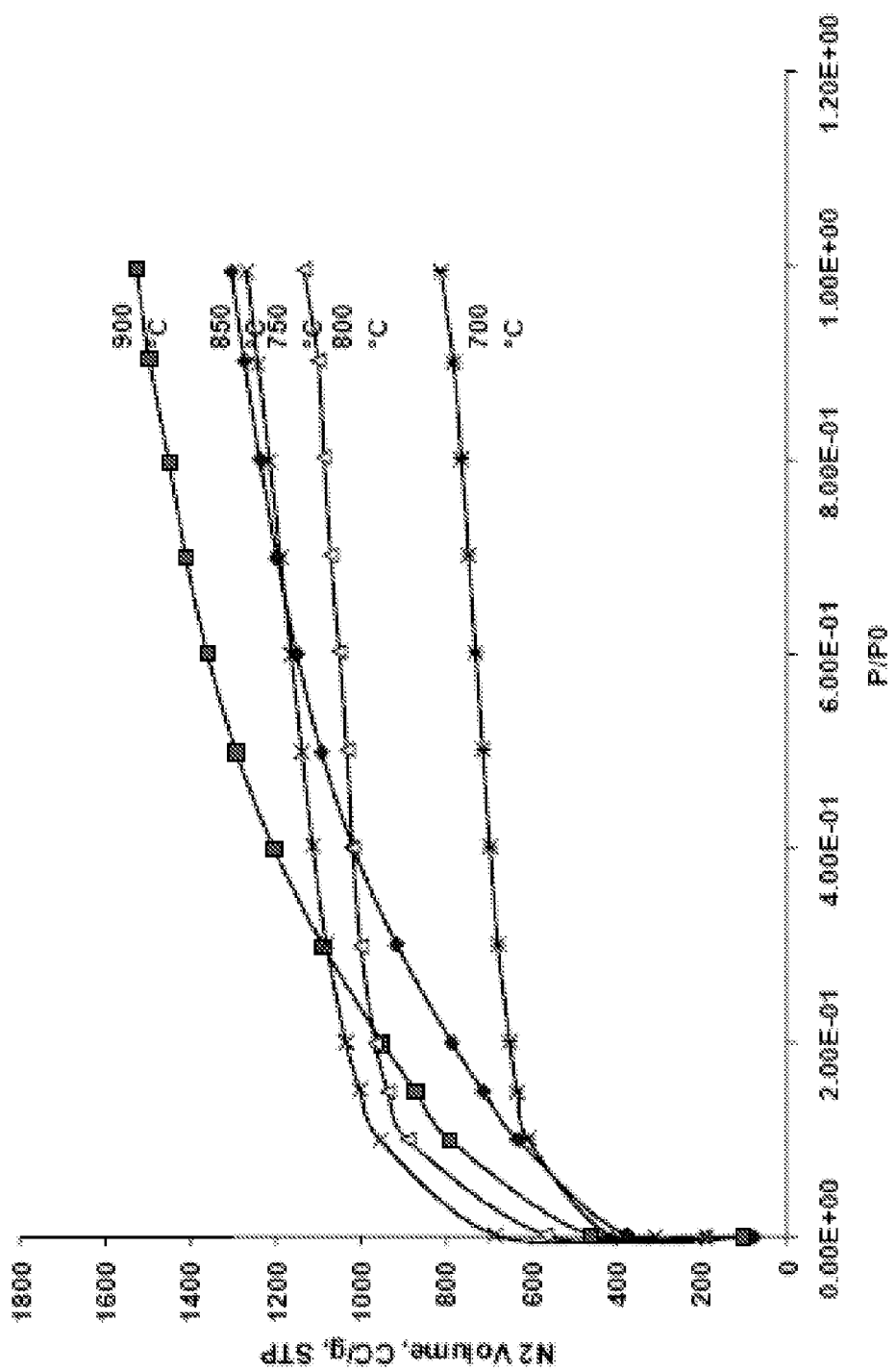
FIG. 8 is a graph summarizing nitrogen isotherms for activated carbon prepared at different temperatures of base activation. Uptake is at 77 K.
Figure 9:
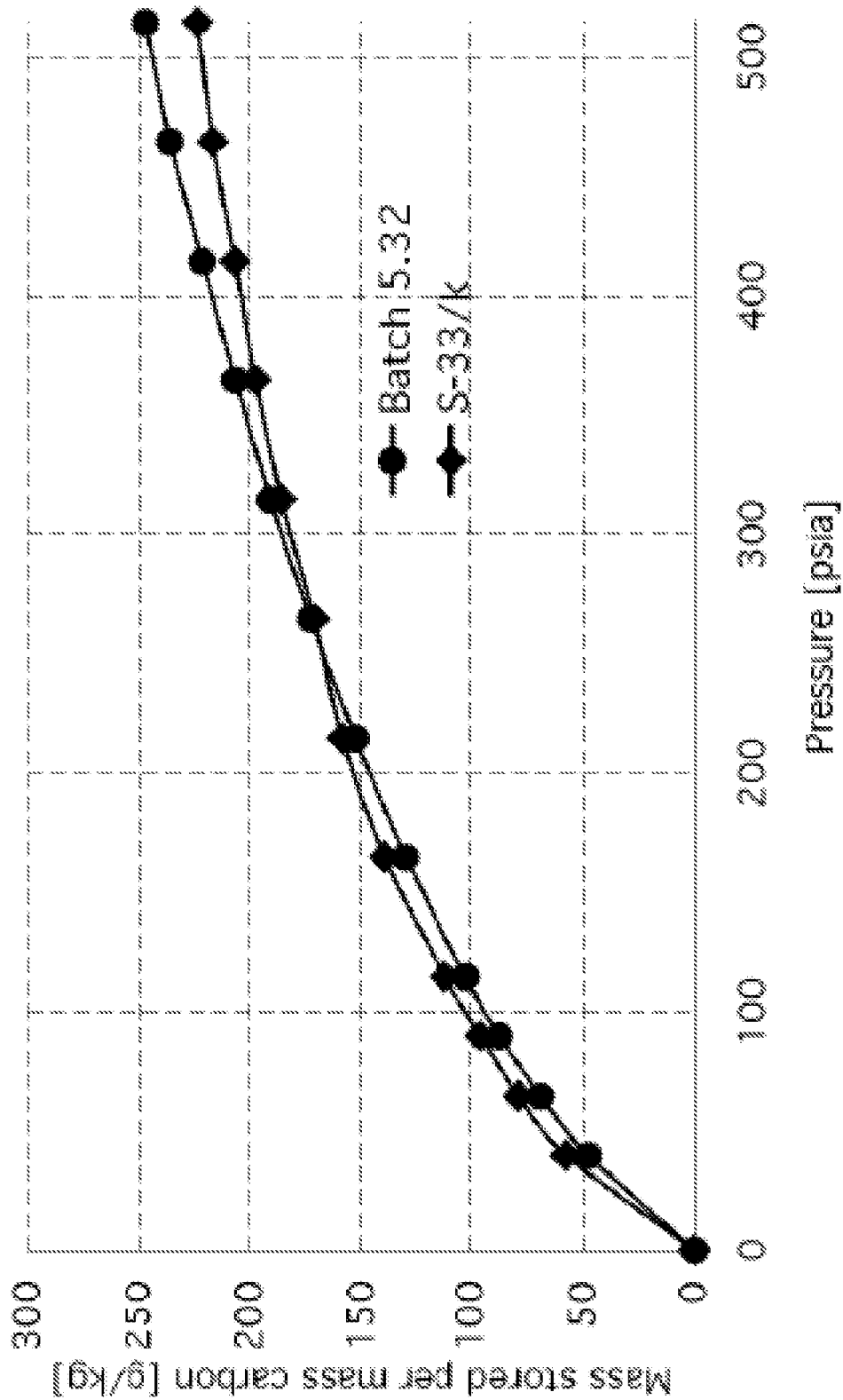
FIG. 9 is a graph summarizing high-performance gravimetric methane storage isotherms at 20° C.

The size of the metal particles on the carbon (observed with electron microscopy) was less than 20 nm, which shows that the metal particles can be deposited in micropores that constitute the large section of pore size distribution of the carbon. The conversion of glycerol to propylene glycol over copper chromite catalyst will result in product degradation if/when the reaction is carried out for times longer that that required to achieve an equilibrium conversion of propylene glycol and acetol. Due to this, the results (even though they are all over 98% conversion) do demonstrate that the low catalyst loading on the carbon is considerably more effective than the same commercial catalyst. Further increases in productivity are expected in the pressed discs with microreactor configurations. To promote even flow and reduce pressure drops channels are preferably incorporated in the pressed discs such as that illustrated by FIG. 7. The closed channel approach is preferred. One method of creating closed channels is to drill the channels into the briquette from the two opposite faces.

Example 7

Example Pore Size Distribution

Table 6 summarizes an example pore size distribution for a carbon prepared by a method similar to sample KC3 of Table 1.

TABLE 6

Example summary of pore size and pore volume distributions.

| Width (nm) | To (nm) | Volume [cc/g] | Area [$m^2/g$] |
|---|---|---|---|
| 0.0 | 1.00 | 0.4 | — |
| 0.79 | 1.00 | — | 1398.1 |
| 1.00 | 1.26 | 0.083 | 182.4 |
| 1.26 | 1.58 | 0.161 | 283.9 |
| 1.58 | 2.00 | 0.244 | 336.5 |
| 2.00 | 2.51 | 0.234 | 259.1 |
| 2.51 | 3.16 | 0.155 | 134.3 |
| 3.16 | 3.98 | 0.135 | 95.4 |
| 3.98 | 5.01 | 0.044 | 25.6 |
| 5.01 | 6.31 | 0.072 | 31.2 |
| 6.31 | 7.94 | 0.049 | 17.2 |
| 7.94 | 10.00 | 0.039 | 10.7 |
| 10.00 | 12.59 | 0.026 | 5.9 |
| 12.59 | 15.85 | 0.019 | 3.4 |
| 15.85 | 19.95 | 0.014 | 2.0 |
| 19.95 | 25.12 | 0.010 | 1.1 |
| 25.12 | 31.62 | 0.007 | 0.6 |
| Total | | 1.71 | 2787.5 |

Example 8

Carbon Paste Capacitor

Activated carbon sample S-56 was evaluated for use in a carbon paste capacitor by methods known in the art. The capacitor performed better than several controls representative of some of the best available carbons for use in carbon paste capacitors. The good performance of S-56 is attributed to the high surface area made possible with a high pore volume in pores of diameter less than 10 Å.

Example 9

Hydrogen Storage

Hydrogen adsorption and storage was evaluated in Sample S-33/k at 77 and 300 K. At 500 psig, these samples reversibly adsorbed 70 and 10 g/kg (H2:carbon) of hydrogen, respectively.

Example 10

Adsorption at Higher Pressures

Figure 10:
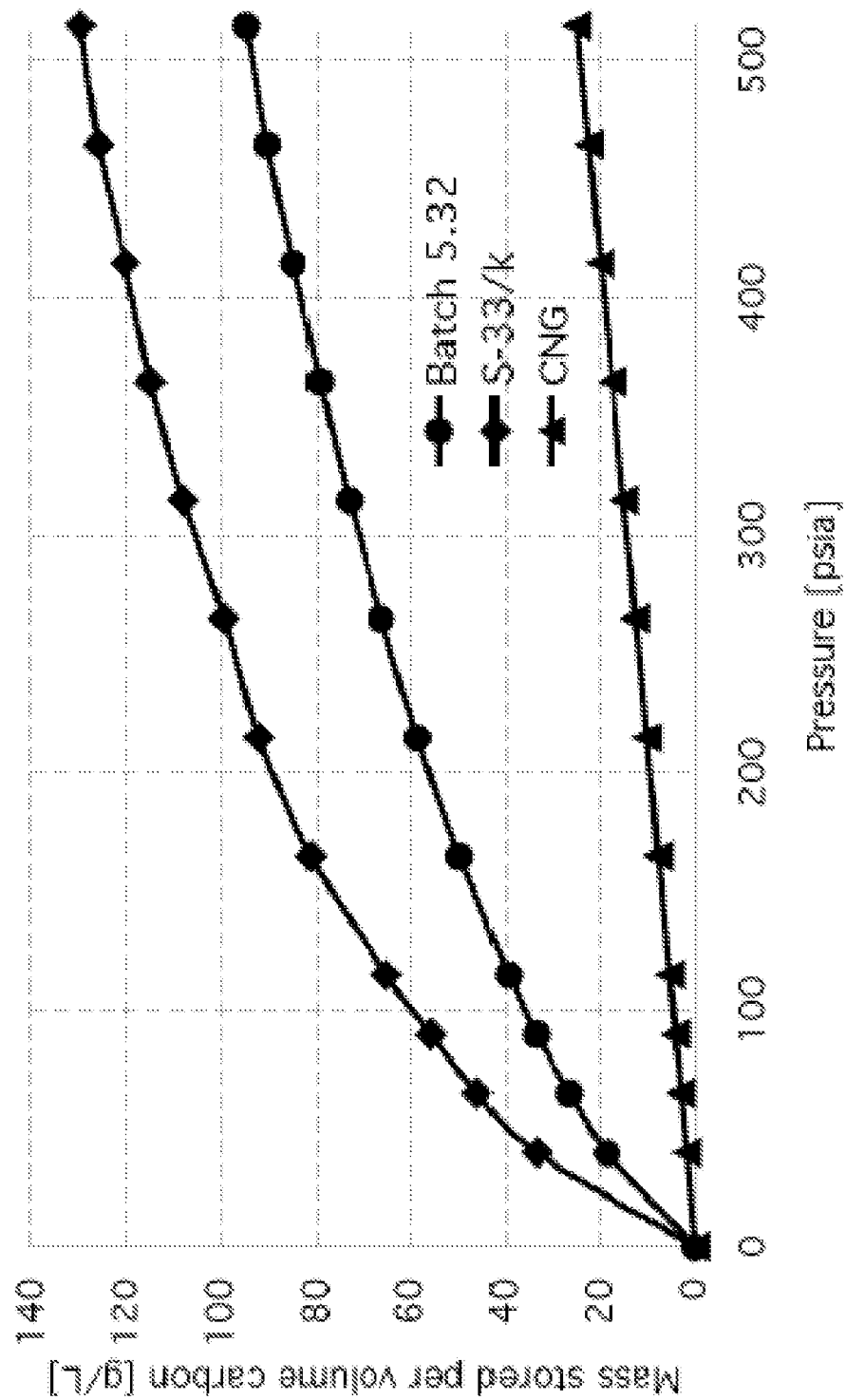
FIG. 10 is a graph summarizing high-performance volumetric methane storage isotherms at 20° C.

FIGS. 3, 4, 5, 8, and 9 illustrate the impact of pressure (methane and nitrogen) on adsorption. FIG. 10 illustrates an additional example of amount stored (total adsorption) for Ba5.32 and S-30 samples.

An advantage of adsorbed natural gas (ANG) storage is to be able to store gas at lower pressures. The principal advantage of ANG storage is to be able to store more gas at the same pressure, relative to storage in the same tank without adsorbent (shown as compressed natural gas, CNG, in FIG. 10). When using ANG at higher pressures, the preferred carbons have isotherms with higher positive slopes on the isotherms at 500 psig, which indicates that higher pressures continue to increase total adsorption. Several embodiments of this invention are particularly good for ANG storage at higher pressures, especially those like KC3 having pore volumes in excess of 1.1 cc/g in pores with diameters between 10 and 50 Å.

Example 11

Effects of Phosphoric Acid Activation and KOH Activation on the Composition of Corncob-Derived Activated Carbon Adsorbent To assess the effects of the individual activation processes on the composition of corncob-derived activated carbon adsorbent materials, the following experiments were performed.

Activated carbon samples were prepared in a multi-step activation process from corncob biomass waste feedstock. The corncob waste feedstock was initially subjected to phosphoric acid activation by soaking the corncob fragments in phosphoric acid for about 12 hours at a temperature of about 45° C. The phosphoric acid/corncob mixture was then charred at 480° C. in a nitrogen environment in an initial acid activation process. After neutralizing the H3PO4-activated carbon by rinsing with hot water, the charred carbon was KOH activated by mixing with a KOH solution to produce a slurry with a KOH:C mass ratio of about 3.5 and activating at a temperature of about 800° C. for one hour. The KOH-activated carbon adsorbent was rinsed with water until neutral (pH=7).

Samples of the H3PO4-activated carbon, and the KOH-activated carbon were subjected to elemental analysis to determine their respective compositions. Each sample was ashed at 550° C. and then digested with an acidic solution of HF/HNO3/HCl and analyzed by inductively coupled plasma atomic emission spectroscopy (ICP-OES). The carbon, hydrogen, and nitrogen concentrations of each sample were determined using an automated implementation of the Pregl-Dumas classical method, in which each sample was combusted in a stream of ultra-pure oxygen at 935° C., during which the elements of interest were converted to gases by this combustion process: carbon was converted to CO2, hydrogen was converted to H2O, and nitrogen was converted to NOx and then reduced to N2. After combustion the mixture of gases were swept through a column using ultra-pure helium and detected as a function of their respective thermal conductivities. The oxygen concentration was obtained using a modified version of ASTM D5373 in which each sample was pyrolyzed at 1250° C. in a reducing atmosphere, resulting in the conversion of the oxygen in the sample to atomic oxygen. The atomic oxygen combines with carbon to form CO and ultimately CO2, from which the oxygen percentage is calculated using infrared spectroscopy.

The results of the elemental analysis are summarized in Table 7 below. A previously-published elemental composition of the corncob feedstock (Mullen et al. 2010) was added to Table 7 for comparison.

TABLE 7

Elemental Composition of Corncob and Activated Carbon Samples

| | Proportion of Element in Sample (wt %) | | |
|---|---|---|---|
| Element | Corncob | $H_3PO_4$-activated carbon | KOH-activated carbon |
| Carbon | 47.35 | 72.19 | 91.43 |
| Hydrogen | 7.56 | 1.69 | 0.49 |
| Nitrogen | 0.69 | 1.04 | 0.18 |
| Oxygen | 38.07 | 21.51 | 3.88 |
| Iron | | 0.04 | 0.66 |
| Chromium | | | 0.16 |
| Calcium | | 0.48 | 0.87 |
| Magnesium | | | 0.12 |
| Sodium | | 1.03 | 0.12 |
| Potassium | | 0.55 | 0.05 |
| Nickel | | | 0.02 |
| Manganese | | | 0.02 |
| Aluminum | | 0.38 | |
| Phosphorus | | 2.47 | 0.05 |
| Copper | | 0.008 | 0.02 |
| Barium | | 0.48 | |
| Boron | | 0.43 | |
| Silicon | | 0.1 | |
| Zirconium | | 0.02 | |

As summarized in Table 7, the oxygen, hydrogen and nitrogen contents decreased during the consecutive activation processes. Phosphoric acid activation decreased the oxygen and hydrogen content of the adsorbent by 43% and 78%, respectively, and increased the relative amount of carbon in the adsorbent by 52%. KOH activation further decreased the oxygen and hydrogen contents of the adsorbent by 90% and 94%, respectively, and increased the relative amount of carbon by 93%. Phosphorus appeared in the adsorbent after H3PO4 activation, but decreased from 2.47 to 0.05 wt % after the completion of the final washing procedure of KOH activation. Iron, chromium, and other metal impurities detected in the KOH-activated carbon likely were contaminants associated with the stainless steel container used during the KOH activation process at elevated temperatures, and other trace elements may be associated with the corncob feedstock that were not detected in the previously published data. Metallic potassium, which was intercalated into the carbon lattice during KOH activation, was essentially completely removed upon completion of the final washing procedure.

The results of this experiment demonstrated that the successive phosphoric acid activation and KOH-activation process each resulted in adsorbents with increasing high relative carbon content. The KOH-activated adsorbent had relatively high carbon content in excess of 90 wt %.

Example 12

Effects of Phosphoric Acid Activation and KOH Activation on the Surface Area and Pore Structure of Corncob-Derived Activated Carbon Adsorbent To assess the effects of the individual activation processes on the pore structure and surface area of corncob-derived activated carbon adsorbent materials, the following experiments were performed.

Samples of the H3PO4-activated carbon and KOH-activated carbon adsorbents were subjected to sub-critical nitrogen adsorption analysis to assess their respective surface areas and pore volumes. Sub-critical nitrogen isotherms at 77 K were obtained for each sample using an Autosorb-1C (Quantachrome Instruments). Specific surface areas were determined from the measured sub-critical nitrogen isotherms using Brunauer-Emmett-Teller (BET) theory in the pressure range of 0.01-0.03 P/P0; this pressure range was determined to be appropriate for microporous materials such as the activated carbon adsorbents. Surface areas larger than 1000 m2g-1 were rounded and reported to the nearest hundred. The total pore volume (Vtot) was determined at a pressure of 0:995 P/P0. The porosity ϕ, defined herein as the volume fraction of the adsorbent occupied by open pores, was calculated according to Eqns. (VII) and (VIII):

$$\text{Porosity} = \phi = \left[1 + \left(\rho_{skel}\frac{V_{tot}}{m_s}\right)^{-1}\right]^{-1} \qquad \text{Eqn. (VII)}$$

$$\text{Apparent\_density} = \rho_{app} = \rho_{skel}(1-\phi) \qquad \text{Eqn. (VIII)}$$

where $\rho_{skel}$ is the skeletal density of the sample, assumed to be 2.0 g cm$^{-3}$, and $\rho_{app}$ is the apparent density, defined herein as the density of the adsorbent material taking into consideration the volume of open pores and the skeletal volume of carbon. Skeletal densities of amorphous carbon materials typically range between about 1.8 and about 2:1 g cm$^{-3}$.

Table 8 summarizes the results of the sub-critical nitrogen adsorption analysis of samples of H3PO4-activated carbon, KOH-activated carbon, and non-activated corncob feedstock.

TABLE 8

BET Surface Area and Porosity of Corncob and Activated Carbon Samples

| | Sample Type | | |
|---|---|---|---|
| Element | Corncob Feedstock | H$_3$PO$_4$-activated carbon | KOH-activated carbon |
| BET Surface Area (m$^2$/g) | 7 | 1200 | 2500 |
| Total Pore Volume (cm$^3$/g) | 0.02 | 0.72 | 1.75 |
| Porosity | 0.04 | 0.59 | 0.78 |

As summarized in Table 8, phosphoric acid activation resulted in a BET surface area of 1200 m2/g and a porosity of 0.59. Subsequent KOH activation enhanced the BET surface area up to a value of 2500 m2/g and increased the porosity up to 0.78. Taken together, H3PO4-activation and KOH activation increased porosity and surface area by a factor of 26 and 357, respectively, relative to the corresponding corncob feedstock values.

The pore size distribution for each sample was calculated using quenched solid density functional theory (QSDFT) for infinite slit shaped pores. The QSDFT method was a modified version of the non-local density functional theory (NLDFT), which assumes a flat graphitic pore structure. NLDFT assumes a flat graphitic pore structure which is inappropriate for calculating the minimum in the pore size for activated carbons in which heterogeneities obstruct layering transitions. QSDFT ameliorates this limitation of NLDFT by taking into consideration surface roughness and heterogeneity by modeling the adsorbent surface using the distribution of solid atoms rather than as the source of the external potential field, resulting in enhanced reliability for the pore size distributions for the nanoporous activated carbon materials.

Figure 11:
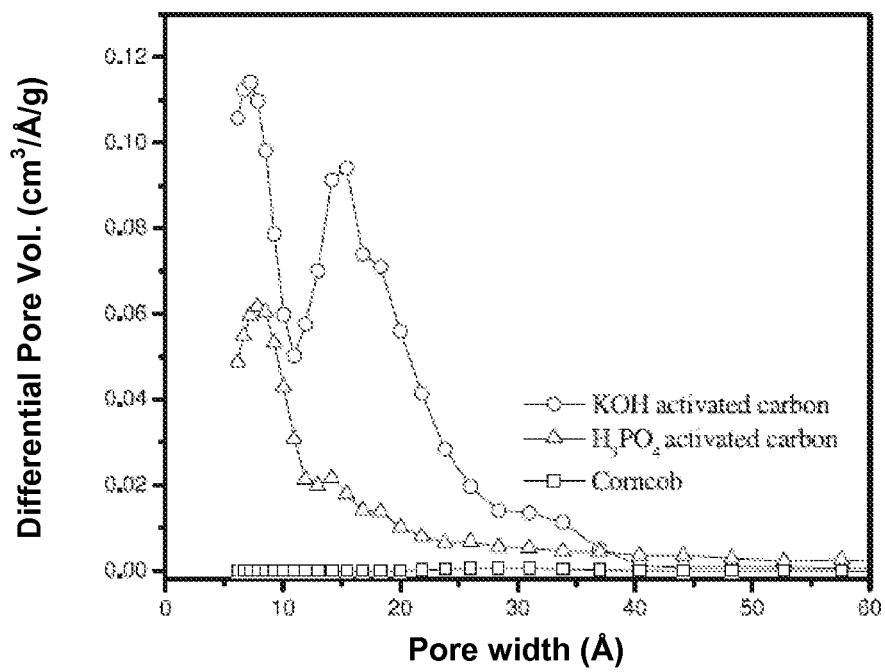
FIG. 11 is a graph summarizing the differential pore volumes of corncob feedstock, acid-activated carbon and KOH-activated carbon adsorbent measured by the sub-critical nitrogen adsorption analysis for pore widths ranging from about 7 Å to about 60 Å.
Figure 12:
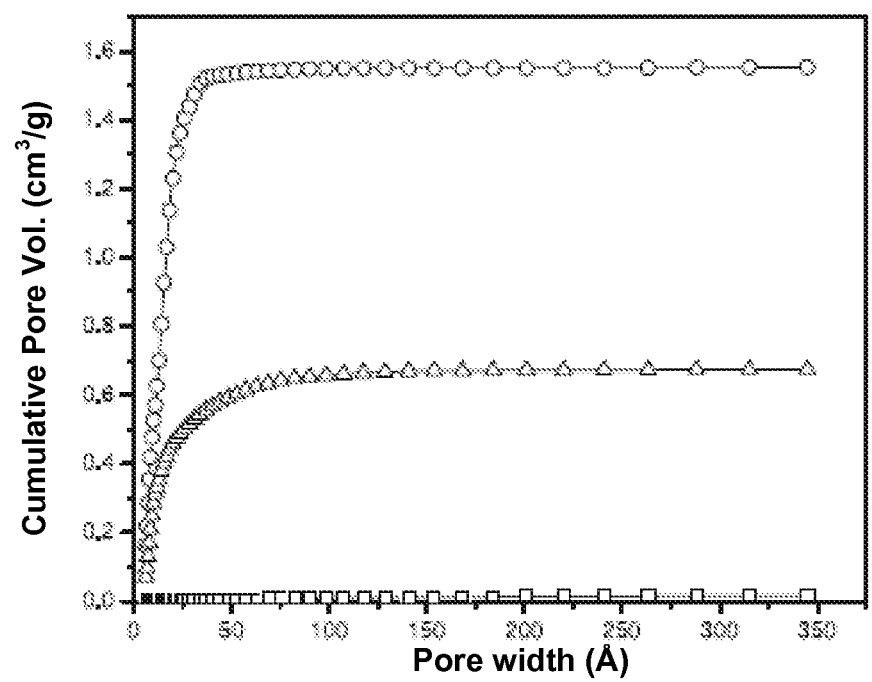
FIG. 12 is a graph summarizing the differential pore volumes of corncob feedstock, acid-activated carbon and KOH-activated carbon adsorbent measured by the sub-critical nitrogen adsorption analysis for pore widths ranging up to about 350 Å.

The differential pore volumes of the three samples measured by the sub-critical nitrogen adsorption analysis is summarized in FIG. 11 for pore widths ranging from about 7 about 7 Å to about 60 Å. The cumulative pore volume for the three samples is summarized in FIG. 12 for pore widths up to about 350 Å. During phosphoric acid activation, a predominantly sub-nanometer pore volume corresponding to pores with widths of less than about 10 Å was created. KOH activation doubled the sub-nanometer pore volume and generated an additional supra-nanometer pore volume corresponding to pore diameters ranging from about 10 Å to about 50 Å.

The results of these experiments confirmed that the surface area and pore volume were significantly increased by KOH activation, as a result of increased volume of pores with diameters ranging up to about 50 Å.

Example 13

Effects of KOH Activation Conditions on Structure of Activated Carbon Adsorbent

To assess the effects of the KOH activation process conditions on the pore structure and surface area of the resulting activated carbon adsorbents, the following experiments were performed.

Activated carbon samples were prepared in a multi-step activation process as described in Example 11 from corncob biomass waste feedstock. The KOH concentration and activation temperature during KOH activation were systematically varied to produce nine batches of activated carbon: KOH:C weight ratios of 2.5, 3.0, and 3.5 were used, as well as activation temperatures of 700° C., 800° C., and 900° C., as summarized in Table 9.

Each sample was subjected to sub-critical nitrogen adsorption analysis to assess the surface area and pore volume as described in Example 12. The surface areas and porosities obtained from the nine samples using the methods described above are summarized in Table 9:

TABLE 9

Effect of KOH Activation Conditions on Surface Area and Porosity

| Sample | KOH:C Weight Ratio | Activation Temp (° C.) | BET Surface Area (m$^2$/g) | Porosity |
|---|---|---|---|---|
| 1 | 2.5 | 700 | 1500 | 0.58 |
| 2 | 3.0 | 700 | 2250 | 0.65 |
| 3 | 3.5 | 700 | 2500 | 0.72 |
| 4 | 2.5 | 800 | 1800 | 0.64 |
| 5 | 3.0 | 800 | 2300 | 0.70 |
| 6 | 3.5 | 800 | 2500 | 0.75 |
| 7 | 2.5 | 900 | 2000 | 0.70 |
| 8 | 3.0 | 900 | 2400 | 0.78 |
| 9 | 3.5 | 900 | 2500 | 0.78 |

As summarized in Table 9, increasing the KOH concentration at each activation temperature increased the surface area and porosity of the resulting adsorbent. A similar effect was observed for increasing the activation temperature at each constant KOH concentration. The BET surface area of the samples was predominantly dependent on the KOH:C weight ratio and to a lesser degree on the activation temperature. At the highest KOH concentration tested (KOH:C=3.5), the surface area was 2500 m2/g for all activation temperatures. In addition, the overall porosity reached a plateau of 0.78 at an activation temperature of 900° C. and a KOH:C weight ratio of 3.0.

The results of this experiment demonstrated that the surface area and porosity of activated carbon adsorbents were influenced in a predictable manner by the selected KOH concentration and activation temperature used for KOH activation of the phosphoric acid activated carbon char.

Example 14

Figure 13:
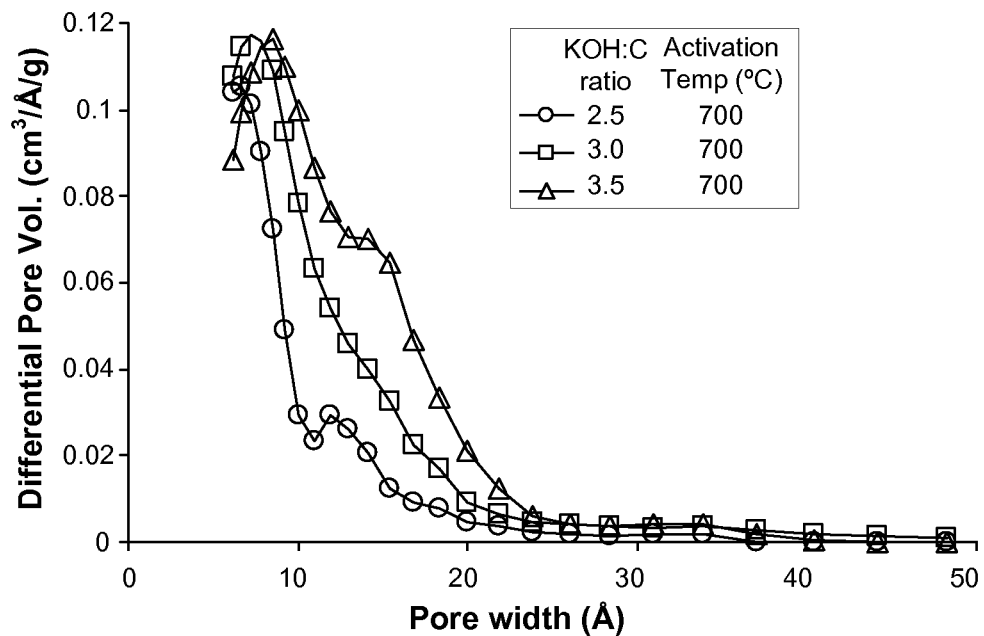
FIG. 13 is a graph summarizing the differential pore volumes of KOH-activated carbon adsorbents activated at 700° C. measured by the sub-critical nitrogen adsorption analysis for pore widths ranging from about 7 Å to about 50 Å.
Figure 14:
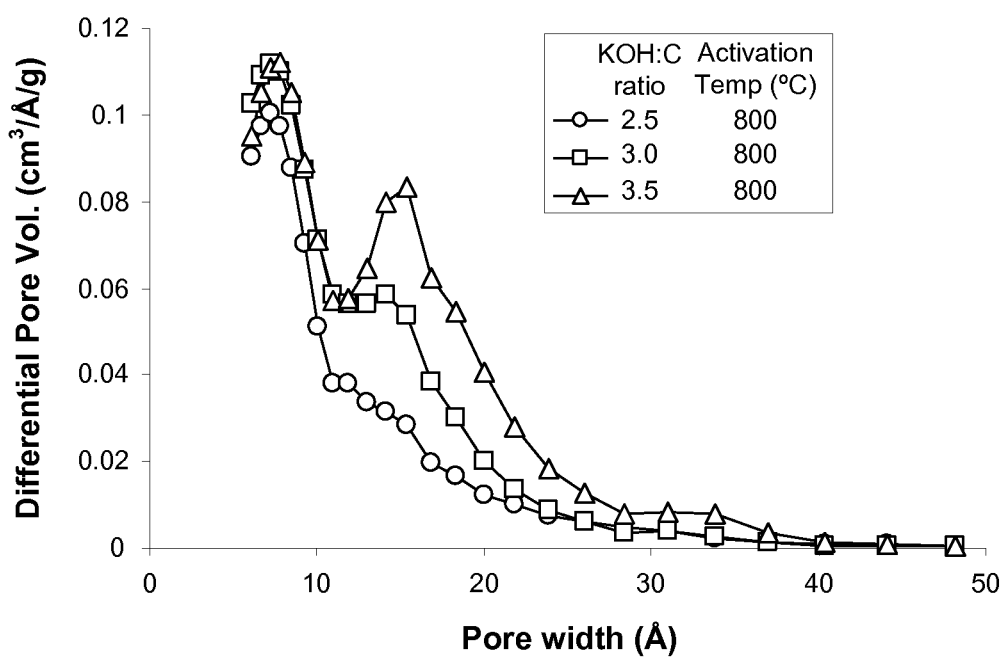
FIG. 14 is a graph summarizing the differential pore volumes of KOH-activated carbon adsorbents activated at 800° C. measured by the sub-critical nitrogen adsorption analysis for pore widths ranging from about 7 Å to about 50 Å.
Figure 15:
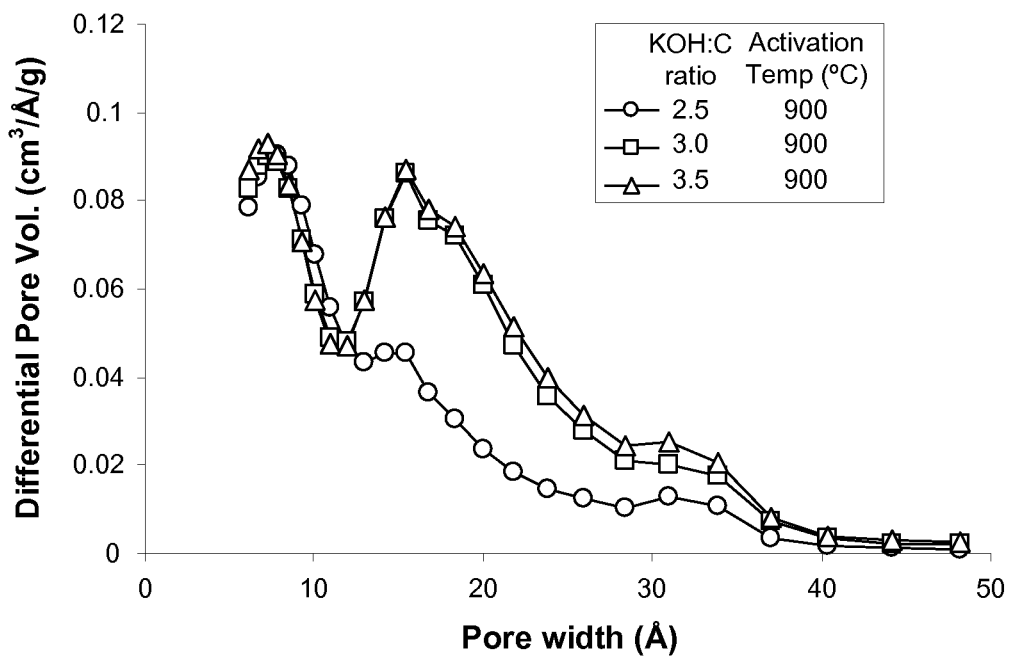
FIG. 15 is a graph summarizing the differential pore volumes of KOH-activated carbon adsorbents activated at 900° C. measured by the sub-critical nitrogen adsorption analysis for pore widths ranging from about 7 Å to about 50 Å.

Effects of KOH Activation Conditions on Pore Size Distribution of Activated Carbon Adsorbent To assess the effects of the process conditions on the pore size distribution of activated carbon adsorbents, the following experiments were performed. Activated carbon adsorbents were produced using the process and conditions described in Ex. 13. In addition, the pore size distributions were obtained for each of the nine samples using the methods described in Example 12, and are summarized in FIGS. 13-20. FIGS. 13-18 summarize the differential pore volume calculated for pore widths ranging from about 7 Å to about 50 Å. FIGS. 13-15 each summarize the differential pore volume for the adsorbents produced at three KOH concentrations and activation temperatures of 700° C. (FIG. 13), 800° C. (FIG. 14) and 900° C. (FIG. 15). FIGS. 16-19 each summarize the differential pore volume for the adsorbents produced at all three activation temperatures and at KOH concentrations corresponding to KOH:C ratios of 2.5 (FIG. 16), 3 (FIG. 17) and 3.5 (FIG. 18).

Referring to FIG. 13, increasing the KOH concentration at an activation temperature of 700° C. resulted in a modest increase in volume of sub-nm pores (pores with diameters of less than 10 Å) and a sizeable increase in the volume of supra-nm pores (pores with diameters ranging from about 10 Å to about 50 Å. A similar trend was observed at an activation temperature of 800° C., as illustrated in FIG. 14; the differential pore volume distribution developed a pronounced peak at a pore width of about 15 Å at a KOH:C of 3.5. As illustrated in FIG. 15, the KOH concentration had little effect on the volume of sub-nm pores at an activation temperature of 900° C., and the differential pore volume distribution developed a similar pronounced peak at a pore width of about 15 Å at KOH:C of 3.0 that did not increase appreciably at a KOH:C of 3.5.

Figure 16:
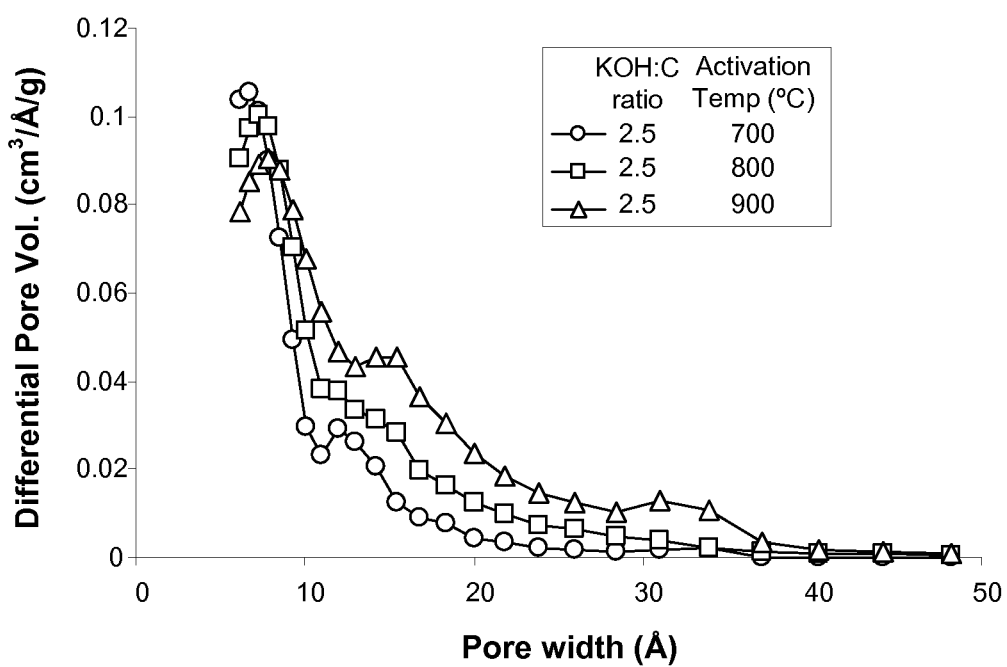
FIG. 16 is a graph summarizing the differential pore volumes of KOH-activated carbon adsorbents activated at a KOH:C mass ratio of 2.5 measured by the sub-critical nitrogen adsorption analysis for pore widths ranging from about 7 Å to about 50 Å.
Figure 17:
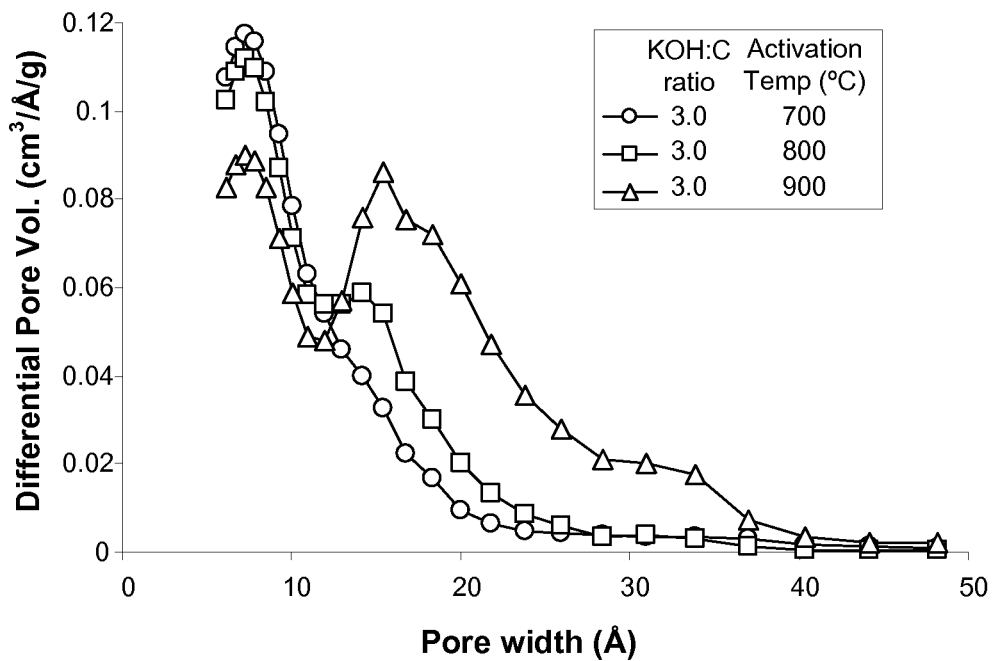
FIG. 17 is a graph summarizing the differential pore volumes of KOH-activated carbon adsorbents activated at a KOH:C mass ratio of 3.0 measured by the sub-critical nitrogen adsorption analysis for pore widths ranging from about 7 Å to about 50 Å.
Figure 18:
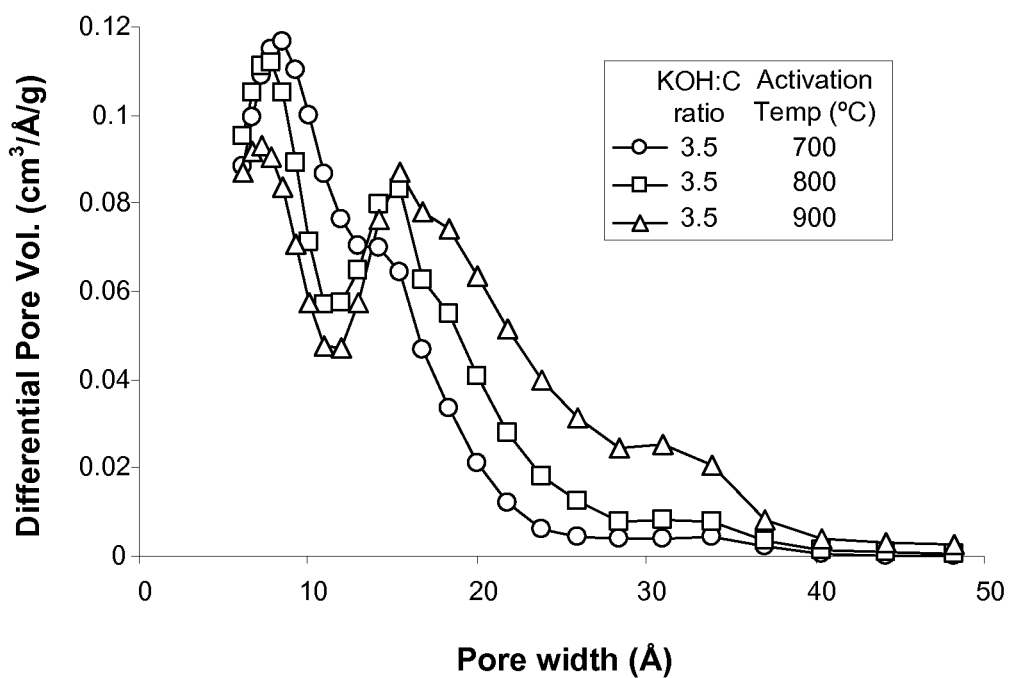
FIG. 18 is a graph summarizing the differential pore volumes of KOH-activated carbon adsorbents activated at a KOH:C mass ratio of 3.5 measured by the sub-critical nitrogen adsorption analysis for pore widths ranging from about 7 Å to about 50 Å.

As summarized in FIGS. 16-18, at each constant KOH concentration, an increase in activation temperature resulted in a decrease in the volume of sub-nm pores and an accompanying increase in the volume of supra-nm pores. At the lowest KOH concentration (KOH:C=2.5), summarized in FIG. 16, the pore volumes decreased for pore diameters below about 8 Å. As summarized in FIG. 17, the pore volumes decreased for pore diameters below about 12 Å-13 Å, and the increase in pore volume was particularly pronounced for pore diameters of about 15 Å-20 Å at a KOH:C of 3. At the highest KOH concentration (KOH:C=3.5), summarized in FIG. 19, the pore volumes decreased for pore diameters below about 14 Å, and the increase in pore volume was particularly pronounced for pore diameters of about 15 Å-25 Å.

Figure 19:
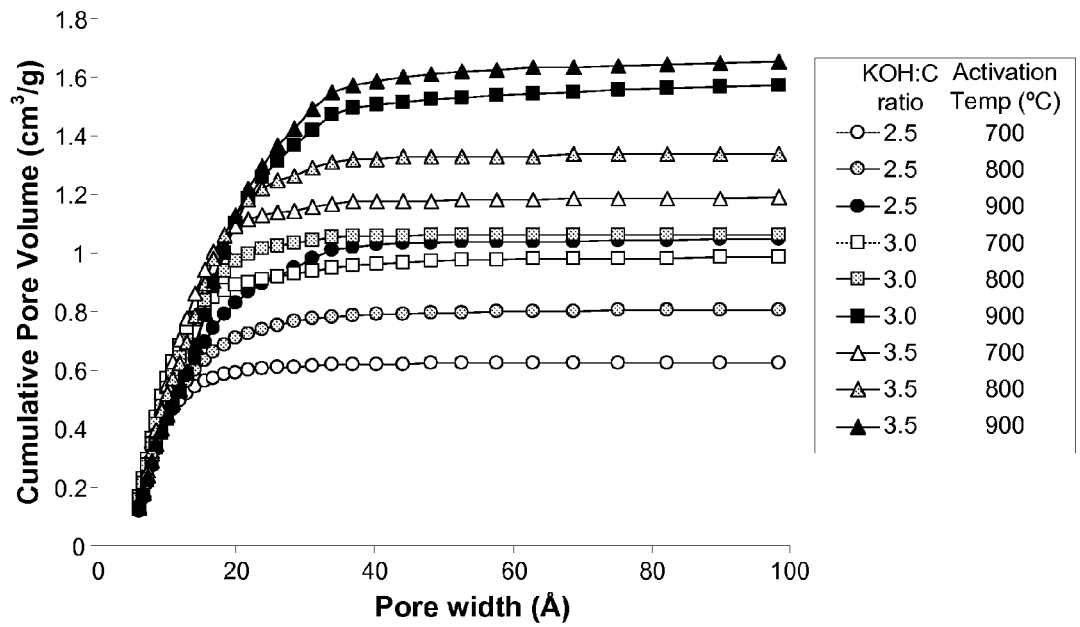
FIG. 19 is a graph summarizing the cumulative pore volumes of KOH-activated carbon adsorbents measured by the sub-critical nitrogen adsorption analysis for pore widths ranging from about 7 Å to about 100 Å.
Figure 20:
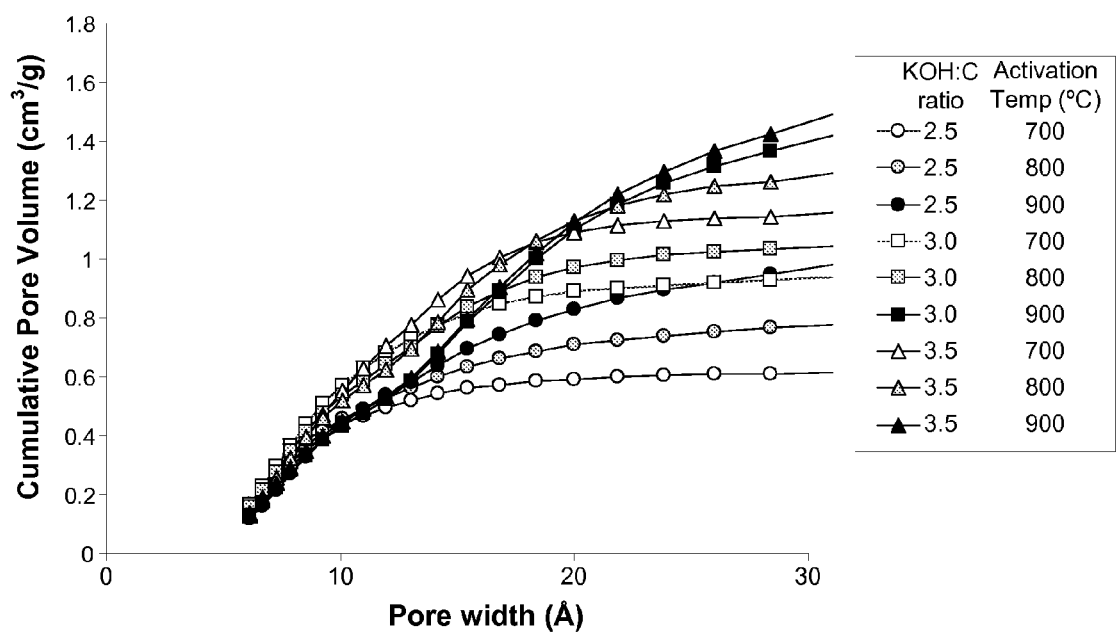
FIG. 20 is a graph summarizing the cumulative pore volumes of KOH-activated carbon adsorbents measured by the sub-critical nitrogen adsorption analysis for pore widths ranging from about 7 Å to about 30 Å.

FIGS. 19 and 20 summarize the cumulative pore volumes measured from all adsorbent samples for pore widths ranging from about 7 Å to about 50 Å and from about 7 Å to about 30 Å, respectively. The highest overall cumulative pore volumes were achieved at an activation temperature of 900° C. and KOH:C ratios of 3 or above, as summarized in FIG. 19. However, as summarized in FIG. 20, the highest cumulative pore volumes for sub-nm pores (<10 Å) were achieved by combination of activation temperatures of 800° C. or below, and KOH:C ratios of 3 or above. The cumulative pore volumes of the adsorbents produced using a KOH:C ratio of at least 3 and an activation temperature of 900° C. had significantly higher pore volumes associated with pores in the 15 Å-25 Å range.

The results of these experiments demonstrated that the pore volume distribution was influenced by the selection of KOH activation conditions, in particular the KOH concentration and the activation temperature.

Example 15

Effects of KOH Concentration on Structure and Pore Size Distribution of KOH-Activated Carbon Adsorbent To assess the effects of KOH concentration on the structure and pore size distribution of KOH-activated carbon adsorbents, the following experiments were performed. Activated carbon adsorbents were produced using a similar process and conditions described in Example 13. However, in this example, six samples were produced at an activation temperature of 700° C. and at one of six KOH:C ratios: 2, 2.5, 3, 3.5, 4, or 4.5.

Figure 21:
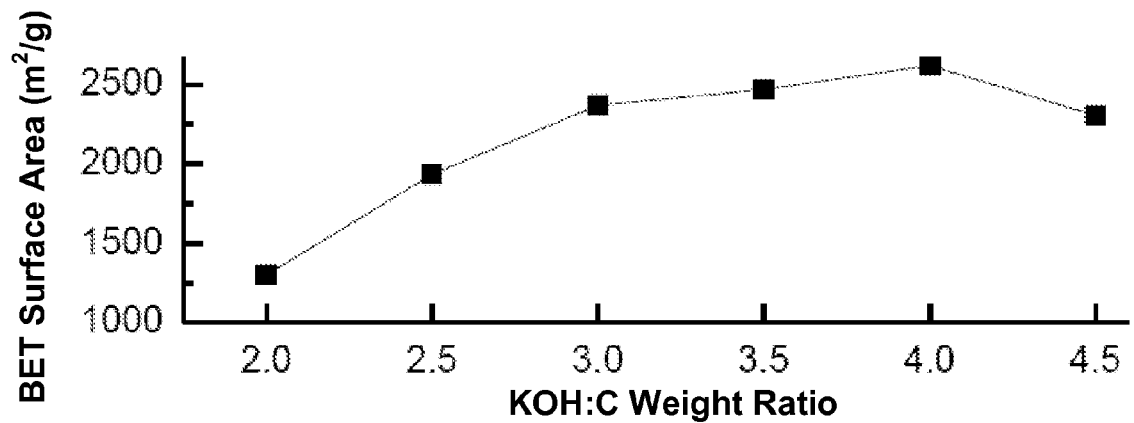
FIG. 21 is a graph summarizing the BET surface areas of KOH-activated carbon adsorbents as a function of the KOH:C ratio used during activation.
Figure 22:
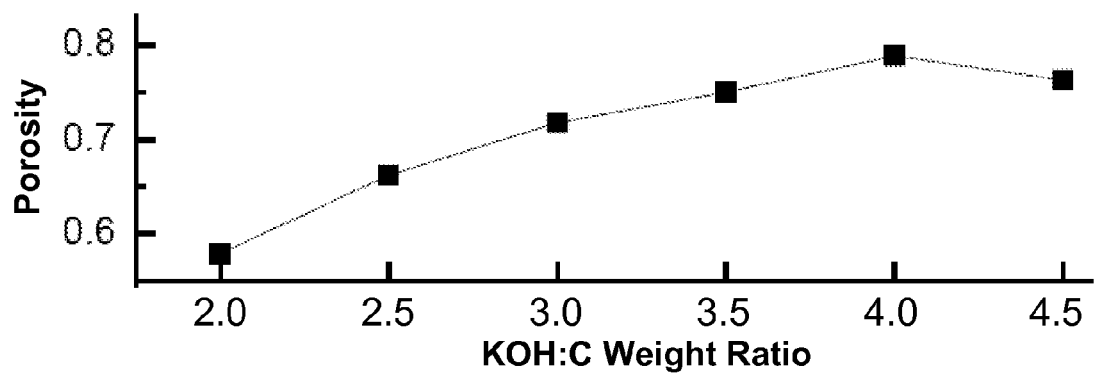
FIG. 22 is a graph summarizing the porosities of KOH-activated carbon adsorbents as a function of the KOH:C ratio used during activation.

Each sample was subjected to sub-critical nitrogen adsorption analysis to assess the surface area and pore volume as described in Example 12. The measured BET surface areas of the samples are summarized in FIG. 21, and the measure porosities are summarized in FIG. 22. Both BET surface area and porosity increased at higher KOH concentrations. However, both BET surface area and porosity reached maxima at KOH:C=4.0, and decreased slightly from these maxima at KOH:C=4.5.

Figure 23:
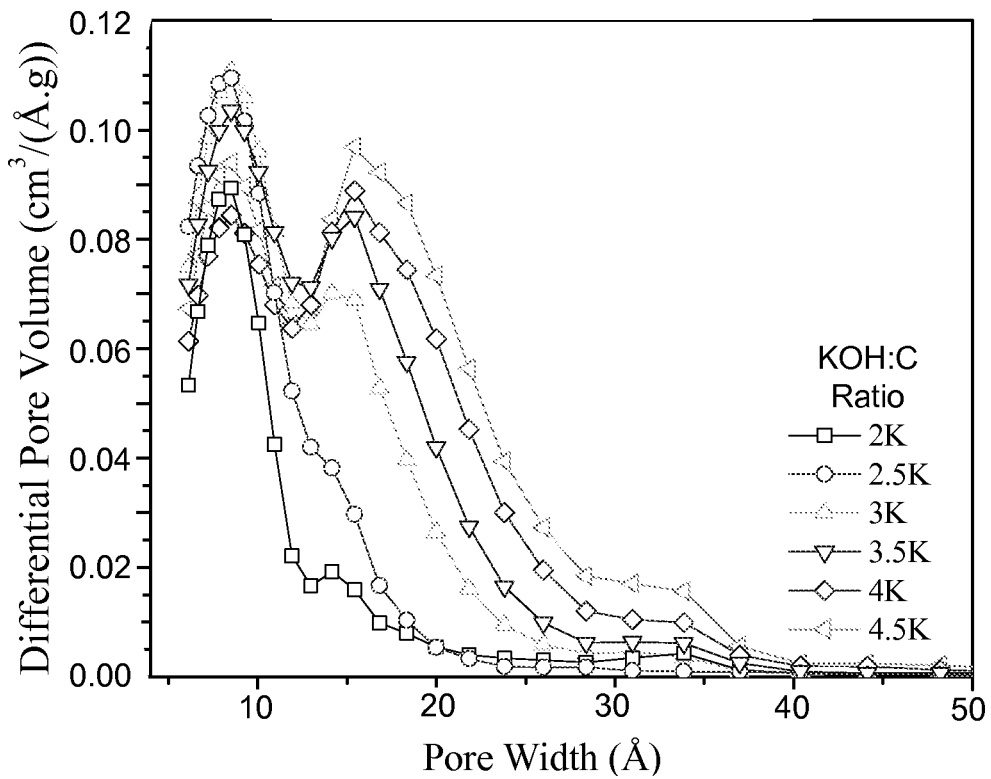
FIG. 23 is a graph summarizing the differential pore volumes of KOH-activated carbon adsorbents activated at a KOH:C mass ratios raging from 2 to 4.5 measured by the sub-critical nitrogen adsorption analysis for pore widths ranging from about 7 Å to about 50 Å.
Figure 24:
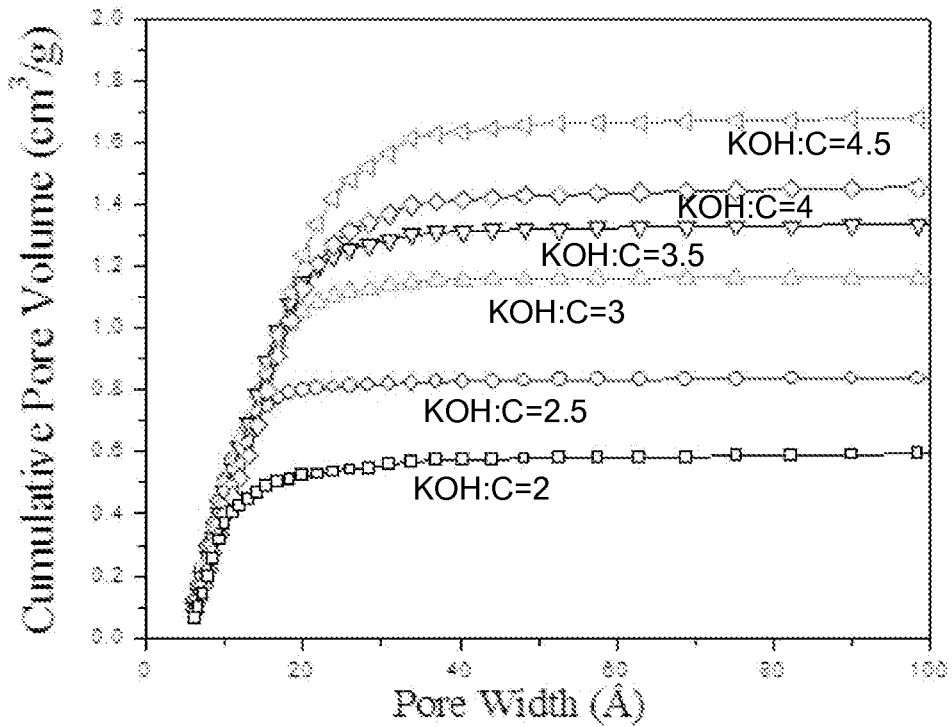
FIG. 24 is a graph summarizing the cumulative pore volumes of KOH-activated carbon adsorbents activated at a KOH:C mass ratios raging from 2 to 4.5 measured by the sub-critical nitrogen adsorption analysis for pore widths ranging from about 7 Å to about 100 Å.

In addition, pore size distributions of the samples were obtained using the methods described in Example 12. The measured pore size distributions for the samples are summarized in FIG. 23, and the cumulative pore sizes are summarized in FIG. 24. Referring to FIG. 23, the samples activated at 700° C. and at a KOH:C weight ratio below 2.5 possessed a pore structure made of nearly all sub-nm pores, corresponding to pores with diameters of less than 10 Å. The volume of sub-nm pores increased slightly as the KOH:C ratio increased from 2.0-3, but then steadily decreased as the as the KOH:C ratio increased from 3.5-4.5. The volume of supra-nm pores (pores with diameters ranging from about 10 Å to about 50 Å) increased steadily as KOH:C ratio increased up to 4.5. As summarized in FIG. 24, the overall cumulative pore volume steadily increased with KOH:C ratio up to 4.5.

The results of these experiments demonstrated that an adsorbent with a controlled pore size distribution may be produced by manipulating the KOH:C weight ratio used during KOH activation at a temperature of 700° C. The largest sub-nm pore volumes were achieved using KOH:C weight ratio equal to 2.5 and 3.

Example 16

Effects of Structure and Pore Size Distribution of KOH-Activated Carbon Adsorbent on Methane Storage Characteristics To assess the effects of the structure and pore size distribution of KOH-activated carbon adsorbents on methane storage characteristics, the following experiments were performed. The six samples of KOH-activated carbon adsorbents produced using a similar process and conditions described in Example 15 were subjected to a series of measurements to determine gravimetric and volumetric methane storage characteristics.

Methane adsorption isotherms were measured volumetrically using an HTP-1 Volumetric sorption analyzer (Hiden Isochema Ltd) and gravimetrically using a custom-built instrument. For the gravimetric measurement, four measurements for each sample were obtained to determine the gravimetric excess adsorption at a temperature of 22° C. and at a pressure of 35 bar: the mass of evacuated sample cell (mC), the mass of the cell and methane gas (mC,G), mass of cell and outgassed sample (mC,S), and the mass of cell with sample and gas (mC,S,G). The gravimetric excess adsorption, normalized per unit mass of adsorbent, was calculated using the relationship defined by Eqn. (IX):

$$\text{Excess Gravimetric Adsorption} = \frac{m_e}{m_{sample}} = \frac{m_{C,S,G} - m_{C,G}}{m_{C,S} - m_C} - \left(1 - \frac{\rho_{gas}}{\rho_{skel}}\right) \quad \text{Eqn. (IX)}$$

where $\rho_{skel}$ is the skeletal density of activated carbon and $\rho_{gas}$ is the density of the methane gas at the corresponding temperature and pressure from NIST Reference Fluid Thermodynamic and Transport Properties Database.

Figure 25:
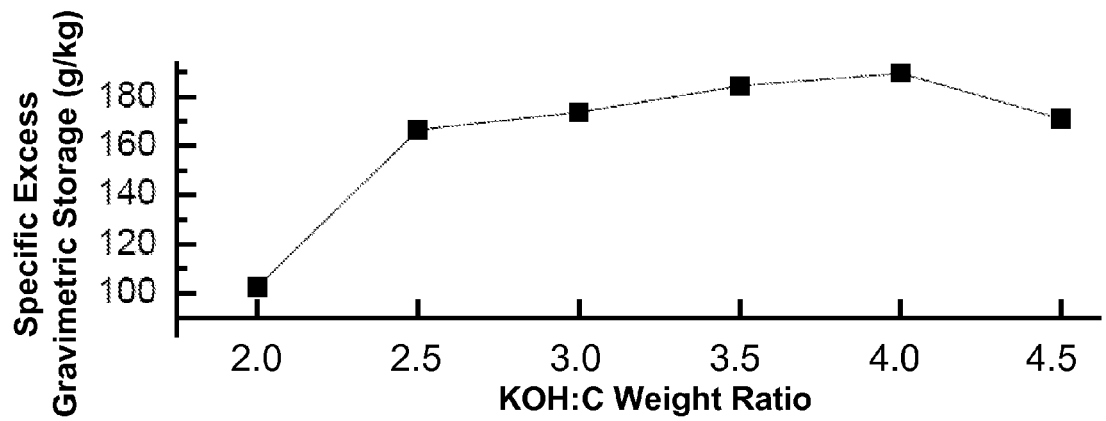
FIG. 25 is a graph summarizing the specific excess gravimetric storage capacities of KOH-activated carbon adsorbents as a function of the KOH:C ratio used during activation.

The gravimetric excess adsorptions that were calculated for all six adsorbent samples are summarized in FIG. 25. Excess gravimetric storage was proportional to the KOH:C weight ratio used during the KOH activation of the adsorbents. This result is consistent with the previous finding that BET surface area, which governs excess storage characteristics, also increased at higher KOH:C weight ratio, as summarized in FIG. 21.

The total gravimetric storage capacity, normalized per unit mass of adsorbent, was calculated from the excess gravimetric adsorption using the relationship defined by Eqn. (X):

$$\text{Total\_Gravimetric\_Storage\_Capacity} = \frac{m_{stored}}{m_{sample}} = \frac{m_e}{m_{sample}} + \frac{\rho_{gas}}{\rho_{skel}}\left(\frac{\phi}{1-\phi}\right) \quad \text{Eqn. (X)}$$

where Ø is the intra-granular porosity for samples in a powdered form or the packing porosity for samples in a monolith form.

Figure 26:
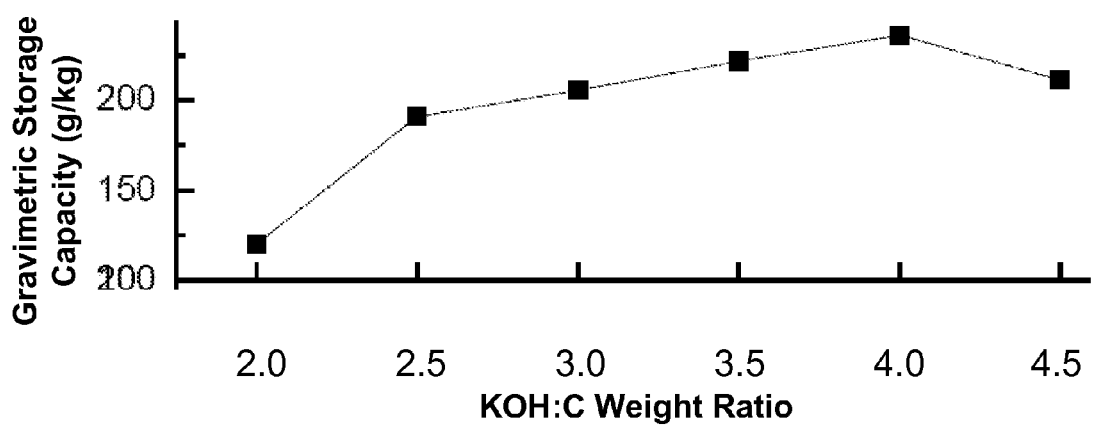
FIG. 26 is a graph summarizing the gravimetric storage capacities of KOH-activated carbon adsorbents as a function of the KOH:C ratio used during activation.

The total gravimetric storage capacities that were calculated for all six adsorbent samples are summarized in FIG. 26. The total gravimetric storage capacity was again proportional to the KOH:C weight ratio used during the KOH activation of the adsorbents. This result is consistent with the previous finding that the porosity, which influences the total gravimetric storage capacity along with the excess storage capacity, also increased at higher KOH:C weight ratio, as summarized in FIG. 22. Referring back to FIG. 26, a gravimetric storage capacity of 256 g CH4 per kg carbon was measured for the sample activated using a KOH:C ratio of 4 during KOH activation.

The volumetric storage capacity was calculated by multiplying the total gravimetric storage capacity by the apparent density ρapp, defined by Eqn. (VIII) herein previously, using the relationship defined by Eqn. (XI):

$$\text{Volumetric\_Storage\_Capacity} = \frac{m_{stored}}{V_{sample}} = \frac{m_{stored}}{m_{sample}} \rho_{app} \quad \text{Eqn. (XI)}$$

where $V_{sample}$ is the volume of the adsorbent sample that includes both the volume of open pores and the skeletal volume of the carbon.

Figure 27:
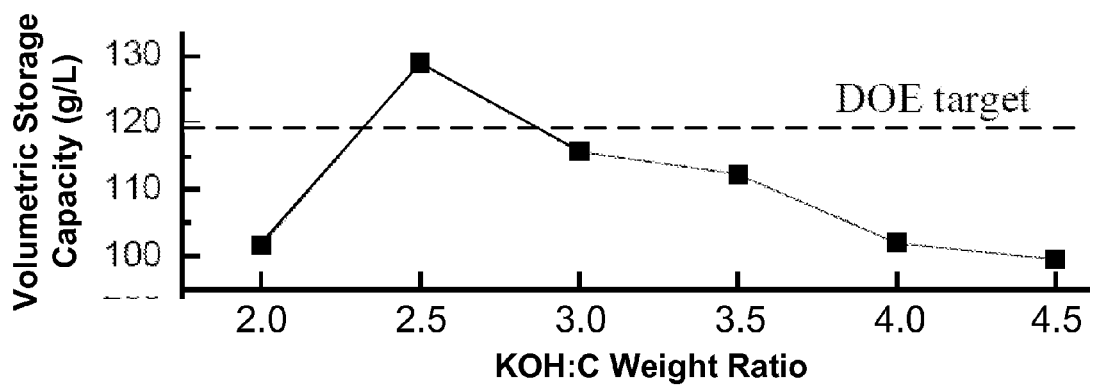
FIG. 27 is a graph summarizing the volumetric storage capacities of KOH-activated carbon adsorbents as a function of the KOH:C ratio used during activation.
Figure 39:
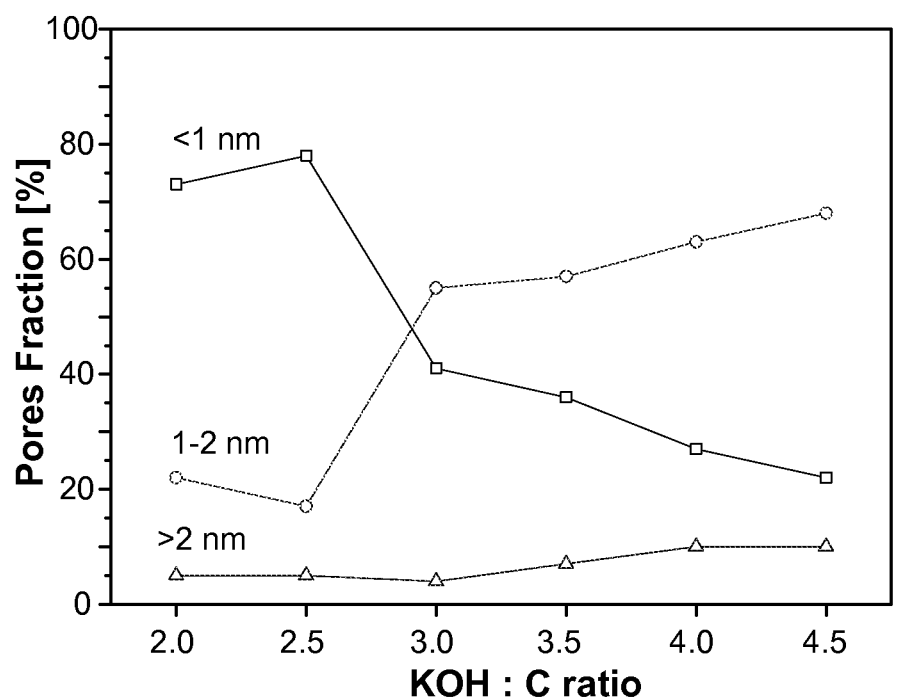
FIG. 39 is a graph summarizing the relative proportion of pore volumes of pores with three ranges of pore diameters for carbon materials formed using a range of KOH:C values.

The volumetric storage capacities for the six adsorbent samples are summarized in FIG. 27. The volumetric storage capacity of the adsorbent achieved a maximum value of 132 g/L at a KOH:C ratio of 2.5. This result is consistent with the finding that the differential pore volume in the sub-nm range was highest at KOH:C=2.5 as summarized in FIG. 23. The evolution of the pore fraction with changing values of KOH:C is illustrated in FIG. 39. In addition, porosity was maintained at a relatively low value as summarized in FIG. 22.

Figure 28:
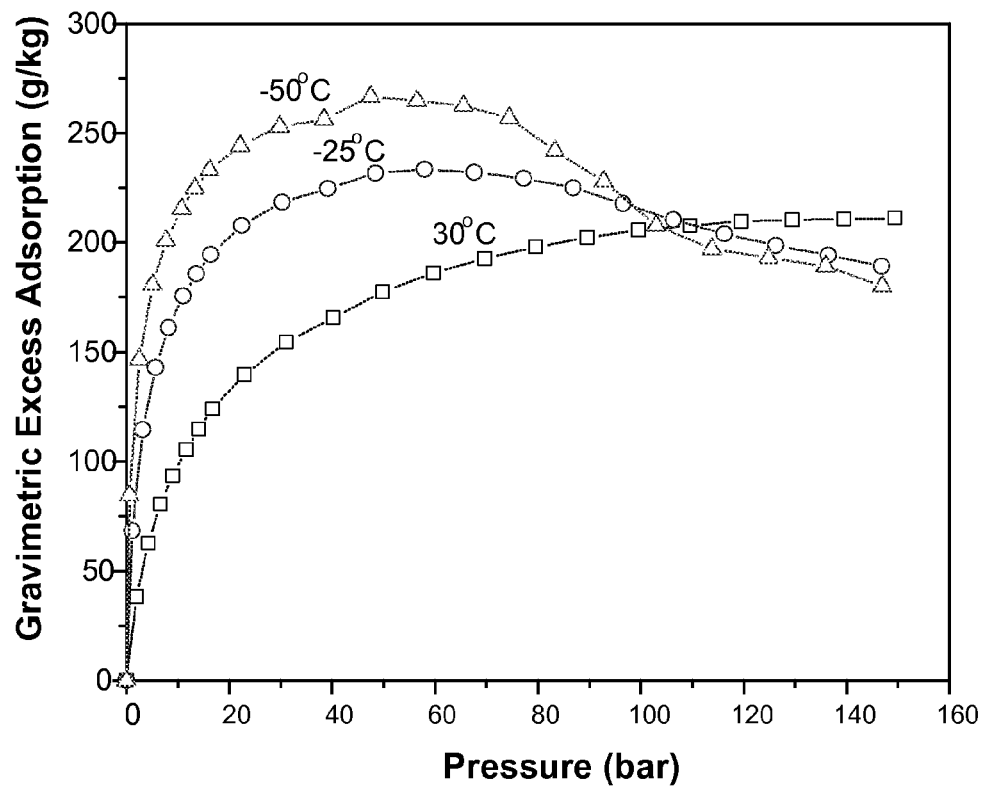
FIG. 28 is a graph summarizing gravimetric excess adsorption as a function of storage pressure and temperature.
Figure 29:
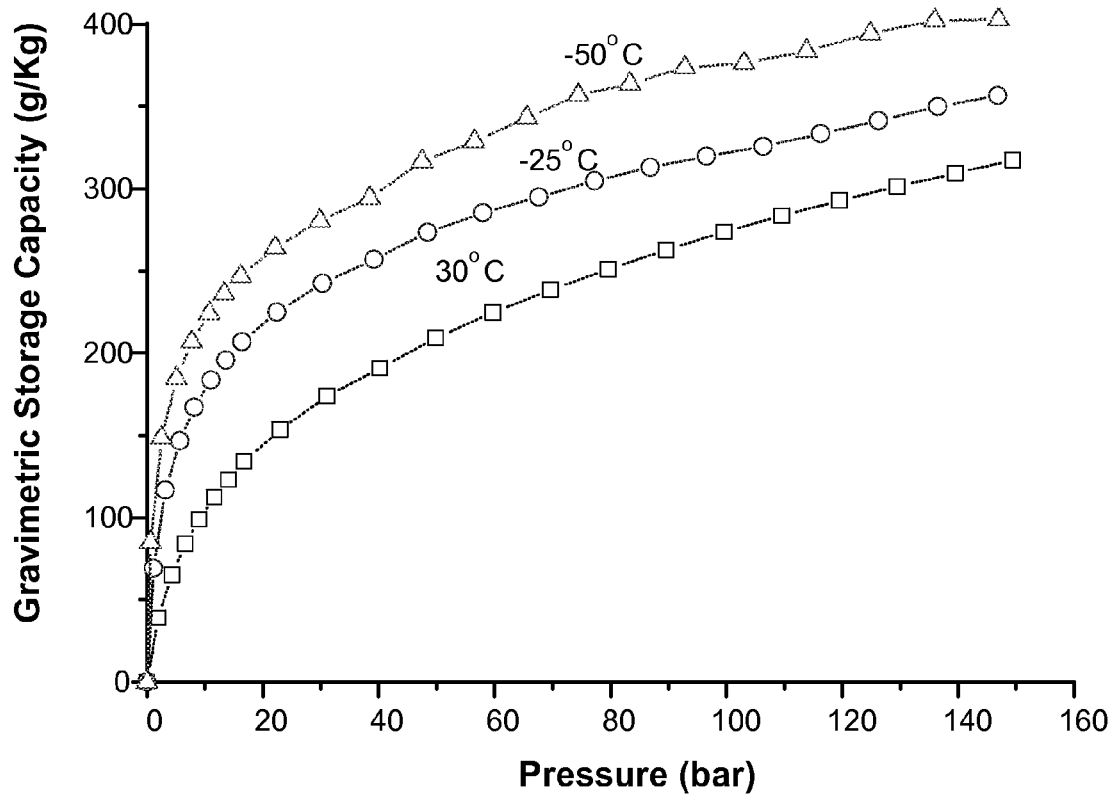
FIG. 29 is a graph summarizing total gravimetric storage capacity of a KOH-activated carbon adsorbent as a function of storage pressure and temperature.
Figure 30:
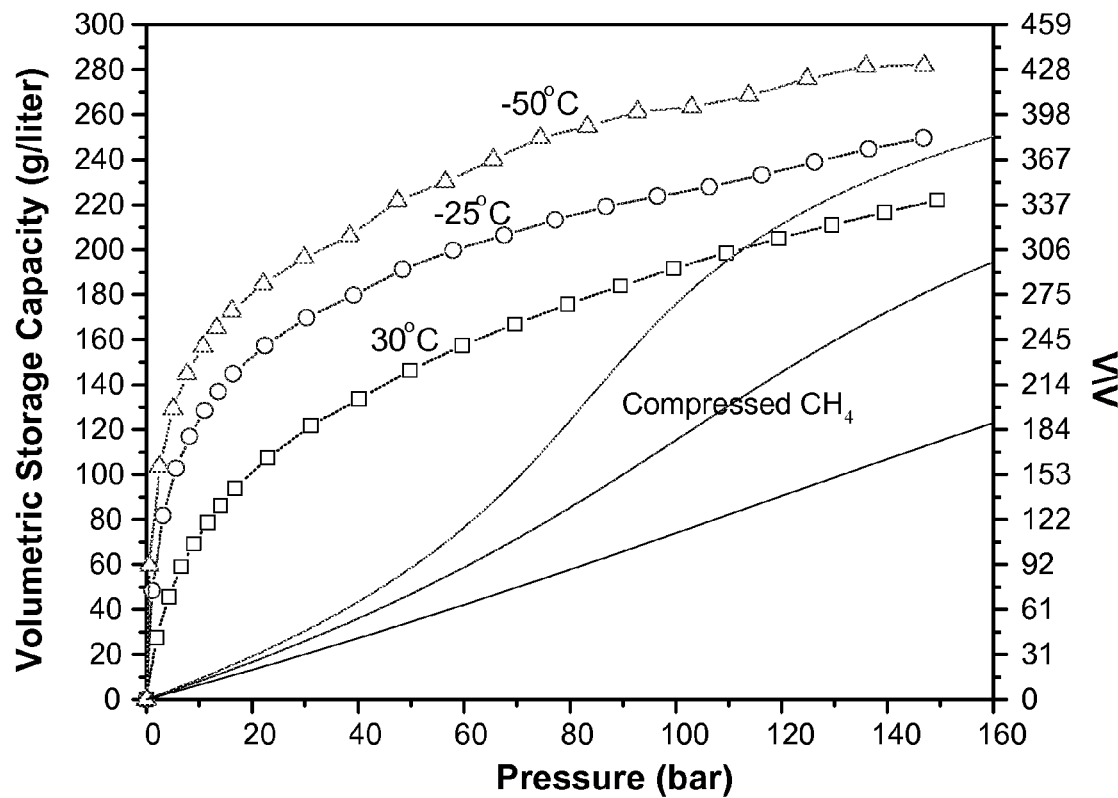
FIG. 30 is a graph summarizing total volumetric storage capacity of a KOH-activated carbon adsorbent as a function of storage pressure and temperature.

Additional methane adsorption isotherms were obtained for the six samples at temperatures of 30° C., −25° C., and −50° C. and at pressures ranging from 1 to 150 bar. The gravimetric excess adsorptions and total gravimetric storage capacities are summarized as a function of storage pressure in FIGS. 28 and 29, respectively. The volumetric storage capacities are summarized as a function of storage pressures in FIG. 30. The corresponding storage capacities for the compressed natural gas without added adsorbent are also shown in FIG. 30 for comparison.

The results of this experiment demonstrated that activated carbon adsorbents with a predetermined surface area, porosity, and pore size distribution may be produced by manipulating the KOH concentration during the KOH activation process. The results of this experiment further demonstrated that the adsorbent with the highest sub-nm pore volume and a relatively low porosity exhibited the highest volumetric storage capacity for methane.

Example 17

Effects of Compaction Temperature on the Methane Adsorption Characteristics of Briquetted KOH-Activated Carbon Adsorbent To assess the effects of compaction temperature associated with the production of briquettes containing KOH-activated carbon adsorbent materials, the following experiments were conducted. KOH-activated carbon adsorbent material was produced using the methods described in Example 11 with a KOH:C weight ratio of 3 and a KOH activation temperature of 790° C. This precursor adsorbent was subjected to a briquetting process in which the activated carbon was ball-milled with an equal mass of polyvinylidene chloride (PVDC) binder for a period ranging from about 4 hours to about 12 hours. The activated carbon:PVDC mixture was compacted at a pressure of about 15000 psi in three batches at compaction temperatures of 170° C., 230° C., and 280° C., respectively. By way of reference, the melting point of PVDC is about 200° C. All three batches of compressed activated carbon/PVDC mixtures were then subjected to pyrolysis at 750° C. for about one hour under nitrogen atmosphere.

Figure 31:
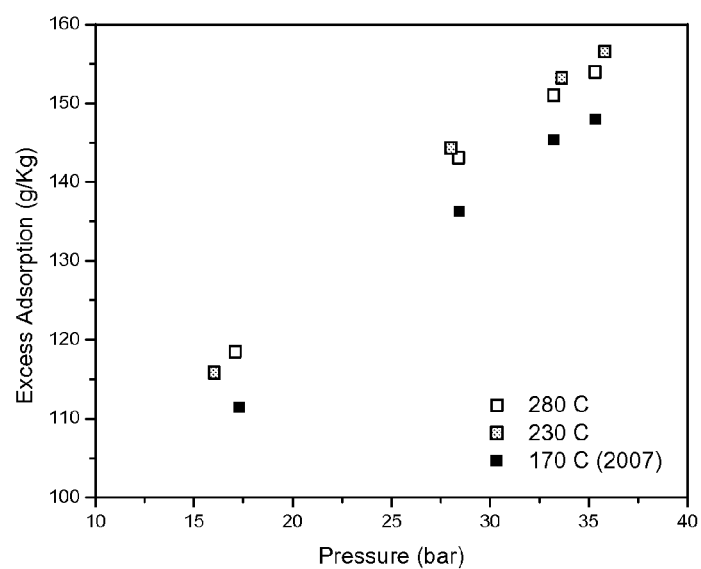
FIG. 31 is a graph summarizing gravimetric excess adsorption at a storage temperature of 22° C. of briquetted carbon adsorbent as a function of storage pressure and the compaction temperature used to form the briquettes.

The excess gravimetric adsorption of methane of the three samples was measured using methods similar to those described in Example 16 at room temperature and at pressures of up to about 35 bar. The excess gravimetric adsorption capacities of the three samples are summarized in FIG. 31 as a function of storage pressure at a storage temperature of 22° C. As shown in FIG. 31, the sample formed at a compaction temperature of 230° C. exhibited the highest excess gravimetric adsorption capacity among the samples at storage pressures in excess of about 28 bar.

The volumetric adsorption capacity of methane of the three samples was calculated using the methods described in Example 16 at room temperature (22° C.) and at pressure of 35 bar. The results of these calculations are summarized in Table 10. As shown in Table 10, the sample formed at a compaction temperature of 230° C. also exhibited the highest volumetric adsorption capacity among the samples.

TABLE 10

Effect of Compaction Temperature on Volumetric Methane Storage Capacity at 22° C. and 35 bar

| Compaction Temperature (° C.) | Volumetric Methane Storage Capacity (g/L) |
| --- | --- |
| 170 | 82 |
| 230 | 97 |
| 280 | 93 |

The results of this experiment demonstrated that the methane adsorption capacity of the briquettes was sensitive to the compaction temperature at which the briquettes were formed.

Example 18

Effects of Pyrolysis Temperature on the Methane Adsorption Characteristics of Briquetted KOH-Activated Carbon Adsorbent To assess the effects of pyrolysis temperature associated with the production of briquettes containing KOH-activated carbon adsorbent materials, the following experiments were conducted. KOH-activated carbon adsorbent material was produced using the methods described in Example 11 with a KOH:C weight ratio of 3 and a KOH activation temperature of 790° C. This precursor adsorbent was subjected to a briquetting process in which the activated carbon was ball-milled with an equal mass of polyvinylidene chloride (PVDC) binder. The activated carbon:PVDC mixture was compacted at a compaction temperature of 170° C. The compacted mixtures were then subjected to pyrolysis in three batches at pyrolysis temperatures of 750° C., 850° C., and 1000° C.

Figure 32:
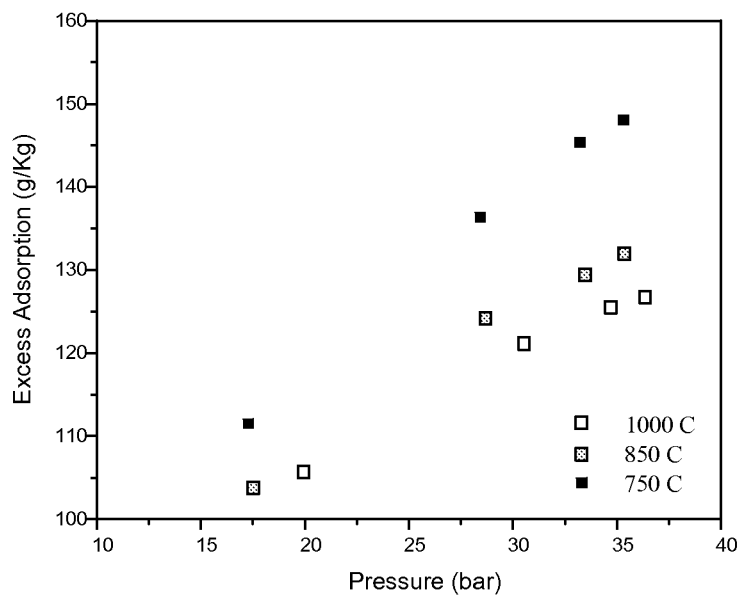
FIG. 32 is a graph summarizing gravimetric excess adsorption at a storage temperature of 22° C. of briquetted carbon adsorbent as a function of storage pressure and the pyrolysis temperature used to form the briquettes.

The excess gravimetric adsorption of methane of the three samples was measured using methods similar to those described in Example 16. The excess gravimetric adsorption capacities of the three samples are summarized in FIG. 32 as a function of storage pressure at a storage temperature of 22° C. As shown in FIG. 32, the sample formed at a pyrolysis temperature of 750° C. exhibited the highest excess gravimetric adsorption capacity among the samples at all storage pressures tested.

The volumetric adsorption capacity of methane of the three samples was calculated using the methods described in Example 16 at room temperature (22° C.) and at pressure of 35 bar. The results of these calculations are summarized in Table 11. As shown in Table 11, the sample formed at a pyrolysis temperature of 1000° C. exhibited the highest volumetric adsorption capacity among the samples.

TABLE 11

Effect of Pyrolysis Temperature on Volumetric Methane Storage Capacity at 22° C. and 35 bar

| Pyrolysis Temperature (° C.) | Volumetric Methane Storage Capacity (g/L) |
| --- | --- |
| 750 | 82 |
| 850 | 82 |
| 1000 | 91 |

The results of this experiment demonstrated that the methane adsorption capacity of the briquettes was sensitive to the pyrolysis temperature at which the briquettes were formed.

Example 19

Effects of Carbon:Binder Mass Ratio on the Methane Adsorption Characteristics of Briquetted KOH-Activated Carbon Adsorbent To assess the effects of carbon:binder mass ratio associated with the production of briquettes containing KOH-activated carbon adsorbent materials, the following experiments were conducted. KOH-activated carbon adsorbent material was produced using the methods described in Example 11 with a KOH:C weight ratio of 3 and a KOH activation temperature of 790° C. This precursor adsorbent was subjected to a briquetting process in which the activated carbon was ball-milled in batches with polyvinylidene chloride (PVDC) binder in four different binder:carbon mass ratios: 0.5 (30 g PVDC and 60 g C); 1 (50 g PVDC and 50 g C); 1.25 (60 g PVDC and 48 g C), and 2.5 (90 g PVDC and 36 g C). The activated carbon:PVDC mixture in each batch was compacted at a compaction temperature of 170° C. and subjected to pyrolysis at a pyrolysis temperature of 750° C. The sample formed using mass ratio of 60 g C:30 g PVDC failed to form a monolithic structure during compaction.

Figure 33:
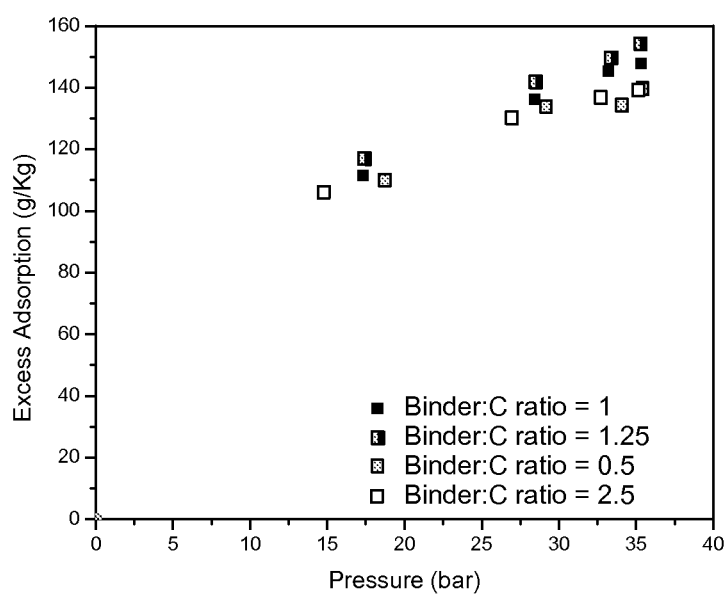
FIG. 33 is a graph summarizing gravimetric excess adsorption at a storage temperature of 22° C. of briquetted carbon adsorbent as a function of storage pressure and the adsorbent:binder mass ratio used to form the briquettes.

The excess gravimetric adsorption of methane of the four samples was measured using methods similar to those described in Example 16. The excess gravimetric adsorption capacities of the four samples are summarized in FIG. 33 as a function of storage pressure at a storage temperature of 22° C. As shown in FIG. 33, the sample formed using an activated carbon:PVDC mixture at a mass ratio of 1.25 exhibited the highest excess gravimetric adsorption capacity among the samples at all storage pressures tested.

The volumetric adsorption capacity of methane of the four samples was calculated using the methods described in Example 16 at room temperature (22° C.) and at pressure of 35 bar. The results of these calculations are summarized in Table 12. As shown in Table 12, the sample formed at a binder to carbon mass ratio of 1.25 also exhibited the highest volumetric adsorption capacity among the samples.

TABLE 12

Effect of Binder to Carbon Mass Ratio on Volumetric Methane Storage Capacity at 22° C. and 35 bar

| Binder to Carbon Mass Ratio | Volumetric Methane Storage Capacity (g/L) |
|---|---|
| 0.5 | 85 |
| 1 | 82 |
| 1.25 | 97 |
| 2.5 | 93 |

The results of this experiment demonstrated that the methane adsorption capacity of the briquettes was sensitive to the mass ratio of PVDC binder:carbon adsorbent at which the briquettes were formed.

Example 20

Effects of KOH:C Mass Ratio of Precursor Adsorbent on the Methane Adsorption Characteristics of Briquetted KOH-Activated Carbon Adsorbent To assess the effects of the KOH:C mass ratio used to form the precursor activated carbon adsorbent used to produce the briquettes containing KOH-activated carbon adsorbent materials, the following experiments were conducted. The batches of KOH-activated carbon adsorbent material were produced using the methods described in Example 11 with a KOH activation temperature of 790° C. and KOH:C weight ratios of 2, 3, and 4. Each batch of precursor adsorbent was subjected to a briquetting process in which the activated carbon was ball-milled with an equal mass of polyvinylidene chloride. The activated carbon:PVDC mixture in each batch was compacted at a compaction temperature of 170° C. and subjected to pyrolysis at a pyrolysis temperature of 750° C.

Figure 34:
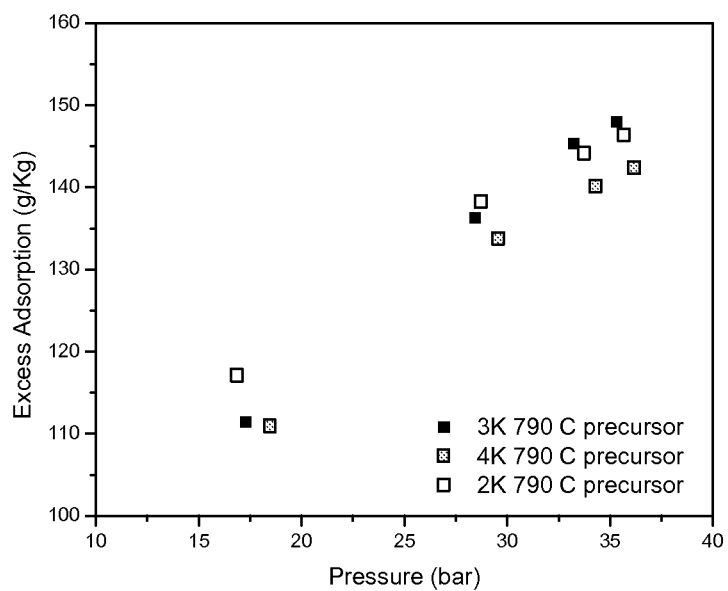
FIG. 34 is a graph summarizing gravimetric excess adsorption at a storage temperature of 22° C. of briquetted carbon adsorbent as a function of storage pressure and the KOH activation conditions of the precursor adsorbent used to form the briquettes.

The excess gravimetric adsorption of methane of the three samples was measured using methods similar to those described in Example 16. The excess gravimetric adsorption capacities of the three samples are summarized in FIG. 34 as a function of storage pressure at a storage temperature of 22° C. As shown in FIG. 34, the sample formed using activated carbon formed using a KOH:C ratio of 2 had the highest excess gravimetric adsorption capacity at a storage pressures of below about 30 bar, and the sample formed using activated carbon formed using a KOH:C ratio of 3 had the highest excess gravimetric adsorption capacity at a storage pressures above about 30 bar.

The results of this experiment demonstrated that the excess gravimetric adsorption capacity of the briquettes was sensitive to the KOH:C mass ratio used to form the precursor activated carbon adsorbent used to produce the briquettes.

Example 21

Methane Storage Characteristics of Optimized Briquetted KOH-Activated Carbon Adsorbent To assess the methane storage characteristics of briquettes containing KOH-activated carbon adsorbent materials that were produced using combined conditions resulting in enhanced excess gravimetric adsorption characteristics in Examples 17-20, the following experiments were conducted. KOH-activated carbon adsorbent material was produced using the methods described in Example 11 with a KOH activation temperature of 700° C. and a KOH:C weight ratio of 2.5. The precursor adsorbent was subjected to a briquetting process in which the activated carbon was ball-milled with polyvinylidene chloride at a binder:carbon mass ratio of 1.25. The activated carbon:PVDC mixture was compacted at a compaction temperature of 230° C. and subjected to pyrolysis at a pyrolysis temperature of 750° C.

Figure 35:
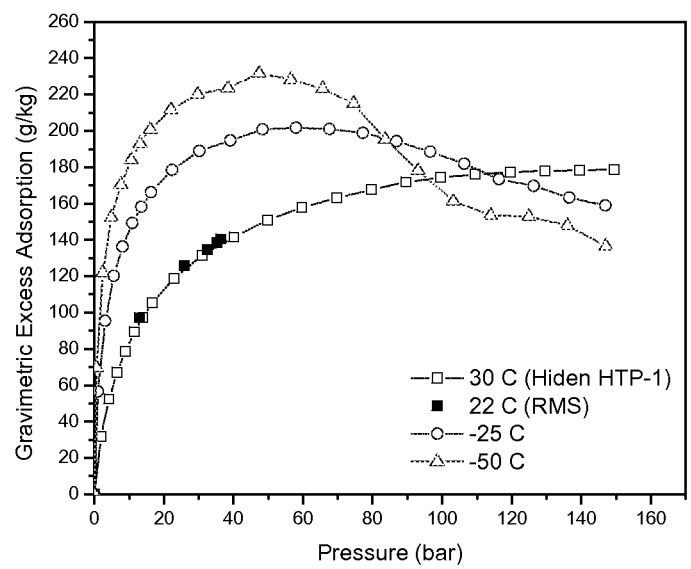
FIG. 35 is a graph summarizing gravimetric excess adsorption of a briquetted carbon adsorbent as a function of storage pressure and temperature.
Figure 36:
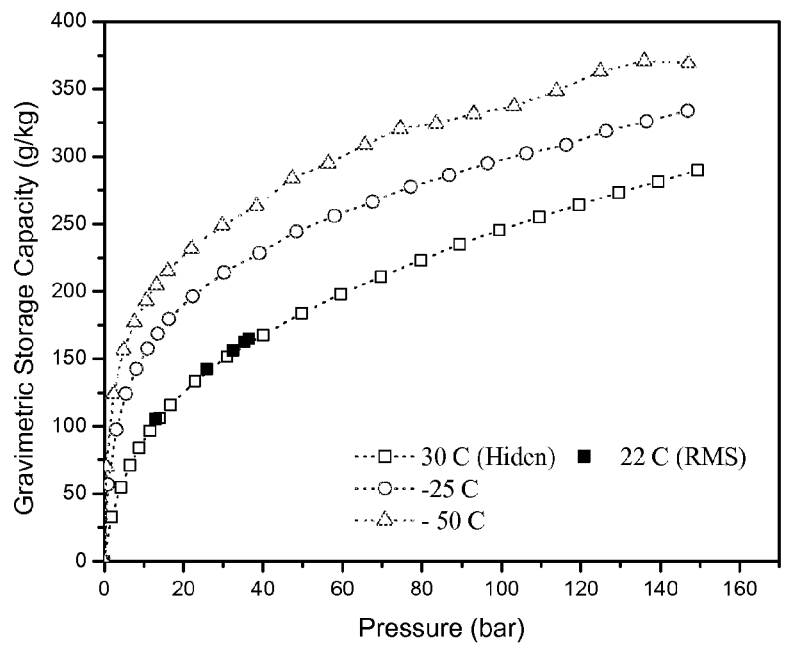
FIG. 36 is a graph summarizing gravimetric storage capacity of a briquetted carbon adsorbent as a function of storage pressure and temperature.
Figure 37:
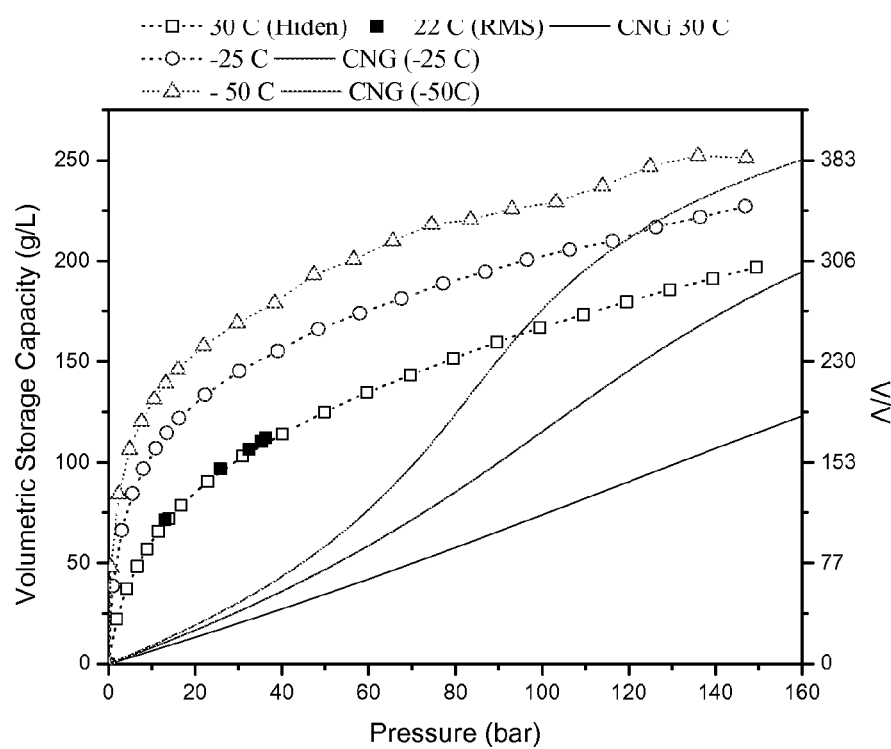
FIG. 37 is a graph summarizing volumetric storage capacity of a briquetted carbon adsorbent as a function of storage pressure and temperature.

The excess gravimetric adsorption of methane of the sample was measured using methods similar to those described in Example 16 at storage temperatures of 22° C., 30° C., −25° C., and −50° C. The excess gravimetric adsorption capacities are summarized in FIG. 35 as a function of storage pressure and temperature. The total gravimetric adsorption capacity calculated using the methods described in Example 16 is summarized in FIG. 36 as a function of storage pressure and temperature. The volumetric adsorption capacity calculated using the methods described in Example 16 is summarized in FIG. 37 as a function of storage pressure and temperature; at a storage temperature of 22° C. and storage pressure of 35 bar, this optimized briquetted KOH-activated carbon adsorbent had a volumetric adsorption capacity of 113 g/L.

The results of this experiment demonstrated the gravimetric and volumetric adsorption capacities of the briquettes produced using process conditions associated with enhanced methane adsorption performance in Examples 17-20.

What is claimed is:

1. A process for making an activated carbon adsorbent having a predetermined pore size distribution and surface area, the process comprising contacting a char with KOH for one hour at an activation temperature ranging from 700° C. to 900° C. and a KOH:C ratio ranging from 3 to 4.5, wherein the activated carbon adsorbent has a total pore volume of at least 1.5 cc/g and a surface area of at least about 2700 m²/g.

2. The process of claim 1, wherein the activation temperature is 700° C., wherein the KOH:C ratio is 3.5, and wherein the activated carbon adsorbent has a % volume of pores of 10 Å diameter or less ranging from about 40% to about 50%.

3. The process of claim 1, wherein the activation temperature is 800° C., wherein the KOH:C ratio is 3.5, and wherein the activated carbon adsorbent has a % volume of pores of 10 Å diameter or less of about 40%.

4. The process of claim 1, wherein the activation temperature is 900° C., wherein the KOH:C ratio is 3.5, and wherein the activated carbon adsorbent has a % volume of pores of 10 Å diameter or less of about 30%.

5. The process of claim 1, wherein the KOH is an amount of KOH flakes or a KOH solution.

6. A process for making an activated carbon adsorbent having a predetermined pore size distribution and surface area, the process comprising contacting a char with KOH flakes or solution for one hour at an activation temperature of 700° C. and a KOH:C ratio ranging from 2.5 to 3.5, wherein the activated carbon adsorbent has a % volume of pores of 10 Å diameter or less ranging from about 80% to about 40%.

7. A process for making an activated carbon adsorbent having a predetermined pore size distribution and surface area, the process comprising contacting a char with KOH solution for one hour at an activation temperature of 800° C. and a KOH:C ratio ranging from 2.5 to 3.5, wherein the activated carbon adsorbent has a % volume of pores of 10 Å diameter or less ranging from about 55% to about 40%.

8. A process for making an activated carbon adsorbent having a predetermined pore size distribution and surface area, the process comprising contacting a char with KOH solution for one hour at an activation temperature of 900° C. and a KOH:C ratio ranging from 2.5 to 3.5, wherein the activated carbon adsorbent has a % volume of pores of 10 Å diameter or less ranging from about 50% to about 30%.

9. A process for making an activated carbon adsorbent having a predetermined pore size distribution and surface area, the process comprising:
providing a char comprising an acid-activated, charred biomass feedstock; and
contacting the char with an amount of KOH flakes or solution for one hour at an activation temperature ranging from 700° C. to 900° C. and a KOH:C ratio ranging from 3 to 4.5; wherein the activated carbon adsorbent has a total pore volume of at least 1.5 cc/g and a surface area of at least about 2700 m$^2$/g.

10. The process of claim 9, wherein the activation temperature is 700° C., wherein the KOH:C ratio is 3.5, and wherein the activated carbon adsorbent has a % volume of pores of 10 Å diameter or less ranging from about 40% to about 50%.

11. The process of claim 9, wherein the activation temperature is 800° C., wherein the KOH:C ratio is 3.5, and wherein the activated carbon adsorbent has a % volume of pores of 10 Å diameter or less of about 40%.

12. The process of claim 9, wherein the activation temperature is 900° C., wherein the KOH:C ratio is 3.5, and wherein the activated carbon adsorbent has a % volume of pores of 10 Å diameter or less of about 30%.

13. A process for making an activated carbon adsorbent having a predetermined pore size distribution and surface area, the process comprising:
soaking a biomass feedstock in phosphoric acid at about 45° C. for about 12 hours to form an acid-activated feedstock;
washing the acid-activated feedstock to adjust the pH of the acid-activated feedstock to about 7;
charring the washed acid-activated feedstock at about 480° C. under a nitrogen atmosphere to form a char; and
contacting the char with an amount of KOH flakes or solution for one hour at an activation temperature ranging from 700° C. to 900° C. and a KOH:C ratio ranging from 3 to 4.5;
wherein the activated carbon adsorbent has a total pore volume of at least 1.5 cc/g and a surface area of at least about 2700 m$^2$/g.

14. The process of claim 13, wherein the activation temperature is 700° C., wherein the KOH:C ratio is 3.5, and wherein the activated carbon adsorbent has a % volume of pores of 10 Å diameter or less ranging from about 40% to about 50%.

15. The process of claim 13, wherein the activation temperature is 800° C., wherein the KOH:C ratio is 3.5, and wherein the activated carbon adsorbent has a % volume of pores of 10 Å diameter or less of about 40%.

16. The process of claim 13, wherein the activation temperature is 900° C., wherein the KOH:C ratio is 3.5, and wherein the activated carbon adsorbent has a % volume of pores of 10 Å diameter or less of about 30%.

* * * * *